US012676777B1

(12) United States Patent
Ravi et al.

(10) Patent No.: US 12,676,777 B1
(45) Date of Patent: Jul. 7, 2026

(54) DECISION FEEDBACK EQUALIZATION TRAINING FOR SINGLE-ENDED RECEIVER

(71) Applicant: Cadence Design Systems, Inc., San Jose, CA (US)

(72) Inventors: Hari Anand Ravi, Bangalore (IN); Phalguni Bala, Bangalore (IN); Hajee Mohammed Shuaeb Fazeel, Bengaluru (IN)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 18/910,316

(22) Filed: Oct. 9, 2024

(51) Int. Cl.
*H04L 25/03* (2006.01)

(52) U.S. Cl.
CPC ............... *H04L 25/03057* (2013.01); *H04L 2025/03592* (2013.01)

(58) Field of Classification Search
CPC ............... H04L 25/03057; H04L 2025/03592
USPC ........................................ 375/233
See application file for complete search history.

(56) References Cited

U.S. PATENT DOCUMENTS

2023/0050659 A1\* 2/2023 Zhang .................... H04L 27/32
2023/0395105 A1\* 12/2023 Waldrop ............. G11C 7/1087

\* cited by examiner

*Primary Examiner* — Leila Malek
(74) *Attorney, Agent, or Firm* — Mark H. Whittenberger; Holland & Knight LLP

(57) ABSTRACT

The present disclosure relates to a partial equalization DFE (decision feedback equalization) training method, for use with a single-ended receiver. Embodiments may include obtaining LE (lower-eye) minimum and maximum voltages for a current bit based on a preceding bit. Embodiments may also include, using the values obtained for the LE minimum and maximum voltages to compute values for an optimal LE reference voltage and an LE DFE tap-coefficient, obtaining UE (upper-eye) minimum and maximum voltages for the current bit based on the preceding bit, and using the values obtained for the UE minimum and maximum voltages to compute values for an optimal UE reference voltage and a UE DFE tap-coefficient. Embodiments may also include, using the values obtained for the LE minimum and maximum voltages, the UE minimum and maximum voltages, and the optimal LE and UE reference voltages to compute final values for the LE and UE DFE tap-coefficients.

15 Claims, 38 Drawing Sheets

200

| Previous symbol | | Effective VREF for the incoming symbol | |
|---|---|---|---|
| I_DOUT_DH | I_DOUT_DL | VREFDH_DFE | VREFDL_DFE |
| 0 | 0 | VREFDH - TAPDH | VREFDL - TAPDL |
| 0 | 1 | VREFDH - TAPDH | VREFDL + TAPDL |
| 1 | 1 | VREFDH + TAPDH | VREFDL + TAPDL |

206

300

308

302

VREFDH

TAPDH_L

TAPDH_H

VREFDH_DFE

COMP_DH

PAD

ICK

D    Q

I_DOUT_DH

COMP_DL

VREFDL_DFE

ICK

D    Q

I_DOUT_DL

VREFDL

TAPDH_L

304

TAPDH_H

310

| Previous symbol | | Effective VREF for the incoming symbol | |
|---|---|---|---|
| I_DOUT_DH | I_DOUT_DL | VREFDH_DFE | VREFDL_DFE |
| 0 | 0 | VREFDH - TAPDH_H - TAPDH_L | VREFDL - TAPDL_H - TAPDL_L |
| 0 | 1 | VREFDH - TAPDH_H + TAPDH_L | VREFDL - TAPDL_H + TAPDL_L |
| 1 | 1 | VREFDH + TAPDH_H + TAPDH_L | VREFDL + TAPDL_H + TAPDL_L |

306

400
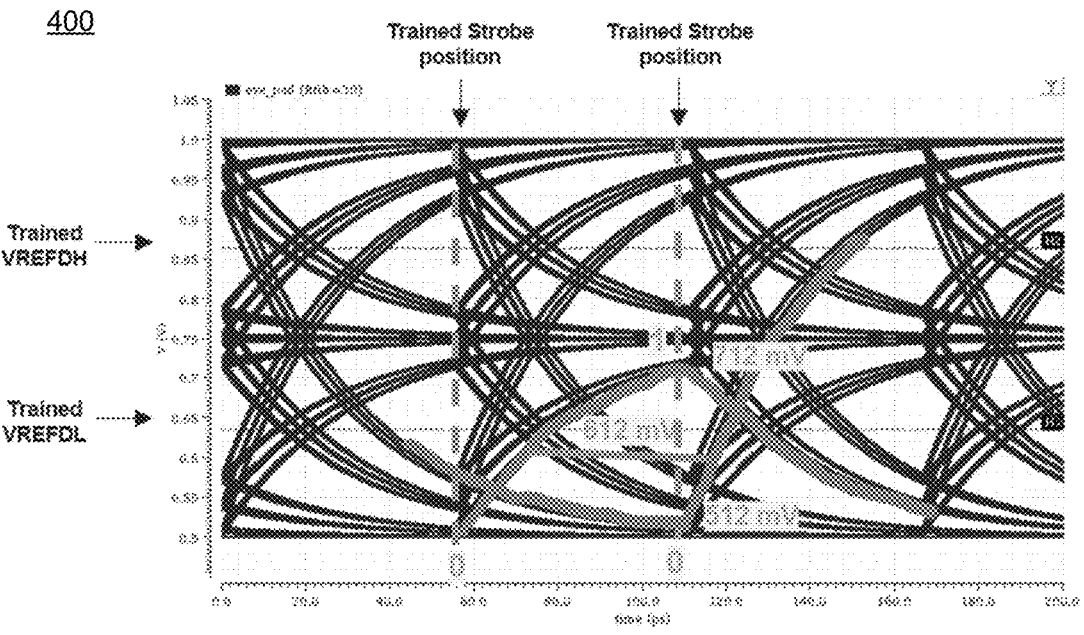
*Equalizing lower eye: Previous bit '0' case*
FIG. 4A
402
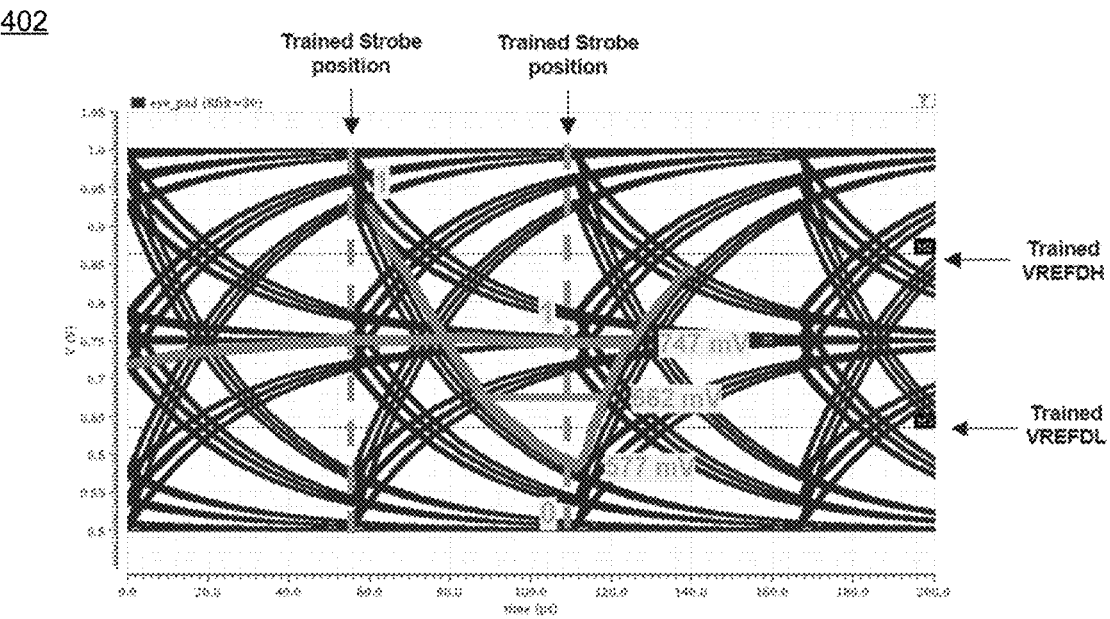
*Equalizing lower eye: Previous bit '1' case*
FIG. 4B

500

| Parameter | Value | Unit | Equation |
|---|---|---|---|
| VREFDL_L_VIL | 512 | mV | |
| VREFDL_L_VIH | 712 | | |
| VREFDL_H_VIL | 577 | | |
| VREFDL_H_VIH | 747 | | |
| | | | |
| VREFDL_L | 612 | mV | 0.5*(VREFDL_L_VIL+VREFDL_L_VIH) |
| VREFDL_H | 662 | | 0.5*(VREFDL_H_VIL+VREFDL_H_VIH) |

502

| Previous bit | Effective VREF for the incoming symbol | | |
|---|---|---|---|
| I_DOUT_DL | VREFDL_DFE | | Value (mV) |
| 0 | VREFDL_L | VREFDL$_{opt}$ - TAPDL | 612 |
| 1 | VREFDL_H | VREFDL$_{opt}$ + TAPDL | 662 |

504

| Parameter | Value | Unit | Equation |
|---|---|---|---|
| VREFDL$_{opt}$ | 637 | mV | 0.5*(VREFDL_L+VREFDL_H) |
| TAPDL | 25 | | VREFDL_H-VREFDL$_{opt}$ |

*Equalizing upper eye : Previous bit '0' case*

602

*Equalizing upper eye: Previous bit '1' case*

700

| Parameter | Value | Unit | Equation |
|---|---|---|---|
| VREFDH_L_VIL | 755.5 | mV | |
| VREFDH_L_VIH | 920.5 | | |
| VREFDH_H_VIL | 788 | | |
| VREFDH_H_VIH | 988 | | |
| | | | |
| VREFDH_L | 838 | mV | 0.5*(VREFDH_L_VIL+VREFDH_L_VIH) |
| VREFDH_H | 888 | | 0.5*(VREFDH_H_VIL+VREFDH_H_VIH) |

702

| Previous bit | Effective VREF for the incoming symbol | | |
|---|---|---|---|
| I_DOUT_DH | VREFDH_DFE | | Value (mV) |
| 0 | VREFDH_L | $VREFDH_{opt}$ - TAPDH | 838 |
| 1 | VREFDH_H | $VREFDH_{opt}$ + TAPDH | 888 |

704

| Parameter | Value | Unit | Equation |
|---|---|---|---|
| $VREFDH_{opt}$ | 863 | mV | 0.5*(VREFDH_L+VREFDH_H) |
| TAPDH | 25 | | VREFDH_H-$VREFDH_{opt}$ |

$$VREFDL\_L = VREFDLopt - TAPDL$$
$$VREFDL\_H = VREFDLopt + TAPDL$$

Expected tap coefficient TAPDL obtained
using the proposed algorithm

802

$$VREFDH\_L = VREFDHopt - TAPDH$$
$$VREFDH\_H = VREFDHopt + TAPDH$$

Expected tap coefficient TAPDH obtained
using the proposed algorithm

900

1050

1200

*Find TAPDL in terms of TAP* DAC code*

1202

*Find TAPDH in terms of TAP* DAC code*

1350

1400

| Lower Eye | | | |
|---|---|---|---|
| Parameter | Value | Unit | Equation |
| VREFDL_L_VIL       (Y1) | 512 | mV | |
| VREFDL_L_VIH       (X1) | 712 | | |
| VREFDL_H_VIL | 577 | | |
| VREFDL_H_VIH | 747 | | |
| | | | |
| VREFDL_L | 612 | mV | 0.5*(VREFDL_L_VIL+VREFDL_L_VIH) |
| VREFDL_H | 662 | | 0.5*(VREFDL_H_VIL+VREFDL_H_VIH) |
| VREFDL_opt | 637 | | 0.5*(VREFDL_L+VREFDL_H) |
| | | | |
| OFFSET1 | 100 | mV | 0.5*(VREFDL_L_VIH-VREFDL_L_VIL) |
| Z1 | 537 | | VREFDL_opt-OFFSET1 |
| TAPDL | 25 | | Z1-Y1 |

1402

| Upper Eye | | | |
|---|---|---|---|
| Parameter | Value | Unit | Equation |
| VREFDH_L_VIL | 755.5 | mV | |
| VREFDH_L_VIH | 920.5 | | |
| VREFDH_H_VIL       (Y2) | 788 | | |
| VREFDH_H_VIH       (X2) | 988 | | |
| | | | |
| VREFDH_L | 838 | mV | 0.5*(VREFDH_L_VIL+VREFDH_L_VIH) |
| VREFDH_H | 888 | | 0.5*(VREFDH_H_VIL+VREFDH_H_VIH) |
| VREFDH_opt | 863 | | 0.5*(VREFDH_L+VREFDH_H) |
| | | | |
| OFFSET2 | 100 | mV | 0.5*(VREFDH_H_VIH-VREFDH_H_VIL) |
| Z2 | 963 | | VREFDH_opt+OFFSET2 |
| TAPDH | 25 | | X2-Z2 |

FIG. 14

1500
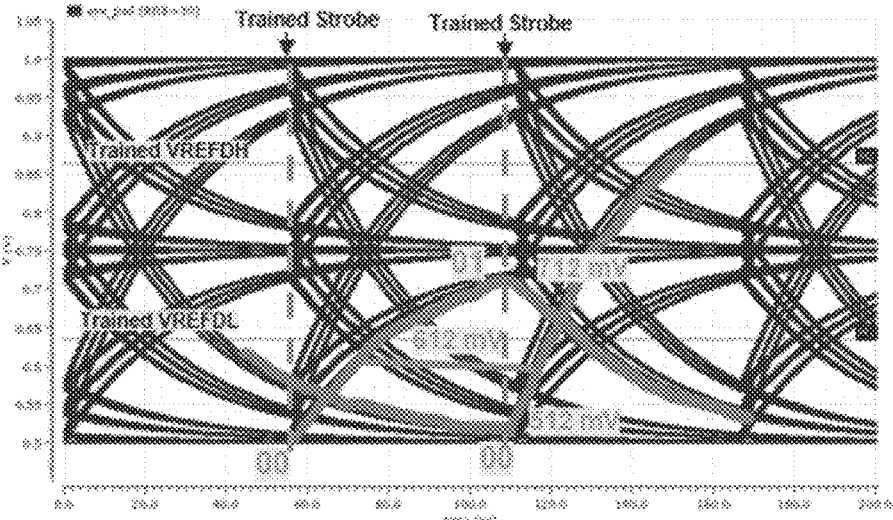
FIG. 15A     *Equalizing lower eye : Previous symbol '00' case*
1502
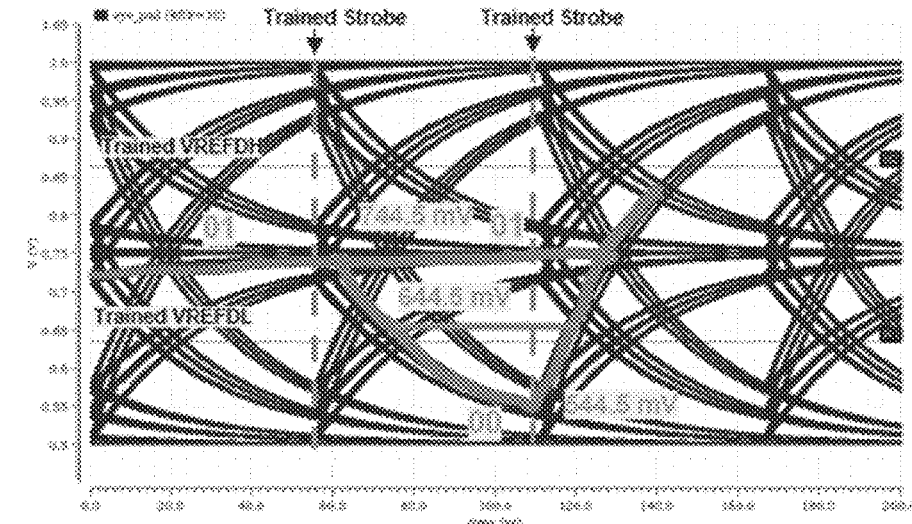
FIG. 15B     *Equalizing lower eye : Previous symbol '01' case*
1504
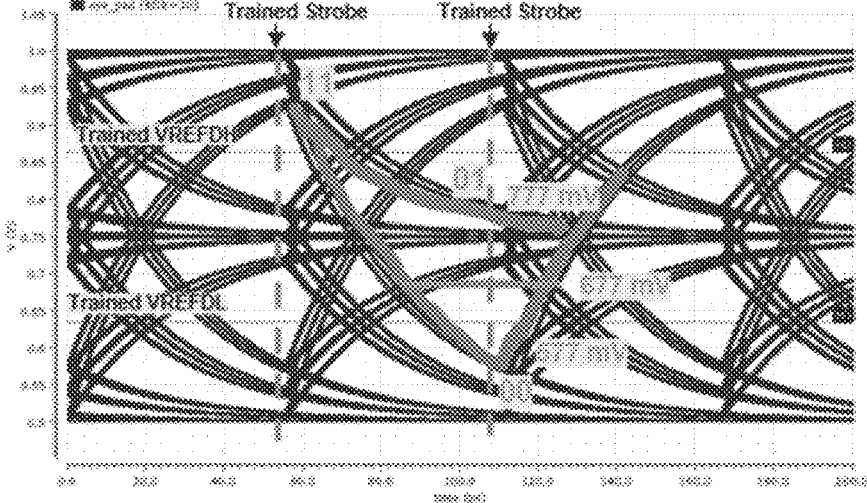
FIG. 15C     *Equalizing lower eye : Previous symbol '11' case*

1600

| Parameter | Value | Unit | Equation |
|---|---|---|---|
| VREFDL_LL_VIL | 512 | | |
| VREFDL_LL_VIH | 712 | | |
| VREFDL_LH_VIL | 544.5 | mV | |
| VREFDL_LH_VIH | 744.5 | | |
| VREFDL_HH_VIL | 577 | | |
| VREFDL_HH_VIH | 777 | | |
| | | | |
| VREFDL_LL | 612 | | 0.5*(VREFDL_LL_VIL+VREFDL_LL_VIH) |
| VREFDL_LH | 644.5 | mV | 0.5*(VREFDL_LH_VIL+VREFDL_LH_VIH) |
| VREFDL_HH | 677 | | 0.5*(VREFDL_HH_VIL+VREFDL_HH_VIH) |

1602

| Previous symbol | | Effective VREF for the incoming symbol | | |
|---|---|---|---|---|
| I_DOUT_DH | I_DOUT_DL | VREFDL_DFE | | Value (mV) |
| 0 | 0 | VREFDL_LL | VREFDL_opt - TAPDL_H - TAPDL_L | 612 |
| 0 | 1 | VREFDL_LH | VREFDL_opt - TAPDL_H + TAPDL_L | 644.5 |
| 1 | 1 | VREFDL_HH | VREFDL_opt + TAPDL_H + TAPDL_L | 677 |

1604

| Parameter | Value | Unit | Equation |
|---|---|---|---|
| VREFDL_opt | 644.5 | | 0.5*(VREFDL_HH+VREFDL_LL) |
| TAPDL_L | 16.25 | mV | 0.5*(VREFDL_LH-VREFDL_LL) |
| TAPDL_H | 16.25 | | VREFDL_HH-TAPDL-VREFDL |

FIG. 16

1700
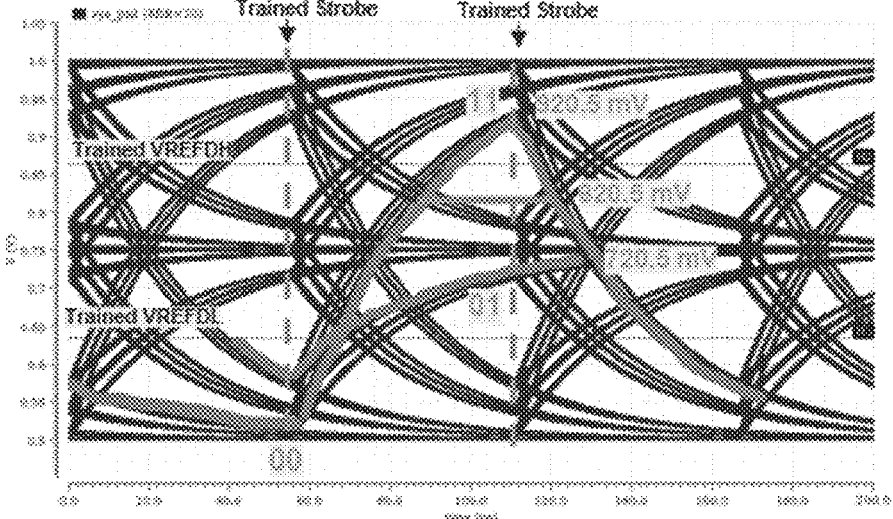
FIG. 17A     *Equalizing upper eye : Previous symbol '00' case*
1702
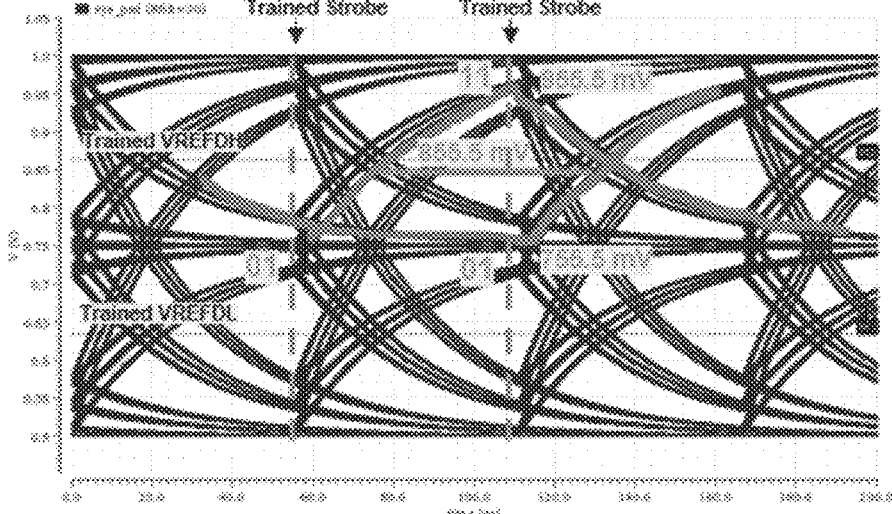
FIG. 17B     *Equalizing upper eye : Previous symbol '01' case*
1704
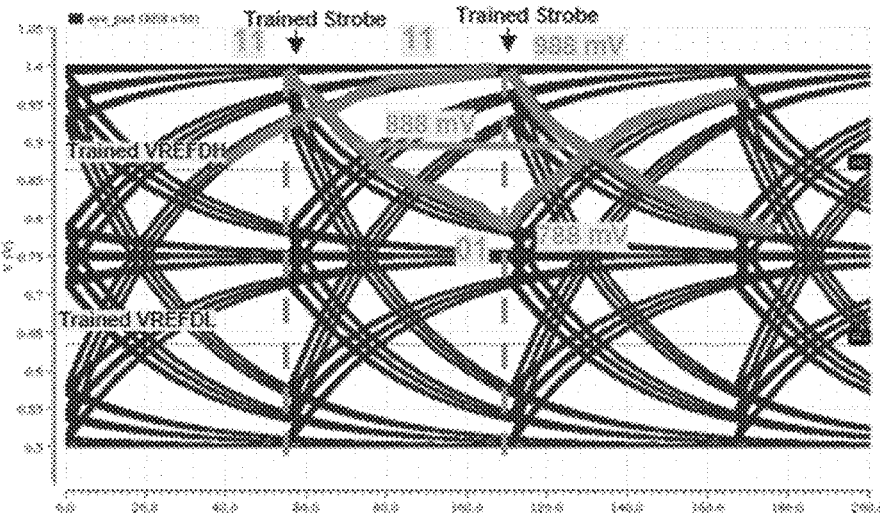
FIG. 17C     *Equalizing upper eye : Previous symbol '11' case*

1800

| Parameter | Value | Unit | Equation |
|---|---|---|---|
| VREFDH_LL_VIL | 723 | mV | |
| VREFDH_LL_VIH | 923 | | |
| VREFDH_LH_VIL | 755.5 | | |
| VREFDH_LH_VIH | 955.5 | | |
| VREFDH_HH_VIL | 788 | | |
| VREFDH_HH_VIH | 988 | | |
| | | | |
| VREFDH_LL | 823 | mV | 0.5*(VREFDH_LL_VIL+VREFDH_LL_VIH) |
| VREFDH_LH | 855.5 | | 0.5*(VREFDH_LH_VIL+VREFDH_LH_VIH) |
| VREFDH_HH | 888 | | 0.5*(VREFDH_HH_VIL+VREFDH_HH_VIH) |

1802

| Previous symbol | | Effective VREF for the incoming symbol | | |
|---|---|---|---|---|
| I_DOUT_DH | I_DOUT_DL | VREFDH_DFE | | Value (mV) |
| 0 | 0 | VREFDH_LL | VREFDH$_{opt}$ - TAPDH_H - TAPDH_L | 823 |
| 0 | 1 | VREFDH_LH | VREFDH$_{opt}$ - TAPDH_H + TAPDH_L | 855.5 |
| 1 | 1 | VREFDH_HH | VREFDH$_{opt}$ + TAPDH_H + TAPDH_L | 888 |

1804

| Parameter | Value | Unit | Equation |
|---|---|---|---|
| VREFDH$_{opt}$ | 855.5 | mV | 0.5*(VREFDH_HH+VREFDH_LL) |
| TAPDH_H | 16.25 | | 0.5*(VREFDH_LH-VREFDH_LL) |
| TAPDH_L | 16.25 | | VREFDH_HH-TAPDL-VREFDH |

FIG. 18

VREFDL_opt and expected tap coefficients TAPDL_L and TAPDL_H obtained using the proposed algorithm

2200 setting a reference voltage for the third comparator to be equal to an LE reference voltage threshold, and setting initial values for the high LE DFE tap-coefficient, the low LE DFE tap-coefficient, the high UE DFE tap-coefficient, the low UE DFE tap-coefficient, a low error DFE tap-coefficient, and a high error DFE tap-coefficient

2202

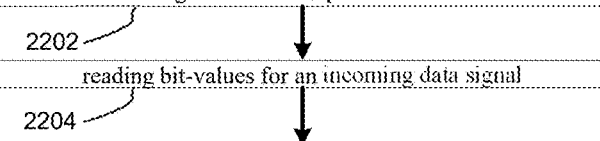

reading bit-values for an incoming data signal

2204 determining if a preceding bit output from the first comparator is a '0' or a '1', if a preceding bit output from the second comparator is a '0' or a '1', and if a current bit output from the second comparator is a '0' or a '1', such that the nature of a signal transition of the incoming data signal is ascertained

2206

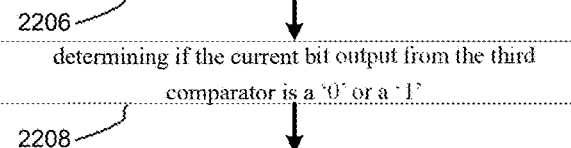

determining if the current bit output from the third comparator is a '0' or a '1'

2208 confirming through use of a de-serializer, that a set of values representing the preceding bit output from the first comparator, the preceding bit output from the second comparator, the current bit output from the second comparator, and the current bit output from the third comparator are at least one of a first set, a second set, or a third set

2210 in response to confirming that the set of values representing the preceding bit output from the first comparator, the preceding bit output from the second comparator, the current bit output from the second comparator, and the current bit output from the third comparator are at least one of the first set, the second set, or the third set, storing the reference voltage for the third comparator voltage as at least one of the second reference voltage, the fourth reference voltage or the sixth reference voltage

2212 resetting the reference voltage of the third comparator to be equal to the initial value for the LE reference voltage threshold

2214 reading bit-values for an incoming data signal

2216 determining if the preceding bit output from the first comparator is a '0' or a '1', if the preceding bit output from the second comparator is a '0' or a '1', and if the current bit output from the second comparator is a '0' or a '1', such that the nature of the signal transition of the incoming data signal is ascertained

2218 determining if the current bit output from the third comparator is a '0' or a '1'

2220 confirming through use of a de-serializer, that the set of values representing the preceding bit output from the first comparator, the preceding bit output from the second comparator, the current bit output from the second comparator, and the current bit output from the third comparator are at least one of a fourth set, a fifth set, or a sixth set

2222 in response to confirming that the set of values representing the preceding bit output from the first comparator, the preceding bit output from the second comparator, the current bit output from the second comparator, and the current bit output from the third comparator are at least one of a fourth set, a fifth set, or a sixth set, storing the reference voltage for the third comparator voltage as at least one of the first reference voltage, the third reference voltage or the fifth reference voltage.

2300 setting a reference voltage for the third comparator to be equal to an LE reference voltage threshold, and setting initial values for the high LE DFE tap-coefficient, the low LE DFE tap-coefficient, the high UE DFE tap-coefficient, the low UE DFE tap-coefficient, a low error DFE tap-coefficient, and a high error DFE tap-coefficient

2302 reading bit-values for an incoming data signal

2304 determining if a preceding bit output from the first comparator is a '0' or a '1', if a preceding bit output from the second comparator is a '0' or a '1', and if a current bit output from the first comparator is a '0' or a '1', such that the nature of a signal transition of the incoming data signal is ascertained

2306 determining if the current bit output from the third comparator is a '0' or a '1'

2308 confirming through use of a de-serializer, that a set of values representing the preceding bit output from the first comparator, the preceding bit output from the second comparator, the current bit output from the first comparator, and the current bit output from the third comparator are at least one of a seventh set, an eighth set, or a ninth set

2310 in response to confirming that the set of values representing the preceding bit output from the first comparator, the preceding bit output from the second comparator, the current bit output from the first comparator, and the current bit output from the third comparator are at least one of the seventh set, the eighth set, or the ninth set, storing the reference voltage for the third comparator voltage as at least one of the seventh reference voltage, the ninth reference voltage or the eleventh reference voltage

Figure 23A:
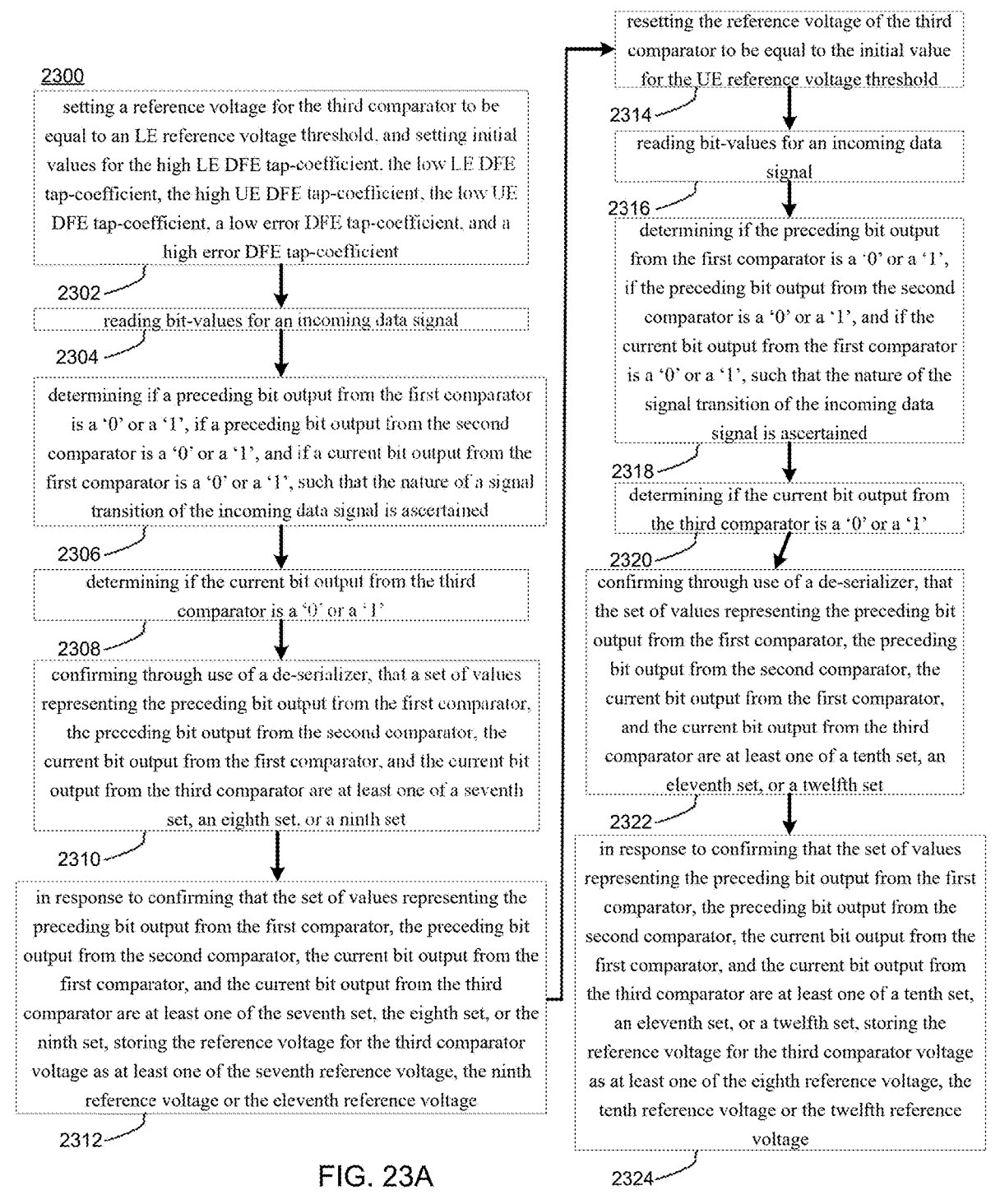

2312

FIG. 23A resetting the reference voltage of the third comparator to be equal to the initial value for the UE reference voltage threshold

2314 reading bit-values for an incoming data signal

2316 determining if the preceding bit output from the first comparator is a '0' or a '1', if the preceding bit output from the second comparator is a '0' or a '1', and if the current bit output from the first comparator is a '0' or a '1', such that the nature of the signal transition of the incoming data signal is ascertained

2318 determining if the current bit output from the third comparator is a '0' or a '1'

2320 confirming through use of a de-serializer, that the set of values representing the preceding bit output from the first comparator, the preceding bit output from the second comparator, the current bit output from the first comparator, and the current bit output from the third comparator are at least one of a tenth set, an eleventh set, or a twelfth set

2322 in response to confirming that the set of values representing the preceding bit output from the first comparator, the preceding bit output from the second comparator, the current bit output from the first comparator, and the current bit output from the third comparator are at least one of a tenth set, an eleventh set, or a twelfth set, storing the reference voltage for the third comparator voltage as at least one of the eighth reference voltage, the tenth reference voltage or the twelfth reference voltage

2324

Figure 23B:
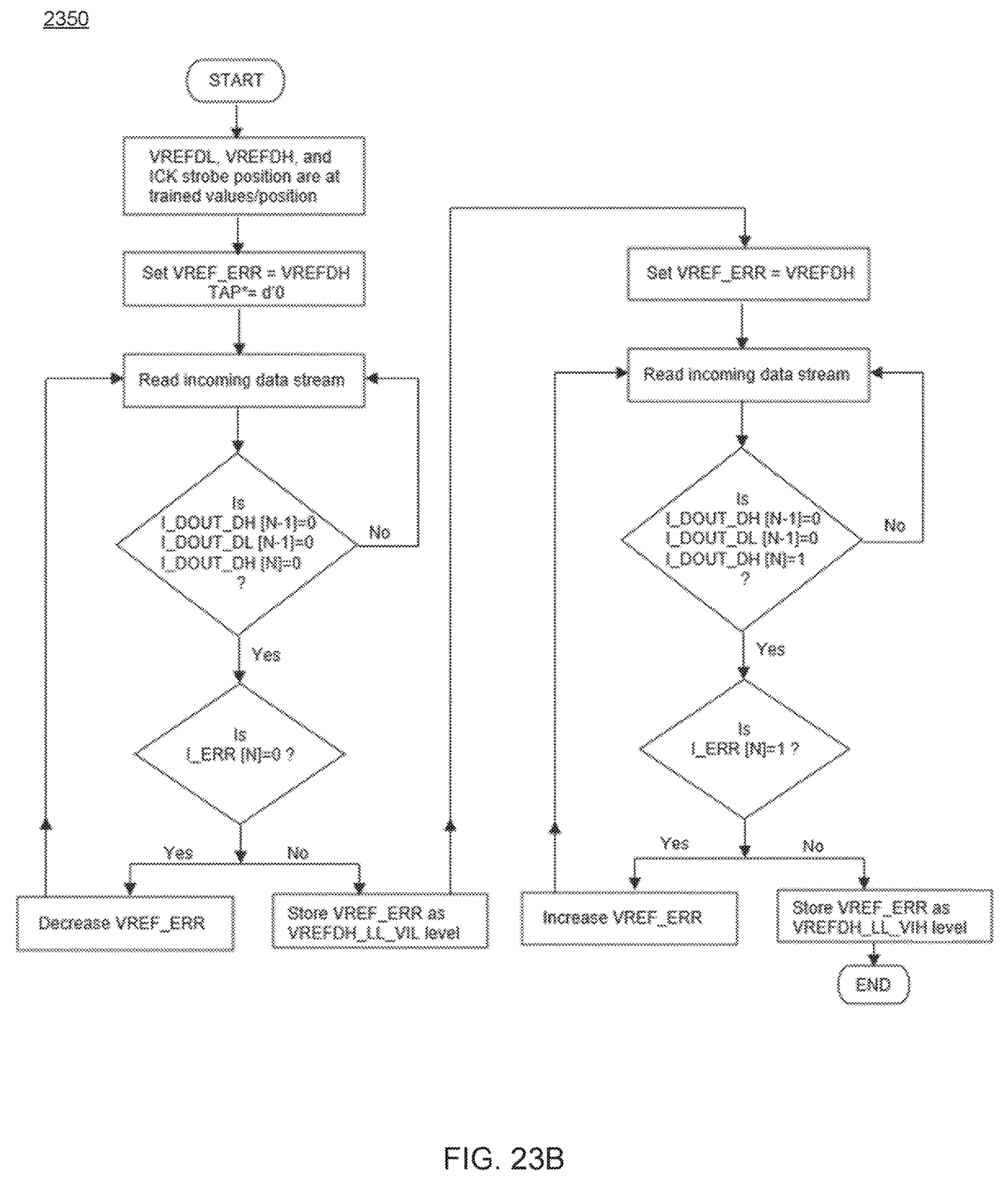

2350

START

VREFDL, VREFDH, and
ICK strobe position are at
trained values/position

Set VREF_ERR = VREFDH
TAP*= d'0

Read incoming data stream

Is
I_DOUT_DH [N-1]=0
I_DOUT_DL [N-1]=0
I_DOUT_DH [N]=0
?

No

Yes

Is
I_ERR [N]=0 ?

Yes          No

Decrease VREF_ERR

Store VREF_ERR as
VREFDH_LL_VIL level

Set VREF_ERR = VREFDH

Read incoming data stream

Is
I_DOUT_DH [N-1]=0
I_DOUT_DL [N-1]=0
I_DOUT_DH [N]=1
?

No

Yes

Is
I_ERR [N]=1 ?

Yes          No

Increase VREF_ERR

Store VREF_ERR as
VREFDH_LL_VIH level

END

*Find TAPDL_L in terms of TAP\* DAC code*

2402

*Find TAPDL_H in terms of TAP\* DAC code*

*Find TAPDH_L in terms of TAP° DAC code*

*Find TAPDH_H in terms of TAP° DAC code*

2600 setting a reference voltage for the third comparator to be equal to a first function of the optimal LE reference voltage minus a first offset voltage, and setting a shared predetermined initial value for the high LE DFE tap-coefficient, the low LE DFE tap-coefficient, the high UE DFE tap-coefficient, the low UE DFE tap-coefficient, a high error DFE tap-coefficient, and a low error DFE tap-coefficient

2602 reading bit-values for an incoming data signal

2604 determining if a preceding bit output from the first comparator is a '0' or a '1', if a preceding bit output from the second comparator is a '0' or a '1', and if a current bit output from the second comparator is a '0' or a '1', such that the nature of a signal transition of the incoming data signal is ascertained

2606 determining if the current bit output from the third comparator is a '0' or a '1'

2608 confirming through use of a de-serializer, that a set of values representing the preceding bit output from the first comparator, the preceding bit output from the second comparator, the current bit output from the second comparator, and the current bit output from the third comparator are equal to a predetermined first set

2610 in response to confirming that the set of values representing the preceding bit output from the first comparator, the preceding bit output from the second comparator, the current bit output from the second comparator, and the current bit output from the third comparator are equal to a predetermined first set, storing the low error DFE tap-coefficient as the low LE DFE tap-coefficient

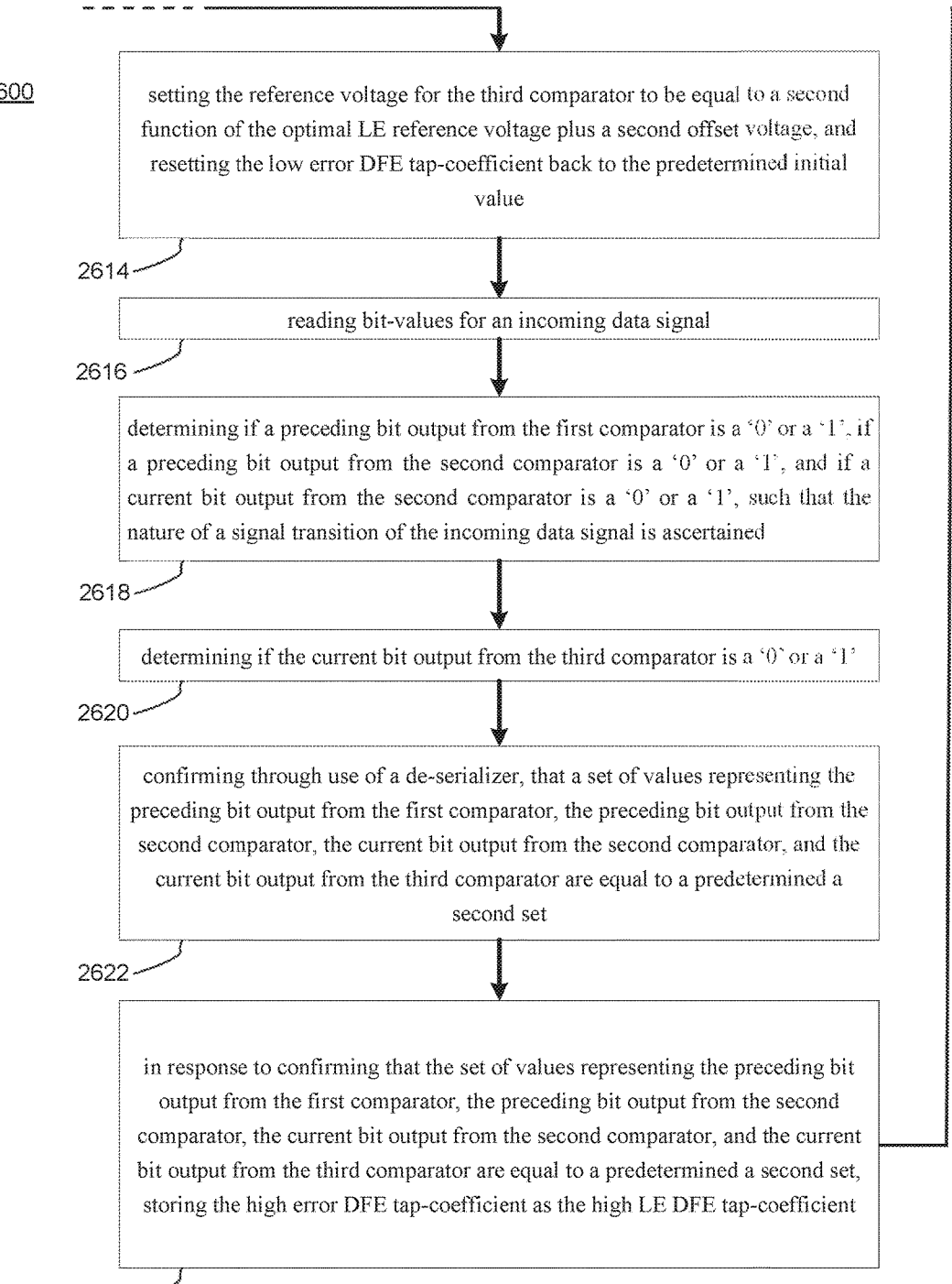

2600 setting the reference voltage for the third comparator to be equal to a second function of the optimal LE reference voltage plus a second offset voltage, and resetting the low error DFE tap-coefficient back to the predetermined initial value

2614 reading bit-values for an incoming data signal

2616 determining if a preceding bit output from the first comparator is a '0' or a '1', if a preceding bit output from the second comparator is a '0' or a '1', and if a current bit output from the second comparator is a '0' or a '1', such that the nature of a signal transition of the incoming data signal is ascertained

2618 determining if the current bit output from the third comparator is a '0' or a '1'

2620 confirming through use of a de-serializer, that a set of values representing the preceding bit output from the first comparator, the preceding bit output from the second comparator, the current bit output from the second comparator, and the current bit output from the third comparator are equal to a predetermined a second set

2622 in response to confirming that the set of values representing the preceding bit output from the first comparator, the preceding bit output from the second comparator, the current bit output from the second comparator, and the current bit output from the third comparator are equal to a predetermined a second set, storing the high error DFE tap-coefficient as the high LE DFE tap-coefficient

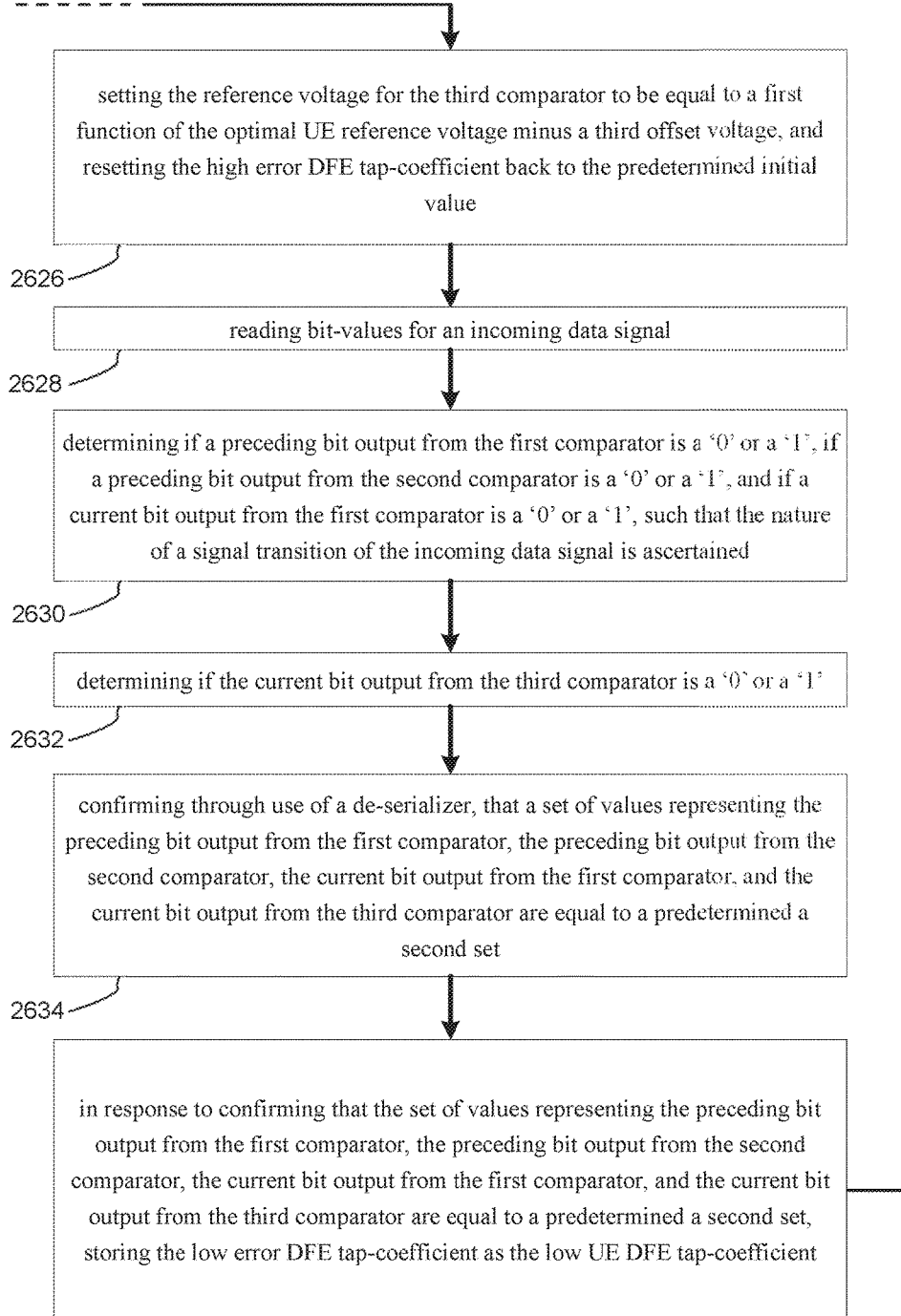

2600 setting the reference voltage for the third comparator to be equal to a first function of the optimal UE reference voltage minus a third offset voltage, and resetting the high error DFE tap-coefficient back to the predetermined initial value

2626 reading bit-values for an incoming data signal

2628 determining if a preceding bit output from the first comparator is a '0' or a '1', if a preceding bit output from the second comparator is a '0' or a '1', and if a current bit output from the first comparator is a '0' or a '1', such that the nature of a signal transition of the incoming data signal is ascertained

2630 determining if the current bit output from the third comparator is a '0' or a '1'

2632 confirming through use of a de-serializer, that a set of values representing the preceding bit output from the first comparator, the preceding bit output from the second comparator, the current bit output from the first comparator, and the current bit output from the third comparator are equal to a predetermined a second set

2634 in response to confirming that the set of values representing the preceding bit output from the first comparator, the preceding bit output from the second comparator, the current bit output from the first comparator, and the current bit output from the third comparator are equal to a predetermined a second set, storing the low error DFE tap-coefficient as the low UE DFE tap-coefficient

2600 setting the reference voltage for the third comparator to be equal to a second function of the optimal UE reference voltage plus a fourth offset voltage, and resetting the low error DFE tap-coefficient back to the predetermined initial value

2638 reading bit-values for an incoming data signal

2640 determining if a preceding bit output from the first comparator is a '0' or a '1', if a preceding bit output from the second comparator is a '0' or a '1', and if a current bit output from the first comparator is a '0' or a '1', such that the nature of a signal transition of the incoming data signal is ascertained

2642 determining if the current bit output from the third comparator is a '0' or a '1'

2644 confirming through use of a de-serializer, that a set of values representing the preceding bit output from the first comparator, the preceding bit output from the second comparator, the current bit output from the first comparator, and the current bit output from the third comparator are equal to a predetermined a second set

2646 in response to confirming that the set of values representing the preceding bit output from the first comparator, the preceding bit output from the second comparator, the current bit output from the first comparator, and the current bit output from the third comparator are equal to a predetermined a second set, storing the high error DFE tap-coefficient as the high UE DFE tap-coefficient

| Lower eye | | | |
|---|---|---|---|
| Parameter | Value | Unit | Equation |
| VREFDL_LL_VIL   (Y1) | 532 | | |
| VREFDL_LL_VIH   (X1) | 732 | mV | |
| VREFDL_LH_VIL | 544.5 | | |
| VREFDL_LH_VIH | 744.5 | | |
| VREFDL_HH_VIL   (Y2) | 577 | | |
| VREFDL_HH_VIH   (X2) | 777 | | |
| VREFDL_LL | 632 | mV | 0.5*(VREFDL_LL_VIL+VREFDL_LL_VIH) |
| VREFDL_LH | 644.5 | | 0.5*(VREFDL_LH_VIL+VREFDL_LH_VIH) |
| VREFDL_HH | 677 | | 0.5*(VREFDL_HH_VIL+VREFDL_HH_VIH) |
| VREFDL_avg | 644.5 | mV | 0.5*(VREFDL_HH+VREFDL_LL) |
| VREFDL1 | 628.25 | | 0.5*(VREFDL_LL+VREFDL_LH) |
| VREFDL2 | 660.75 | | 0.5*(VREFDL_LH+VREFDL_HH) |
| OFFSET1 | 100 | mV | 0.5*(VREFDL_LL_VIH-VREFDL_LL_VIL) |
| OFFSET2 | 100 | | 0.5*(VREFDL_HH_VIH-VREFDL_HH_VIL) |
| Z1 | 528.25 | mV | VREFDL1 - OFFSET1 |
| Z2 | 760.75 | | VREFDL2+OFFSET2 |
| TAPDX_L | 16.25 | mV | Z1 - Y1 |
| TAPDX_H | 16.25 | | X2 - Z2 |

2802

| Upper eye | | | |
|---|---|---|---|
| Parameter | Value | Unit | Equation |
| VREFDH_LL_VIL   (Y3) | 723 | | |
| VREFDH_LL_VIH   (X3) | 923 | | |
| VREFDH_LH_VIL | 755.5 | mV | |
| VREFDH_LH_VIH | 955.5 | | |
| VREFDH_HH_VIL   (Y4) | 788 | | |
| VREFDH_HH_VIH   (X4) | 988 | | |
| VREFDH_LL | 823 | | 0.5*(VREFDH_LL_VIL+VREFDH_LL_VIH) |
| VREFDH_LH | 855.5 | mV | 0.5*(VREFDH_LH_VIL+VREFDH_LH_VIH) |
| VREFDH_HH | 888 | | 0.5*(VREFDH_HH_VIL+VREFDH_HH_VIH) |
| VREFDH_avg | 855.5 | mV | 0.5*(VREFDH_HH+VREFDH_LL) |
| VREFDH1 | 839.25 | | |
| VREFDH2 | 871.75 | | |
| OFFSET3 | 100 | mV | 0.5*(VREFDH_LL_VIH-VREFDH_LL_VIL) |
| OFFSET4 | 100 | | 0.5*(VREFDH_HH_VIH-VREFDH_HH_VIL) |
| Z3 | 739.25 | mV | VREFDH1 - OFFSET3 |
| Z4 | 971.75 | | VREFDH2+OFFSET4 |
| TAPDX_L | 16.25 | mV | Z3 - Y3 |
| TAPDX_H | 16.25 | | X4 - Z4 |

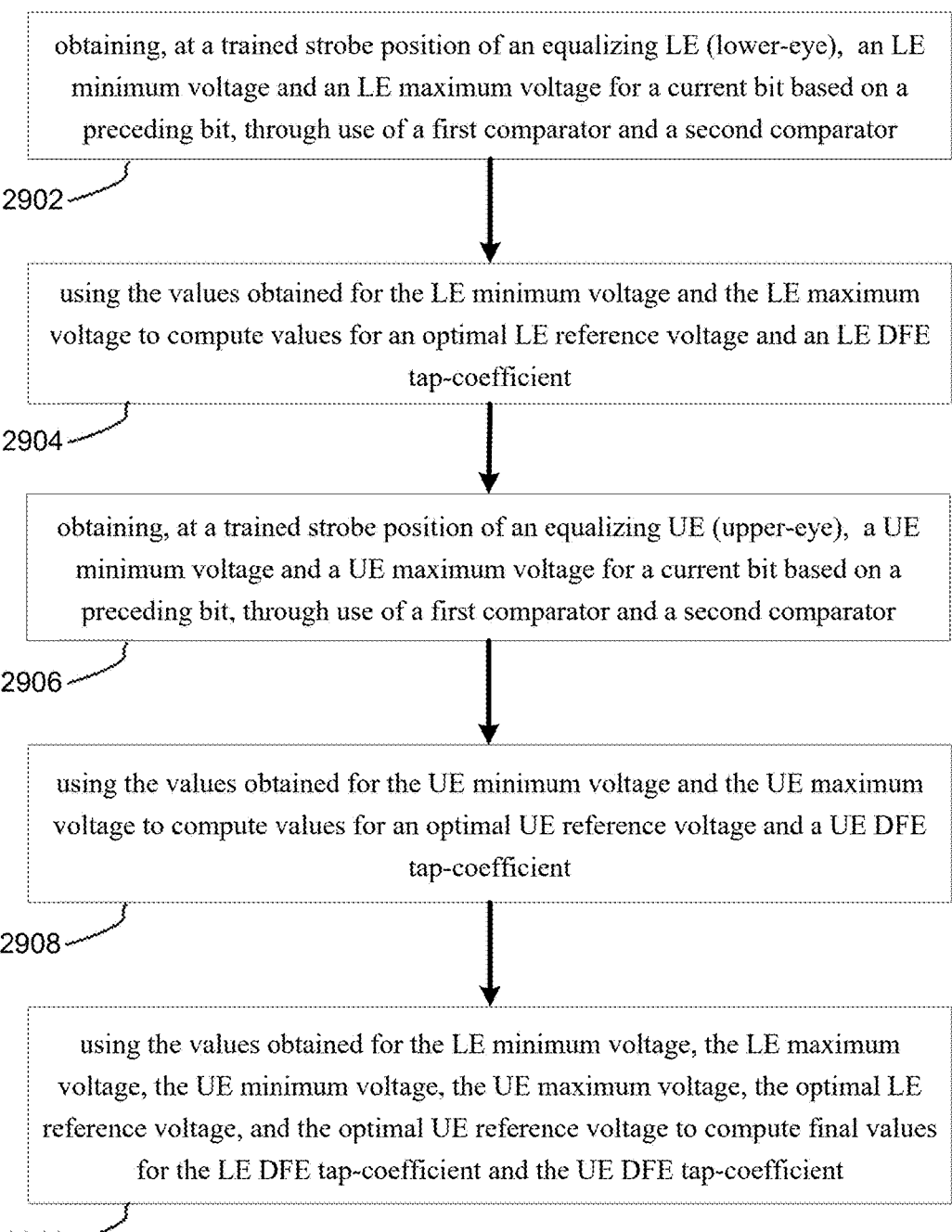

obtaining, at a trained strobe position of an equalizing LE (lower-eye), an LE minimum voltage and an LE maximum voltage for a current bit based on a preceding bit, through use of a first comparator and a second comparator

2902 using the values obtained for the LE minimum voltage and the LE maximum voltage to compute values for an optimal LE reference voltage and an LE DFE tap-coefficient

2904 obtaining, at a trained strobe position of an equalizing UE (upper-eye), a UE minimum voltage and a UE maximum voltage for a current bit based on a preceding bit, through use of a first comparator and a second comparator

2906 using the values obtained for the UE minimum voltage and the UE maximum voltage to compute values for an optimal UE reference voltage and a UE DFE tap-coefficient

2908 using the values obtained for the LE minimum voltage, the LE maximum voltage, the UE minimum voltage, the UE maximum voltage, the optimal LE reference voltage, and the optimal UE reference voltage to compute final values for the LE DFE tap-coefficient and the UE DFE tap-coefficient

3000 obtaining, at a trained strobe position of an equalizing LE (lower-eye), an LE minimum voltage, a mid-level LE voltage, and an LE maximum voltage for a current symbol based on a preceding symbol, through use of a first comparator, a second comparator, and a third comparator

3002 using the values obtained for the LE minimum voltage, the mid-level LE voltage, and the LE maximum voltage to compute values for an optimal LE reference voltage, a high LE DFE tap-coefficient, and a low LE DFE tap-coefficient

3004 obtaining, at a trained strobe position of an equalizing UE (upper-eye), a UE minimum voltage, a mid-level UE voltage, and a UE maximum voltage for the current symbol based on the preceding symbol, through use of the first comparator, the second comparator, and the third comparator

3006 using the values obtained for the UE minimum voltage, the mid-level UE voltage, and the UE maximum voltage to compute values for an optimal UE reference voltage, a high UE DFE tap-coefficient, and a low UE DFE tap-coefficient

3008 using the values obtained for the LE minimum voltage, the mid-level LE voltage, the LE maximum voltage, and the optimal LE reference voltage to compute final values for the high LE DFE tap-coefficient and the low LE DFE tap-coefficient

3010 using the values obtained for the UE minimum voltage, the mid-level UE voltage, the UE maximum voltage, and the optimal UE reference voltage to compute final values for the high UE DFE tap-coefficient and the low UE DFE tap-coefficient

DECISION FEEDBACK EQUALIZATION TRAINING FOR SINGLE-ENDED RECEIVER

DISCUSSION OF THE RELATED ART

Conventional computing devices may be implemented with a microprocessor, memory, and a number of other modules depending on the function to be performed by the computing device. Double data rate (DDR) random access memory (RAM) may be a particular type of RAM commonly used in current technology that may perform two read accesses or two write accesses per clock cycle. Microprocessors and DDR RAM may both operate on various power supply voltages. Interface circuits that may convert between different signal levels and different drive levels may be used to allow for compatible communications between microprocessors and memory devices.

The 7th generation Graphics double data rate (GDDR7) protocol may be a state-of-the-art, multibit, single-ended, parallel data transmission protocol supporting up to 24G symbols/s/bit using 3-level pulse amplitude modulation (PAM3) signaling. Decision Feedback Equalization (DFE) training schemes may be used to improve the physical layer (PHY) read timing and voltage margins for the GDDR7 interface. Conventional DFE training schemes take a sign-sign least mean squares (LMS) approach. The sign-sign LMS approach may be a variation of the LMS algorithm designed to update filter coefficients based on quantized or discrete feedback. More specifically, the sign-sign LMS approach may deal with scenarios where a decision feedback filter (DF) uses sign information rather than the actual symbol values for coefficient updates.

SUMMARY

In one or more embodiments of the present disclosure, a partial equalization DFE (decision feedback equalization) training method, for use with a single-ended receiver is provided. The method may include obtaining, at a trained strobe position of an equalizing LE (lower-eye), an LE minimum voltage and an LE maximum voltage for a current bit based on a preceding bit, through use of a first comparator and a second comparator. The method may further include, using the values obtained for the LE minimum voltage and the LE maximum voltage to compute values for an optimal LE reference voltage and an LE DFE tap-coefficient, obtaining, at a trained strobe position of an equalizing UE (upper-eye), a UE minimum voltage and a UE maximum voltage for the current bit based on the preceding bit, through use of the first comparator and the second comparator, and using the values obtained for the UE minimum voltage and the UE maximum voltage to compute values for an optimal UE reference voltage and a UE DFE tap-coefficient. The method may also include, using the values obtained for the LE minimum voltage, the LE maximum voltage, the UE minimum voltage, the UE maximum voltage, the optimal LE reference voltage, and the optimal UE reference voltage to compute final values for the LE DFE tap-coefficient and the UE DFE tap-coefficient.

One or more of the following features may be included. If the preceding bit may be a '0' while in the process of obtaining the LE minimum voltage and the LE maximum voltage, then a first reference voltage representing a minimum value of a [0 to 1] signal transition and a second reference voltage representing a maximum value of a [0 to 0] signal transition may be measured and then averaged together to obtain the LE minimum voltage. If the preceding bit may be a '1' while in the process of obtaining the LE minimum voltage and the LE maximum voltage, then a third reference voltage representing a minimum value of a [1 to 1] signal transition and a fourth reference voltage representing a maximum value of a [1 to 0] signal transition may be measured and then averaged to obtain the LE maximum voltage. The process of obtaining the LE minimum voltage and the LE maximum voltage may further include setting a reference voltage for the second comparator to be equal to an LE reference voltage threshold, and setting initial values for the LE DFE tap-coefficient and the UE DFE tap-coefficient, reading bit-values for an incoming data signal, and determining if the preceding bit output from the first comparator may be a '0' or a '1' and if the current bit output from the first comparator may be a '0' or a '1', such that the nature of the signal transition at the first comparator may be ascertained. The process of obtaining the LE minimum voltage and the LE maximum voltage may further include determining if the current bit output from the second comparator may be a '0' or a '1', confirming through use of a de-serializer, that a set of values representing the preceding bit output from the first comparator, the current bit output from the first comparator, and the current bit output from the second comparator may be either a first set or a second set. The process of obtaining the LE minimum voltage and the LE maximum voltage may further include, in response to confirming that the set of values representing the preceding bit output from the first comparator, the current bit output from the first comparator, and the current bit output from the second comparator may be either a first set or a second set, storing the reference voltage for the second comparator as either the first reference voltage or the third reference voltage. The process of obtaining the LE minimum voltage and the LE maximum voltage may further include resetting the reference voltage of the second comparator to be equal to the initial value for the LE reference voltage threshold, reading bit-values for the incoming data signal, and determining if the preceding bit output from the first comparator may be a '0' or a '1' and if the current bit output from the first comparator may be a '0' or a '1', such that the nature of the signal transition at the first comparator may be ascertained. The process of obtaining the LE minimum voltage and the LE maximum voltage may further include determining if the current bit output from the second comparator may be a '0' or a '1', confirming through use of the de-serializer, that the set of values representing the preceding bit output from the first comparator, the current bit output from the first comparator, and the current bit output from the second comparator may be either a third set, or a fourth set, and in response to confirming that the set of values representing the preceding bit output from the first comparator, the current bit output from the first comparator, and the current bit output from the second comparator may be either a third set, or a fourth set, storing the reference voltage for the second comparator as either the second reference voltage or the fourth reference voltage. If the preceding bit may be a '0' while in the process of obtaining the UE minimum voltage and the UE maximum voltage, then a fifth reference voltage representing a maximum value of a [0 to 0] signal transition and a sixth reference voltage representing a minimum value of a [0 to 1] signal transition may be measured and then averaged together to obtain the UE minimum voltage. If the preceding bit may be a '1' while in the process of obtaining the UE minimum voltage and the UE maximum voltage, then a seventh reference voltage representing a maximum value of a [1 to 0] signal transition and an eighth reference voltage representing a minimum value of a [1 to 1] signal transition may be measured and then averaged to obtain the UE maximum voltage. The process of obtaining the UE minimum voltage and the UE maximum voltage may further include setting a reference voltage for the first comparator to be equal to a UE reference voltage threshold, and setting initial values for the UE DFE tap-coefficient and the LE DFE tap-coefficient, reading bit-values for an incoming data signal, and determining if the preceding bit output from the second comparator may be a '0' or a '1' and if the current bit output from the second comparator may be a '0' or a '1', such that the nature of the signal transition at the second comparator may be ascertained. The process of obtaining the UE minimum voltage and the UE maximum voltage may further include determining if the current bit output from the first comparator may be a '0' or a '1', confirming through use of a de-serializer, that a set of values representing the preceding bit output from the second comparator, the current bit output from the second comparator, and the current bit output from the first comparator may be either a fifth set, or a sixth set, and in response to confirming that the set of values representing the preceding bit output from the second comparator, the current bit output from the second comparator, and the current bit output from the first comparator may be either the fifth set, or the sixth set, storing the reference voltage for the first comparator as either the fifth reference voltage or the seventh reference voltage. The process of obtaining the UE minimum voltage and the UE maximum voltage may further include resetting the reference voltage for the first comparator to be equal to the initial value for the UE reference voltage threshold, reading bit-values for the incoming data signal, and determining if the preceding bit output from the second comparator may be a '0' or a '1' and if the current bit output from the second comparator may be a '0' or a '1', such that the nature of the signal transition at the second comparator may be ascertained. The process of obtaining the UE minimum voltage and the UE maximum voltage may further include determining if the current bit output from the first comparator may be a '0' or a '1', confirming through use of the de-serializer, that the set of values representing the preceding bit output from the second comparator, the current bit output from the second comparator, and the current bit output from the first comparator may be either a seventh set, or an eighth set, and in response to confirming that the set of values representing the preceding bit output from the second comparator, the current bit output from the second comparator, and the current bit output from the first comparator may be either the seventh set or the eighth, storing the reference voltage for the second comparator as either the sixth reference voltage or the eighth reference voltage. The process of computing final values for the LE DFE tap-coefficient and the UE DFE tap-coefficient may further include setting a reference voltage for the first comparator to be equal to the optimal LE reference voltage, setting a reference voltage for the second comparator to be equal to the optimal LE reference voltage minus a first offset voltage, and setting the LE DFE tap-coefficient and the UE DFE tap-coefficient to both be equal to a predetermined initial value. The process of computing final values for the LE DFE tap-coefficient and the UE DFE tap-coefficient may further include reading bit-values for an incoming data signal, determining if the preceding bit output from the first comparator may be a '0' or a '1' and if the current bit output from the first comparator may be a '0' or a '1', such that the nature of the signal transition at the first comparator may be ascertained, and determining if the current bit output from the second comparator may be a '0' or a '1'. The process of computing final values for the LE DFE tap-coefficient and the UE DFE tap-coefficient may further include confirming through use of a de-serializer, that a set of values representing the preceding bit output from the first comparator, the current bit output from the first comparator, and the current bit output from the second comparator may be equal to a predetermined first set, and in response to confirming that the set of values representing the preceding bit output from the first comparator, the current bit output from the first comparator, and the current bit output from the second comparator may be equal to the predetermined first set, storing the reference voltage for the first comparator as the final value for the LE DFE tap-coefficient. The process of computing final values for the LE DFE tap-coefficient and the UE DFE tap-coefficient may further include resetting the reference voltage for the second comparator to be equal to the optimal UE reference voltage, resetting a reference voltage for the first comparator to be equal to the optimal UE reference voltage plus a second offset voltage, and resetting the LE DFE tap-coefficient and the UE DFE tap-coefficient to be equal to the predetermined initial value. The process of computing final values for the LE DFE tap-coefficient and the UE DFE tap-coefficient may further include reading bit-values for the incoming data signal, determining if the preceding bit output from the second comparator may be a '0' or a '1' and if the current bit output from the second comparator may be a '0' or a '1', such that the nature of the signal transition at the second comparator may be ascertained, and determining if the current bit output from the first comparator may be a '0' or a '1'. The process of computing final values for the LE DFE tap-coefficient and the UE DFE tap-coefficient may further include confirming through use of the de-serializer, that the set of values representing the preceding bit output from the second comparator, the current bit output from the second comparator, and the current bit output from the first comparator may be equal to a predetermined second set, and in response to confirming that the set of values representing the preceding bit output from the second comparator, the current bit output from the second comparator, and the current bit output from the first comparator may be equal to the predetermined second set, storing the reference voltage for the second comparator as the final value for the UE DFE tap-coefficient. The first comparator may be configured to be used as a reference receiver and the second comparator may be configured to be used as an error receiver while computing the LE DFE tap-coefficient, and conversely, the second comparator may be configured to be used as the reference receiver and the first comparator may be configured to be used as the error receiver while computing the UE DFE tap-coefficient.

In one or more embodiments of the present disclosure, a receiver circuit of a physical layer (PHY) of a memory controller is provided. The receiver circuit may include, a data pad configured to receive an input signal from a dynamic random access memory (DRAM) device, a first comparator operatively connected to the data pad and configured to receive a UE (upper-eye) reference voltage, and a second comparator operatively connected to the data pad and configured to receive an LE (lower-eye) reference voltage. The receiver circuit may also include, a de-serializer operatively connected to both the first comparator and the second comparator, the de-serializer may be configured to receive a first output from the first comparator, and a second output from a second comparator, and a computer-readable storage medium having instructions stored thereon that when executed by a machine may result in one or more operations.

One or more of the following features may be included. The one or more operations may include, setting a reference voltage for the second comparator to be equal to an LE reference voltage threshold, and setting an initial value for the LE DFE tap-coefficient, reading bit-values for an incoming data signal, and determining if a preceding bit output from the first comparator may be a '0' or a '1' and if a current bit output from the first comparator may be a '0' or a '1', such that the nature of the signal transition at the first comparator may be ascertained. The one or more operations may also include, determining if a current bit output from the second comparator may be a '0' or a '1', confirming through use of the de-serializer, that a set of values representing the preceding bit output from the first comparator, the current bit output from the first comparator, and the current bit output from the second comparator may be either a first set, or a second set, and in response to confirming that the set of values representing the preceding bit output from the first comparator, the current bit output from the first comparator, and the current bit output from the second comparator may be either a first set or a second set, storing the reference voltage for the second comparator as either the first reference voltage or the third reference voltage. The one or more operations may further include, resetting the reference voltage of the second comparator to be equal to the initial value for the LE reference voltage threshold, reading bit-values for the incoming data signal, determining if the preceding bit output from the first comparator may be a '0' or a '1' and if the current bit output from the first comparator may be a '0' or a '1', such that the nature of the signal transition at the first comparator may be ascertained. The one or more operations may include, determining if the current bit output from the second comparator may be a '0' or a '1', confirming through use of the de-serializer, that the set of values representing the preceding bit output from the first comparator, the current bit output from the first comparator, and the current bit output from the second comparator may be either a third set, or a fourth set, and in response to confirming that the set of values representing the preceding bit output from the first comparator, the current bit output from the first comparator, and the current bit output from the second comparator may be either a third set, or a fourth set, storing the reference voltage for the second comparator as either the second reference voltage or the fourth reference voltage. The first comparator may be configured to be used as a reference receiver and the second comparator may be configured to be used as an error receiver while computing the LE DFE tap-coefficient, and conversely, the second comparator may be configured to be used as the reference receiver and the first comparator may be configured to be used as the error receiver while computing the UE DFE tap-coefficient.

In one or more embodiments of the present disclosure, a full equalization DFE (decision feedback equalization) training method, for use with a receiver is provided. The method may include obtaining, at a trained strobe position of an equalizing LE (lower-eye), an LE minimum voltage, a mid-level LE voltage, and an LE maximum voltage for a current symbol based on a preceding symbol, through use of a first comparator, a second comparator, and a third comparator, using the values obtained for the LE minimum voltage, the mid-level LE voltage, and the LE maximum voltage to compute values for an optimal LE reference voltage, a high LE DFE tap-coefficient, and a low LE DFE tap-coefficient, and obtaining, at a trained strobe position of an equalizing UE (upper-eye), a UE minimum voltage, a mid-level UE voltage, and a UE maximum voltage for the current symbol based on the preceding symbol, through use of the first comparator, the second comparator, and the third comparator. The method may further include using the values obtained for the UE minimum voltage, the mid-level UE voltage, and the UE maximum voltage to compute values for an optimal UE reference voltage, a high UE DFE tap-coefficient, and a low UE DFE tap-coefficient, using the values obtained for the LE minimum voltage, the mid-level LE voltage, the LE maximum voltage, and the optimal LE reference voltage to compute final values for the high LE DFE tap-coefficient and the low LE DFE tap-coefficient, and using the values obtained for the UE minimum voltage, the mid-level UE voltage, the UE maximum voltage, and the optimal UE reference voltage to compute final values for the high UE DFE tap-coefficient and the low UE DFE tap-coefficient.

One or more of the following features may be included. If the preceding symbol may be a '00' while in the process of obtaining the LE minimum voltage and the LE maximum voltage, then a first reference voltage representing a minimum value of a [00 to 01] signal transition and a second reference voltage representing a maximum value of a [00 to 00] signal transition may be measured and then averaged together to obtain the LE minimum voltage. If the preceding symbol may be a '01' while in the process of obtaining the LE minimum voltage and the LE maximum voltage, then a third reference voltage representing a minimum value of a [01 to 01] signal transition and a fourth reference voltage representing a maximum value of a [01 to 00] signal transition may be measured and then averaged to obtain a mid-level LE voltage. If the preceding symbol may be a '11' while in the process of obtaining the LE minimum voltage and the LE maximum voltage, then a fifth reference voltage representing a minimum value of a [11 to 01] signal transition and a sixth reference voltage representing a maximum value of a [11 to 00] signal transition may be measured and then averaged together to obtain the LE maximum voltage. The process of obtaining the LE minimum voltage, the mid-level LE voltage, and the LE maximum voltage may further include setting a reference voltage for the third comparator to be equal to an LE reference voltage threshold, and setting initial values for the high LE DFE tap-coefficient, the low LE DFE tap-coefficient, the high UE DFE tap-coefficient, the low UE DFE tap-coefficient, a low error DFE tap-coefficient, and a high error DFE tap-coefficient, reading bit-values for an incoming data signal, and determining if a preceding bit output from the first comparator may be a '0' or a '1', if a preceding bit output from the second comparator may be a '0' or a '1', and if a current bit output from the second comparator may be a '0' or a '1', such that the nature of a signal transition of the incoming data signal may be ascertained. The process of obtaining the LE minimum voltage, the mid-level LE voltage, and the LE maximum voltage may further include determining if the current bit output from the third comparator may be a '0' or a '1', confirming through use of a de-serializer, that a set of values representing the preceding bit output from the first comparator, the preceding bit output from the second comparator, the current bit output from the second comparator, and the current bit output from the third comparator may be at least one of a first set, a second set, or a third set, and in response to confirming that the set of values representing the preceding bit output from the first comparator, the preceding bit output from the second comparator, the current bit output from the second comparator, and the current bit output from the third comparator may be at least one of the first set, the second set, or the third set, storing the reference voltage for the third comparator voltage as at least one of the second reference voltage, the fourth reference voltage or the sixth reference voltage. The process of obtaining the LE minimum voltage, the mid-level LE voltage, and the LE maximum voltage may further include resetting the reference voltage of the third comparator to be equal to the initial value for the LE reference voltage threshold, reading bit-values for the incoming data signal, and determining if the preceding bit output from the first comparator may be a '0' or a '1', if the preceding bit output from the second comparator may be a '0' or a '1', and if the current bit output from the second comparator may be a '0' or a '1', such that the nature of the signal transition of the incoming data signal may be ascertained. The process of obtaining the LE minimum voltage, the mid-level LE voltage, and the LE maximum voltage may further include determining if the current bit output from the third comparator may be a '0' or a '1', confirming through use of a de-serializer, that the set of values representing the preceding bit output from the first comparator, the preceding bit output from the second comparator, the current bit output from the second comparator, and the current bit output from the third comparator may be at least one of a fourth set, a fifth set, or a sixth set, and in response to confirming that the set of values representing the preceding bit output from the first comparator, the preceding bit output from the second comparator, the current bit output from the second comparator, and the current bit output from the third comparator may be at least one of a fourth set, a fifth set, or a sixth set, storing the reference voltage for the third comparator voltage as at least one of the first reference voltage, the third reference voltage or the fifth reference voltage. If the preceding symbol may be a '00' while in the process of obtaining the UE minimum voltage and the UE maximum voltage, then a seventh reference voltage representing a maximum value of a [00 to 01] signal transition and an eighth reference voltage representing a minimum value of a [00 to 11] signal transition may be measured and then averaged together to obtain the UE minimum voltage. If the preceding symbol may be a '01' while in the process of obtaining the UE minimum voltage and the UE maximum voltage, then a ninth reference voltage representing a maximum value of a [01 to 01] signal transition and a tenth reference voltage representing a minimum value of a [01 to 11] signal transition may be measured and then averaged to obtain a mid-level UE voltage. If the preceding symbol may be a '11' while in the process of obtaining the UE minimum voltage and the UE maximum voltage, then an eleventh reference voltage representing a maximum value of a [11 to 01] signal transition and a twelfth reference voltage representing a minimum value of a [11 to 11] signal transition may be measured and then averaged together to obtain the UE maximum voltage. The process of obtaining the UE minimum voltage and the UE maximum voltage may further include setting a reference voltage for the third comparator to be equal to an LE reference voltage threshold, and setting initial values for the high LE DFE tap-coefficient, the low LE DFE tap-coefficient, the high UE DFE tap-coefficient, the low UE DFE tap-coefficient, a low error DFE tap-coefficient, and a high error DFE tap-coefficient, determining if a preceding bit output from the first comparator may be a '0' or a '1', if a preceding bit output from the second comparator may be a '0' or a '1', and if a current bit output from the first comparator may be a '0' or a '1', such that the nature of a signal transition of the incoming data signal may be ascertained. The process of obtaining the UE minimum voltage and the UE maximum voltage may further include determining if the current bit output from the third comparator may be a '0' or a '1', confirming through use of a de-serializer, that a set of values representing the preceding bit output from the first comparator, the preceding bit output from the second comparator, the current bit output from the first comparator, and the current bit output from the third comparator may be at least one of a seventh set, an eighth set, or a ninth set, and in response to confirming that the set of values representing the preceding bit output from the first comparator, the preceding bit output from the second comparator, the current bit output from the first comparator, and the current bit output from the third comparator may be at least one of the seventh set, the eighth set, or the ninth set, storing the reference voltage for the third comparator voltage as at least one of the seventh reference voltage, the ninth reference voltage or the eleventh reference voltage. The process of obtaining the UE minimum voltage and the UE maximum voltage may further include resetting the reference voltage of the third comparator to be equal to the initial value for the UE reference voltage threshold, reading bit-values for the incoming data signal, and determining if the preceding bit output from the first comparator may be a '0' or a '1', if the preceding bit output from the second comparator may be a '0' or a '1', and if the current bit output from the first comparator may be a '0' or a '1', such that the nature of the signal transition of the incoming data signal may be ascertained. The process of obtaining the UE minimum voltage and the UE maximum voltage may further include determining if the current bit output from the third comparator may be a '0' or a '1', confirming through use of a de-serializer, that the set of values representing the preceding bit output from the first comparator, the preceding bit output from the second comparator, the current bit output from the first comparator, and the current bit output from the third comparator may be at least one of a tenth set, an eleventh set, or a twelfth set, and in response to confirming that the set of values representing the preceding bit output from the first comparator, the preceding bit output from the second comparator, the current bit output from the first comparator, and the current bit output from the third comparator may be at least one of a tenth set, an eleventh set, or a twelfth set, storing the reference voltage for the third comparator voltage as at least one of the eighth reference voltage, the tenth reference voltage or the twelfth reference voltage. The process of computing final values for the high LE DFE tap-coefficient, the low LE DFE tap-coefficient, the high UE DFE tap-coefficient, and the low UE DFE tap-coefficient may further include setting a reference voltage for the third comparator to be equal to a first function of the optimal LE reference voltage minus a first offset voltage, and setting a shared predetermined initial value for the high LE DFE tap-coefficient, the low LE DFE tap-coefficient, the high UE DFE tap-coefficient, the low UE DFE tap-coefficient, a high error DFE tap-coefficient, and a low error DFE tap-coefficient, reading bit-values for an incoming data signal, and determining if a preceding bit output from the first comparator may be a '0' or a '1', if a preceding bit output from the second comparator may be a '0' or a '1', and if a current bit output from the second comparator may be a '0' or a '1', such that the nature of a signal transition of the incoming data signal may be ascertained. The process of computing final values for the high LE DFE tap-coefficient, the low LE DFE tap-coefficient, the high UE DFE tap-coefficient, and the low UE DFE tap-coefficient may further include determining if the current bit output from the third comparator may be a '0' or a '1', confirming through use of a de-serializer, that a set of values representing the preceding bit output from the first comparator, the preceding bit output from the second comparator, the current bit output from the second comparator, and the current bit output from the third comparator may be equal to a predetermined first set, and in response to confirming that the set of values representing the preceding bit output from the first comparator, the preceding bit output from the second comparator, the current bit output from the second comparator, and the current bit output from the third comparator may be equal to a predetermined first set, storing the low error DFE tap-coefficient as the low LE DFE tap-coefficient. The process of computing final values for the high LE DFE tap-coefficient, the low LE DFE tap-coefficient, the high UE DFE tap-coefficient, and the low UE DFE tap-coefficient may further include setting the reference voltage for the third comparator to be equal to a second function of the optimal LE reference voltage plus a second offset voltage, and resetting the low error DFE tap-coefficient back to the predetermined initial value, reading bit-values for an incoming data signal, and determining if a preceding bit output from the first comparator may be a '0' or a '1', if a preceding bit output from the second comparator may be a '0' or a '1', and if a current bit output from the second comparator may be a '0' or a '1', such that the nature of a signal transition of the incoming data signal may be ascertained. The process of computing final values for the high LE DFE tap-coefficient, the low LE DFE tap-coefficient, the high UE DFE tap-coefficient, and the low UE DFE tap-coefficient may further include determining if the current bit output from the third comparator may be a '0' or a '1', confirming through use of a de-serializer, that a set of values representing the preceding bit output from the first comparator, the preceding bit output from the second comparator, the current bit output from the second comparator, and the current bit output from the third comparator may be equal to a predetermined a second set, and in response to confirming that the set of values representing the preceding bit output from the first comparator, the preceding bit output from the second comparator, the current bit output from the second comparator, and the current bit output from the third comparator may be equal to a predetermined a second set, storing the high error DFE tap-coefficient as the high LE DFE tap-coefficient. The process of computing final values for the high LE DFE tap-coefficient, the low LE DFE tap-coefficient, the high UE DFE tap-coefficient, and the low UE DFE tap-coefficient may further include setting the reference voltage for the third comparator to be equal to a first function of the optimal UE reference voltage minus a third offset voltage, and resetting the high error DFE tap-coefficient back to the predetermined initial value, reading bit-values for an incoming data signal, determining if a preceding bit output from the first comparator may be a '0' or a '1', if a preceding bit output from the second comparator may be a '0' or a '1', and if a current bit output from the first comparator may be a '0' or a '1', such that the nature of a signal transition of the incoming data signal may be ascertained. The process of computing final values for the high LE DFE tap-coefficient, the low LE DFE tap-coefficient, the high UE DFE tap-coefficient, and the low UE DFE tap-coefficient may further include determining if the current bit output from the third comparator may be a '0' or a '1', confirming through use of a de-serializer, that a set of values representing the preceding bit output from the first comparator, the preceding bit output from the second comparator, the current bit output from the first comparator, and the current bit output from the third comparator may be equal to a predetermined a second set, and in response to confirming that the set of values representing the preceding bit output from the first comparator, the preceding bit output from the second comparator, the current bit output from the first comparator, and the current bit output from the third comparator may be equal to a predetermined a second set, storing the low error DFE tap-coefficient as the low UE DFE tap-coefficient. The process of computing final values for the high LE DFE tap-coefficient, the low LE DFE tap-coefficient, the high UE DFE tap-coefficient, and the low UE DFE tap-coefficient may further include setting the reference voltage for the third comparator to be equal to a second function of the optimal UE reference voltage plus a fourth offset voltage, and resetting the low error DFE tap-coefficient back to the predetermined initial value, reading bit-values for an incoming data signal, and determining if a preceding bit output from the first comparator may be a '0' or a '1', if a preceding bit output from the second comparator may be a '0' or a '1', and if a current bit output from the first comparator may be a '0' or a '1', such that the nature of a signal transition of the incoming data signal may be ascertained. The process of computing final values for the high LE DFE tap-coefficient, the low LE DFE tap-coefficient, the high UE DFE tap-coefficient, and the low UE DFE tap-coefficient may further include determining if the current bit output from the third comparator may be a '0' or a '1', confirming through use of a de-serializer, that a set of values representing the preceding bit output from the first comparator, the preceding bit output from the second comparator, the current bit output from the first comparator, and the current bit output from the third comparator may be equal to a predetermined a second set, and in response to confirming that the set of values representing the preceding bit output from the first comparator, the preceding bit output from the second comparator, the current bit output from the first comparator, and the current bit output from the third comparator may be equal to a predetermined a second set, storing the high error DFE tap-coefficient as the high UE DFE tap-coefficient. The first comparator and the second comparator may be configured to be used together as a reference receiver and the third comparator may be configured to be used as an error receiver.

In one or more embodiments of the present disclosure, a receiver circuit of a physical layer (PHY) of a memory controller is provided. The receiver circuit may include a data pad configured to receive an input signal from a dynamic random access memory (DRAM) device, a first comparator operatively connected to the data pad and configured to receive a UE (upper-eye) reference voltage, and a second comparator operatively connected to the data pad and configured to receive an LE (lower-eye) reference voltage. The receiver circuit may further include a first de-serializer operatively connected to both the first comparator and the second comparator, the first de-serializer may be configured to receive a first output from the first comparator, and a second output from a second comparator, a third comparator operatively connected to the data pad and configured to receive an error reference voltage, and a second de-serializer operatively connected to the third comparator, the second de-serializer may be configured to receive an output from the third comparator. The receiver circuit may also include a computer-readable storage medium having instructions stored thereon that when executed by a machine may result in one or more operations.

The one or more operations may include setting a reference voltage for the third comparator to be equal to an LE reference voltage threshold, and setting initial values for the high LE DFE tap-coefficient, the low LE DFE tap-coefficient, the high UE DFE tap-coefficient, the low UE DFE tap-coefficient, a low error DFE tap-coefficient, and a high error DFE tap-coefficient, reading bit-values for an incoming data signal, and determining if a preceding bit output from the first comparator may be a '0' or a '1', if a preceding bit output from the second comparator may be a '0' or a '1', and if a current bit output from the second comparator may be a '0' or a '1', such that the nature of a signal transition of the incoming data signal may be ascertained. The process of obtaining the LE minimum voltage, the mid-level LE voltage, and the LE maximum voltage may further include determining if the current bit output from the third comparator may be a '0' or a '1', confirming through use of a de-serializer, that a set of values representing the preceding bit output from the first comparator, the preceding bit output from the second comparator, the current bit output from the second comparator, and the current bit output from the third comparator may be at least one of a first set, a second set, or a third set, and in response to confirming that the set of values representing the preceding bit output from the first comparator, the preceding bit output from the second comparator, the current bit output from the second comparator, and the current bit output from the third comparator may be at least one of the first set, the second set, or the third set, storing the reference voltage for the third comparator voltage as at least one of the second reference voltage, the fourth reference voltage or the sixth reference voltage. The process of obtaining the LE minimum voltage, the mid-level LE voltage, and the LE maximum voltage may further include resetting the reference voltage of the third comparator to be equal to the initial value for the LE reference voltage threshold, reading bit-values for the incoming data signal, and determining if the preceding bit output from the first comparator may be a '0' or a '1', if the preceding bit output from the second comparator may be a '0' or a '1', and if the current bit output from the second comparator may be a '0' or a '1', such that the nature of the signal transition of the incoming data signal may be ascertained. The process of obtaining the LE minimum voltage, the mid-level LE voltage, and the LE maximum voltage may further include determining if the current bit output from the third comparator may be a '0' or a '1', confirming through use of a de-serializer, that the set of values representing the preceding bit output from the first comparator, the preceding bit output from the second comparator, the current bit output from the second comparator, and the current bit output from the third comparator may be at least one of a fourth set, a fifth set, or a sixth set, and in response to confirming that the set of values representing the preceding bit output from the first comparator, the preceding bit output from the second comparator, the current bit output from the second comparator, and the current bit output from the third comparator may be at least one of a fourth set, a fifth set, or a sixth set, storing the reference voltage for the third comparator voltage as at least one of the first reference voltage, the third reference voltage or the fifth reference voltage. The first comparator and the second comparator may be configured to be used together as a reference receiver and the third comparator may be configured to be used as an error receiver.

Additional features and advantages of embodiments of the present disclosure will be set forth in the description that follows, and in part will be apparent from the description, or may be learned by practice of embodiments of the present disclosure. The objectives and other advantages of the embodiments of the present disclosure may be realized and attained by the structure particularly pointed out in the written description and claims hereof as well as the appended drawings.

It is to be understood that both the foregoing general description and the following detailed description are exemplary and explanatory and are intended to provide further explanation of embodiments of the invention as claimed.

BRIEF DESCRIPTION OF THE DRAWINGS

The accompanying drawings, which are included to provide a further understanding of embodiments of the invention and are incorporated in and constitute a part of this specification, illustrate embodiments of the invention and together with the description serve to explain the principles of embodiments of the invention.

FIGS. 4A-B shows lower-eye plots depicting reference voltages ($V_{REFDH}$ and $V_{REFDL}$) consistent with embodiments of the present disclosure;

FIG. 5 shows tables defining parameters related to lower-eye coefficients used in the DFE training process consistent with embodiments of the present disclosure;

FIG. 7 shows tables defining parameters related to upper-eye coefficients used in the DFE training process consistent with embodiments of the present disclosure;

FIG. 14 shows tables defining parameters and equations related to lower-eye & upper-eye coefficients used in the DFE training process consistent with embodiments of the present disclosure;

FIGS. 15A-C shows lower-eye plots depicting reference voltages ($V_{REFDL\_LL}$, $V_{REFDL\_LH}$, and $V_{REFDL\_HH}$) consistent with embodiments of the present disclosure;

FIG. 16 shows tables defining parameters related to lower-eye coefficients used in the DFE training process consistent with embodiments of the present disclosure;

FIGS. 17A-C shows upper-eye plots depicting reference voltages ($V_{REFDH\_LL}$, $V_{REFDH\_LH}$, and $V_{REFDH\_HH}$) consistent with embodiments of the present disclosure;

FIG. 18 shows tables defining parameters related to upper-eye coefficients used in the DFE training process consistent with embodiments of the present disclosure;

FIG. 22A-B shows flowcharts depicting operations related to lower-eye full equalization DFE training process consistent with an embodiment of the present disclosure;

FIG. 23A-B shows flowcharts depicting operations related to upper-eye full equalization DFE training process consistent with an embodiment of the present disclosure

Figure 26A:
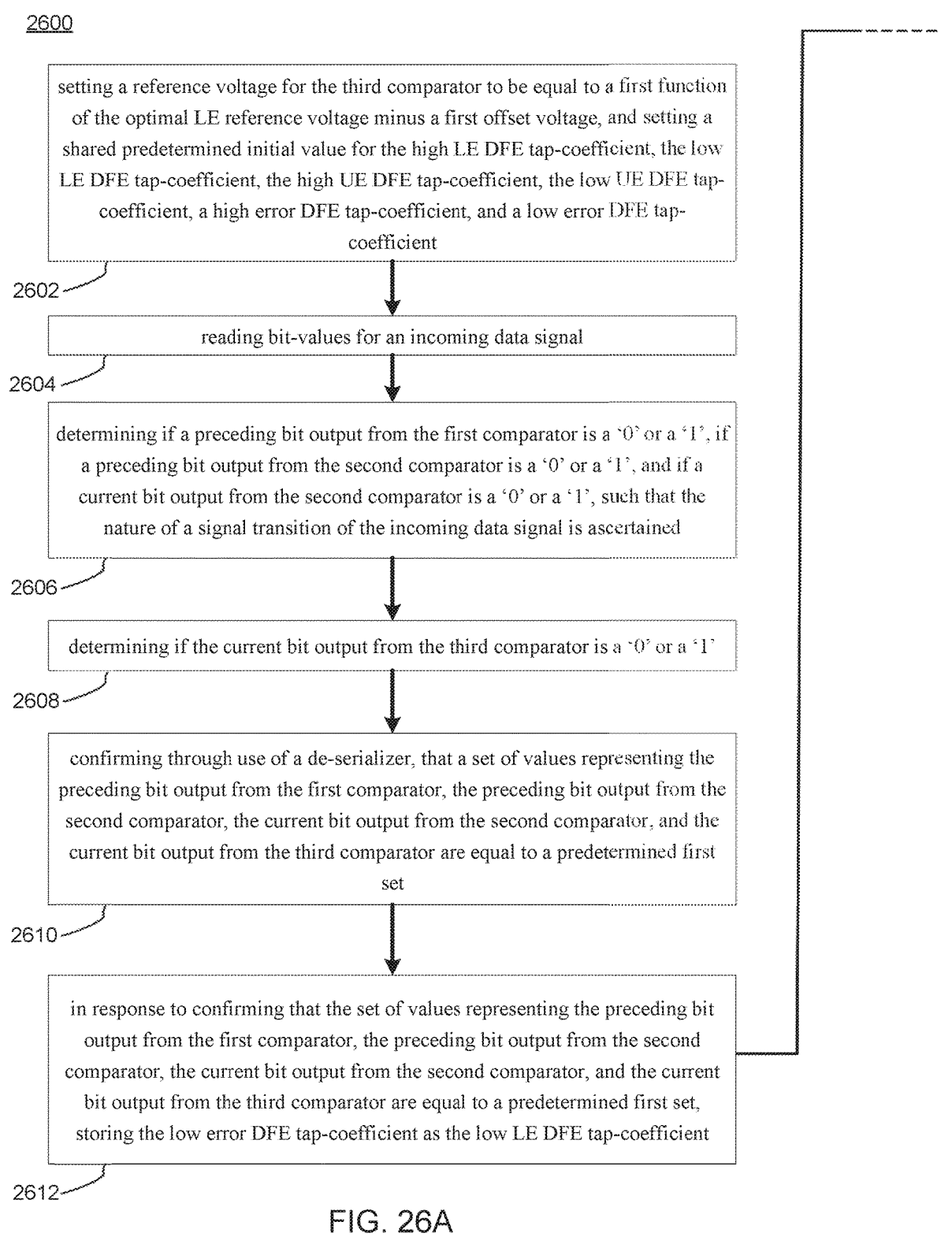
Figure 26D:
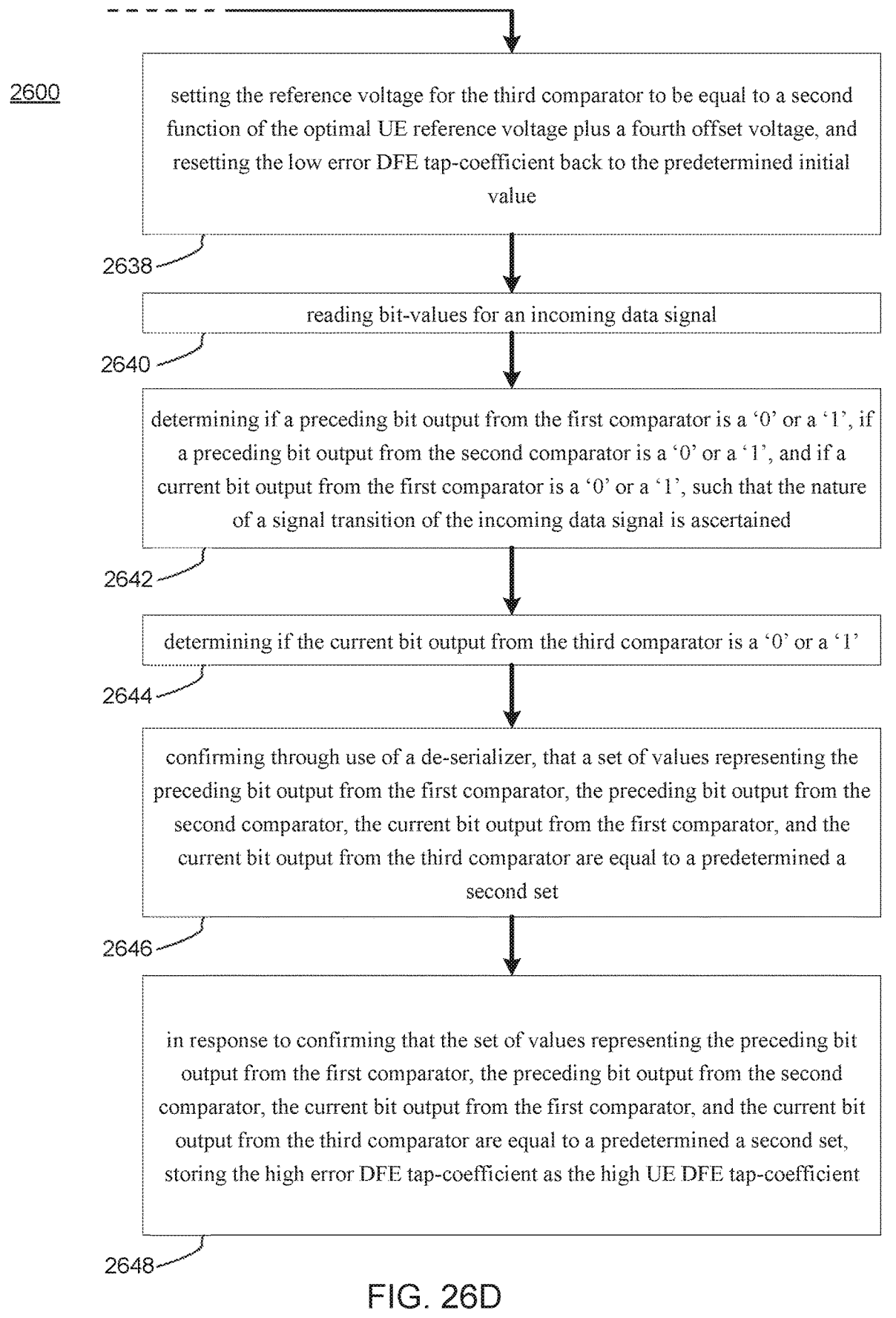

FIG. 26 shows a flowchart depicting operations related to full equalization DFE training process consistent with an embodiment of the present disclosure;

FIG. 28 shows tables defining parameters and equations related to lower-eye & upper-eye coefficients used in the DFE training process consistent with embodiments of the present disclosure;

FIG. 29 shows a flowchart depicting operations related to partial equalization DFE training process consistent with embodiments of the present disclosure; and FIG. 30 shows a flowchart depicting operations related to full equalization DFE training process consistent with embodiments of the present disclosure.

DETAILED DESCRIPTION

Reference will now be made in detail to the embodiments of the present disclosure, examples of which are illustrated in the accompanying drawings. The present disclosure may, however, be embodied in many different forms and should not be construed as being limited to the embodiments set forth herein. Rather, these embodiments are provided so that this disclosure will be thorough and complete, and will fully convey the concept of the disclosure to those skilled in the art.

Figure 1:
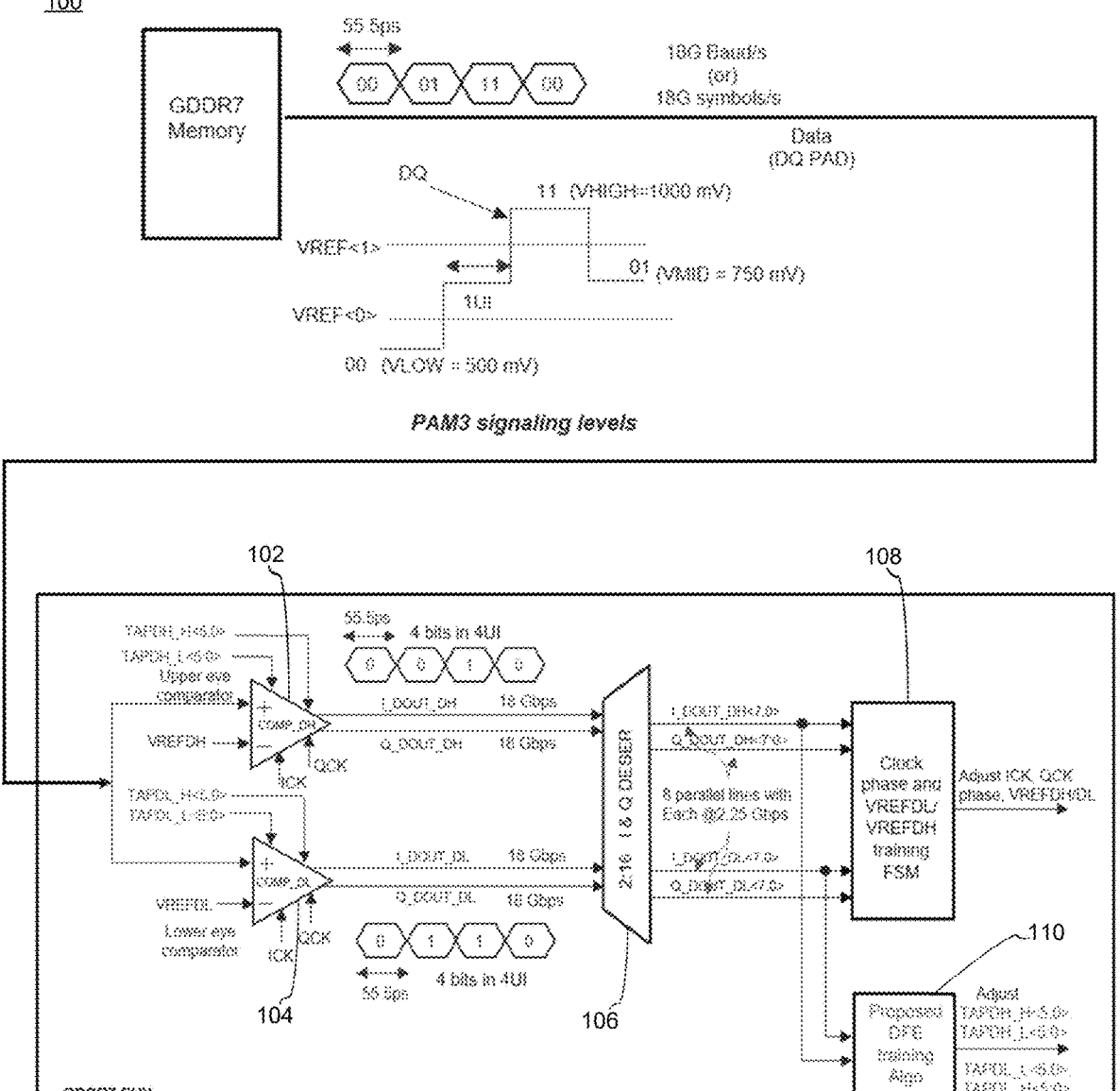
FIG. 1 is a logical representation of a read path on the physical layer for GDDR7 consistent with embodiments of the present disclosure.

Referring now to FIG. 1, block diagram 100 of a read path on the physical layer for the 7th generation Graphics double data rate (GDDR7) protocol consistent with embodiments of the present disclosure is provided. Block diagram 100 may show a read path running at 18 giga-symbols/s/bit. The 3-level pulse amplitude modulation (PAM3) signaling may use three voltage signaling levels: "00", "01", and "11". An encoder-decoder configuration may be needed to produce a signaling level for the "10" symbol, which may be undefined. Two or more symbols from among "00", "01", and "11" may need to be combined in order to represent "10", which may result in throughput loss. Block diagram 100 may include upper comparator (COMP_DH) 102 and lower comparator (COMP_DL) 104 as well as a first reference voltage threshold ($V_{REFDH}$) and a second reference voltage threshold ($V_{REFDL}$) generated by digital-to-analog converter (DAC) (not shown). Block diagram 100 may also include deserializer 106 configured to receive an in-phase sample (I_DOUT_DL/DH) and quadrature-phase sample (Q_D-OUT_DL/DH) as inputs that may be used to optimize the strobe (ICK) position and reference voltage levels (VREFDL/DH). Block diagram 100 may further include clock phase adjuster 108 configured to adjust an in-phase clock (ICK), a quadrate-phase clock (QCK), $V_{REFDH}$, and $V_{REFDL}$. At a trained strobe position, the DFE tap coefficients (TAPDL_L/H and TAPDH_L/H) may be optimized to improve eye size. In the case of partial equalization, only 2 DFE registers (TAPDL and TAPDH) may be updated, and in the case of full equalization 4 DFE registers (TAPDL_L/H and TAPDH_L/H) may be updated. Embodiments may further include computer-readable storage medium 110 having instructions stored thereon that when executed by a machine result in one or more operations, for example, the DFE training algorithm disclosed herein.

Figure 2:
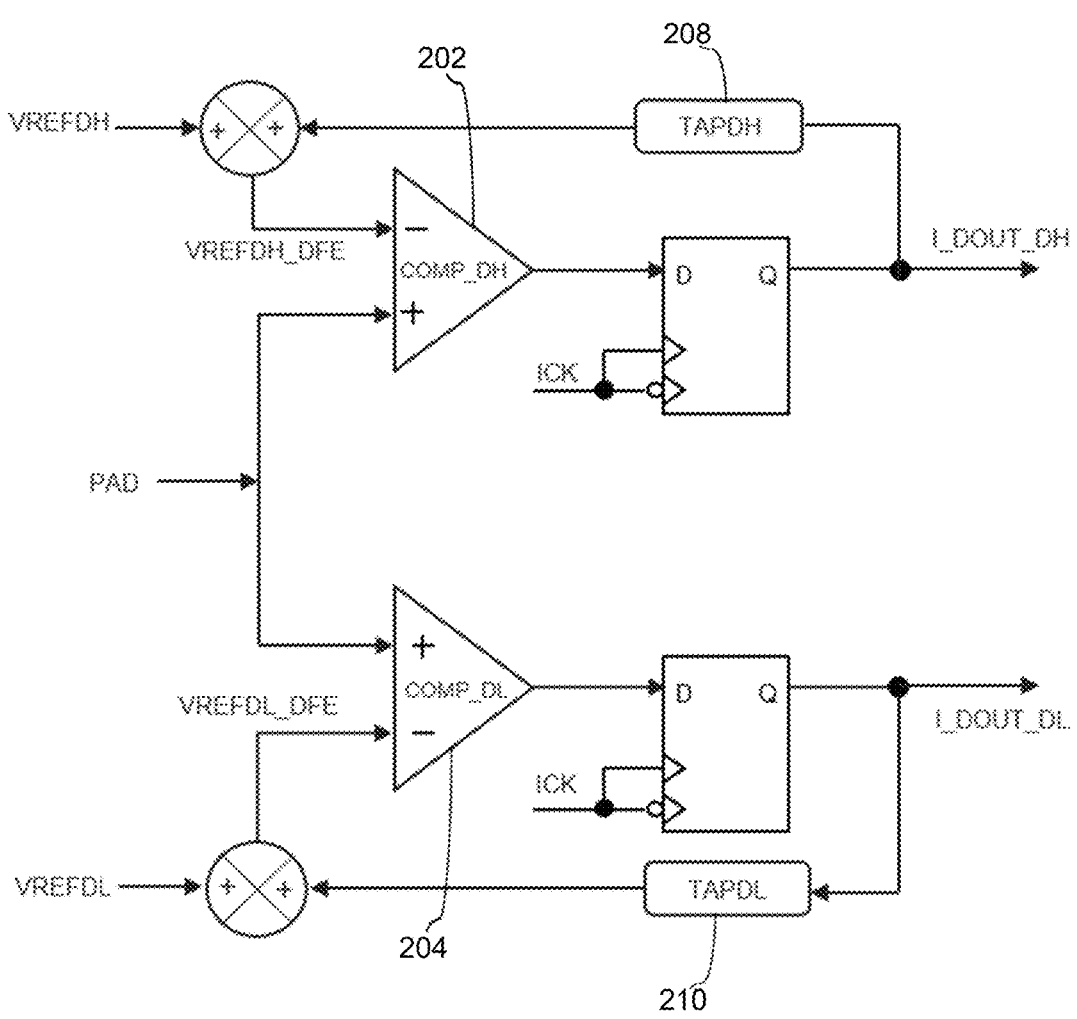
FIG. 2 shows a block diagram depicting an example implementation of DFE partial equalization training consistent with embodiments of the present disclosure.
Figure 3:
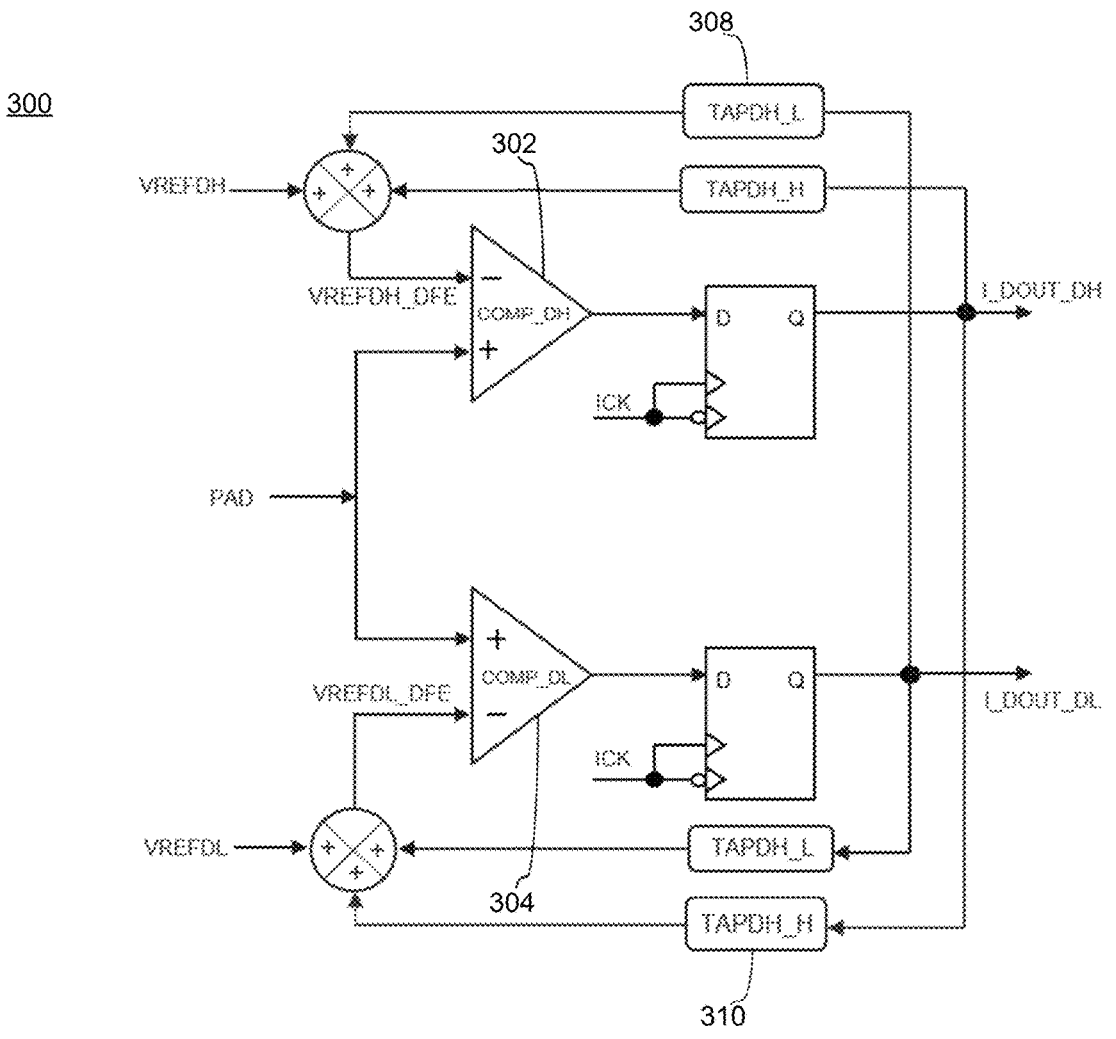
FIG. 3 shows a block diagram depicting an example implementation of DFE full equalization training consistent with embodiments of the present disclosure.

Referring now to FIGS. 2-3, block diagram 200 depicting an example implementation of DFE partial equalization training and block diagram 300 depicting an example implementation of DFE full equalization training consistent with embodiments of the present disclosure are provided. In block diagram 200, depicting the implementation of partial-equalization, the effective reference voltage VREFDL_DFE for second comparator 204 (COMP_DL) may be updated based on output signal I_DOUT_DL only, and similarly, the effective reference voltage VREFDH_DFE for first comparator 202 (COMP_DH) may be updated based on output signal I_DOUT_DH only. The effective references for the incoming symbols may be given in table 206. Similarly, in block diagram 300, depicting the implementation of full-equalization, the effective reference voltage of each comparator (VREFDL/H_DFE) may be updated based on the previous symbol, such that VREFDL_DFE for second comparator 304 (COMP_DL) may be updated based on output signals I_DOUT_DL and I_DOUT_DH, and VREFDH_DFE for first comparator 302 (COMP_DH) may also be updated based on output signals I_DOUT_DL & I_DOUT_DH. The effective references for the incoming symbols may be given in table 306.

In some embodiments, partial equalization may be used for cases where the routing delay from output signal I_DOUT_DH to DFE tap 310 (TAPDL_H) and from output signal I_DOUT_DL to DFE tap 308 (TAPDH_L) may limit the DFE timing closure of a 1-tap DFE.

Referring now to FIGS. 4A-B, and 5, lower-eye plots 400, 402 depicting reference voltages ($V_{REFDH}$ and $V_{REFDL}$), and tables 500, 502, and 504 defining parameters related to lower-eye coefficients used in the DFE training process consistent with embodiments of the present disclosure are provided. Both reference voltages VREFDH, VREFDL, and the strobe position, may be trained before DFE training may be started. To begin the DFE training process, at a trained strobe position of an equalizing LE (lower-eye), values for an LE minimum voltage and an LE maximum voltage for a current bit may be obtained based on a preceding bit, through use of a first comparator and a second comparator.

If the previous bit of the LE is '0' as shown in lower-eye plot 400, then the minimum level of '1' in a [0 to 1] transition (712 mV) may be obtained, where the obtained LE minimum level may be given by VREFDL_L_VIH. Similarly, if the previous bit of the LE is '0' as shown in lower-eye plot 400, then the maximum level of '0' in a [0 to 0] transition (512 mV) may be obtained. The obtained LE maximum level may be given by VREFDL_L_VIL. Based on these obtained values, an optimal reference may be an average of VREFDL_L_VIL and VREFDL_L_VIH levels. The obtained optimum level may be given by VREFDL_L (612 mV) as may be seen in tables 500, 502, and 504.

If the previous bit of the lower eye is '1' as shown in lower-eye plot 402, then the minimum level of '1' in a [1 to 1] transition (747 mV) may be obtained, where the obtained LE minimum level may be given by VREFDL_H_VIH. Similarly, if the previous bit of the LE is '1' as shown in lower-eye plot 402, then the maximum level of '0' in a [1 to 0] transition (577 mV) may be obtained, where the obtained LE minimum level may be given by VREFDL_H_VIL. Based on these obtained values, an optimal reference may be an average of VREFDL_H_VIL and VREFDL_H_VIH levels. The obtained optimum level may be given by VREFDL_H (662 mV) as may be seen in tables 500, 502, and 504.

Figure 6A:
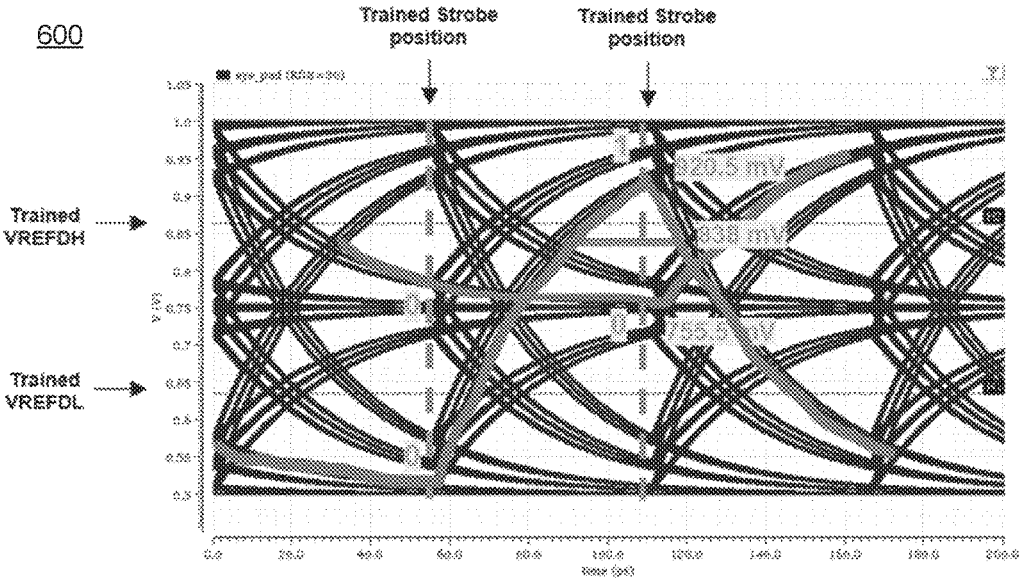
FIGS. 6A-B shows upper-eye plots depicting reference voltages ($V_{REFDH}$ and $V_{REFDL}$) consistent with embodiments of the present disclosure.
Figure 6B:
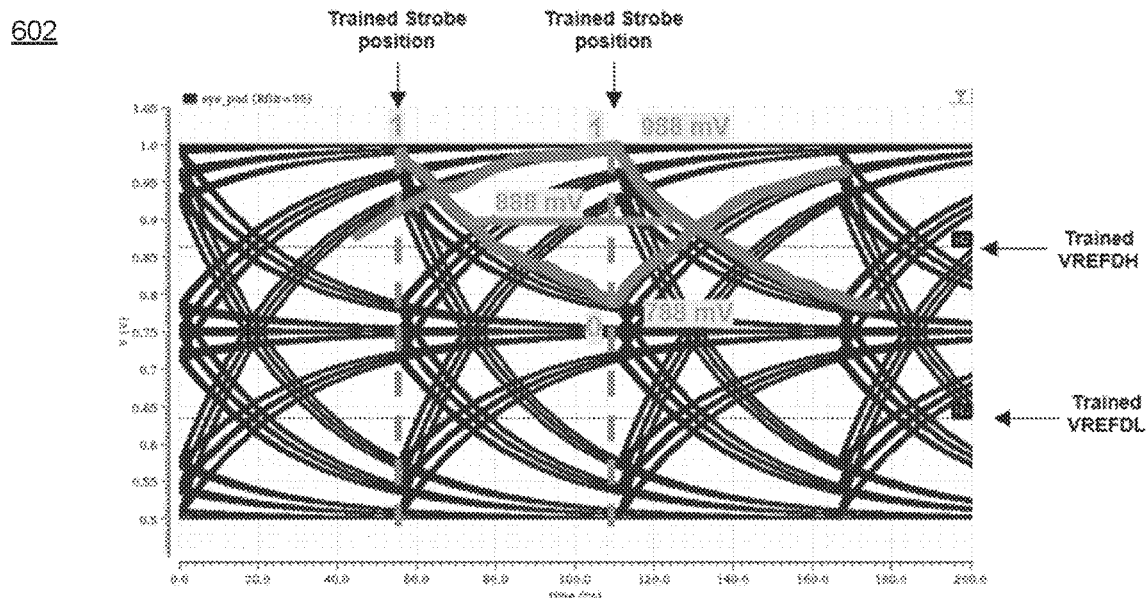

Referring now to FIGS. 6A-B and 7, upper-eye plots 600, 602 depicting reference voltages ($V_{REFDH}$ and $V_{REFDL}$), and tables 700, 702, and 704 defining parameters related to upper-eye coefficients used in the DFE training process consistent with embodiments of the present disclosure are provided. To continue the DFE training process, at a trained strobe position of an equalizing UE (upper-eye), values for a UE minimum voltage and a UE maximum voltage for a current bit may be obtained based on a preceding bit, through use of a first comparator and a second comparator.

If the previous bit of the UE is '0' as shown in upper-eye plot 600, then the maximum level of '0' in a [0 to 0] transition (755.5 mV) may be obtained, where the obtained UE maximum level may be given by VREFDH_L_VIL. Similarly, if the previous bit of the UE is '0' as shown in lower-eye plot 400, then the minimum level of '1' in a [0 to 1] transition (920.5 mV) may be obtained. The obtained UE minimum level may be given by VREFDH_L_VIH. Based on these obtained values, an optimal reference may be an average of VREFDH_L_VIL and VREFDH_L_VIH levels. The obtained optimum level may be given by VREFDH_L (838 mV) as may be seen in tables 700, 702, and 704.

If the previous bit of the upper eye is '1' as shown in upper-eye plot 602, then the maximum level of '0' in a [1 to 0] transition (788 mV) may be obtained, where the obtained UE maximum level may be given by VREFDH_H_VIL. Similarly, if the previous bit of the UE is '1' as shown in upper-eye plot 602, then the minimum level of '1' in a [1 to 1] transition (988 mV) may be obtained, where the obtained UE minimum level may be given by VREFDH_H_VIH. Based on these obtained values, an optimal reference may be an average of VREFDH_H_VIL and VREFDH_H_VIH levels. The obtained optimum level may be given by VREFDH_H (888 mV) as may be seen in tables 700, 702, and 704.

Figure 8A:
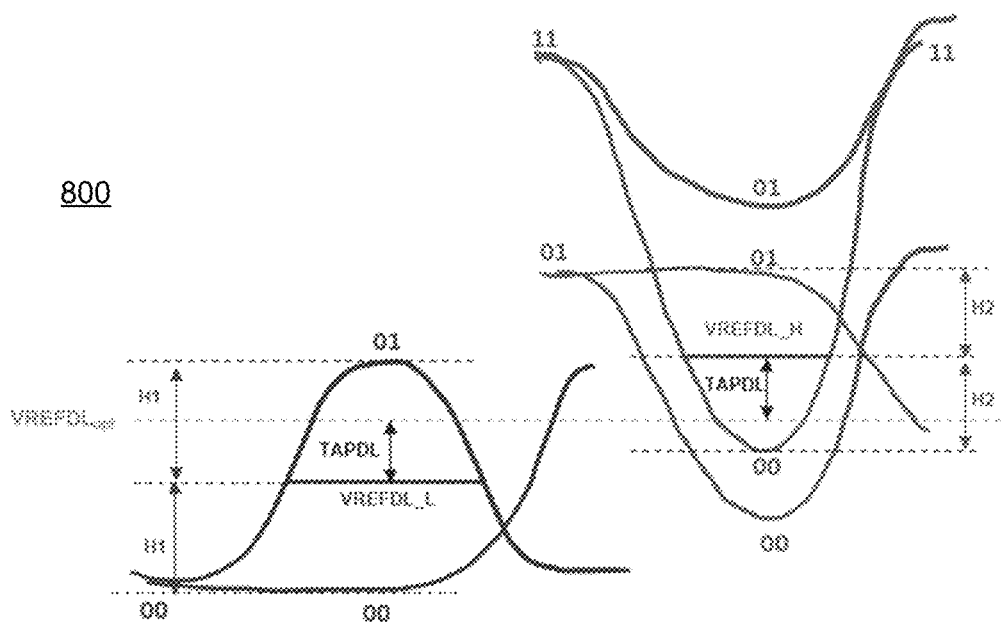
FIGS. 8A-B shows plots of optimized reference voltages for expected tap coefficient consistent with embodiments of the present disclosure.
Figure 8B:
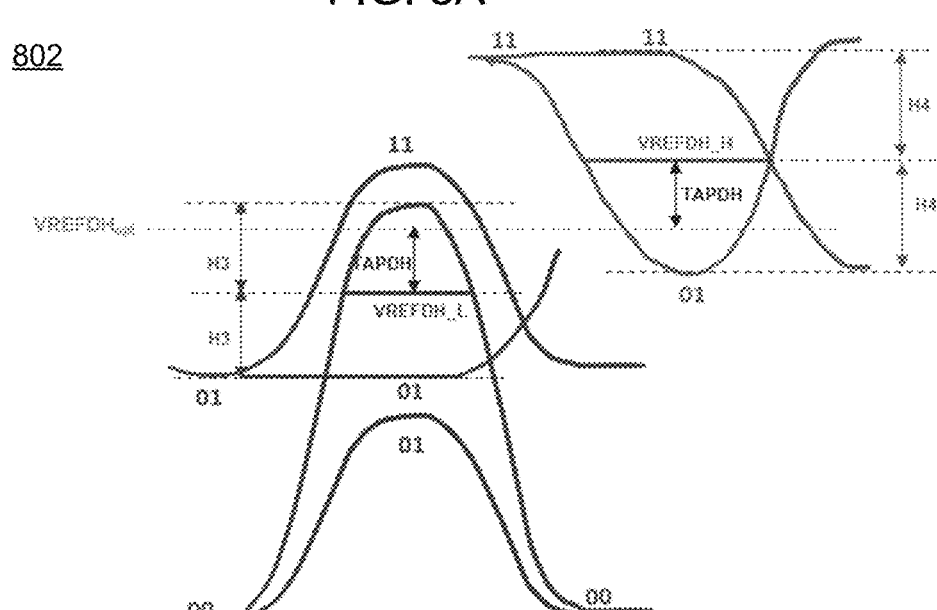

Referring now to FIGS. 8A-B, plots 800, 802 of optimized reference voltages for expected tap coefficients consistent with embodiments of the present disclosure are provided. Plot 800 may show the optimized receiver reference voltage $V_{REFDLopt}$ and lower tap coefficient TAPDL value, which may offer maximum voltage margins for both 1-level and 2-level transitions for the lower eye. Values for $V_{REFDLopt}$ may be obtained based on the following mathematical relationships:

$$V_{REFDL\_L} = V_{REFDLopt} - TAPDL \qquad \text{Equation 1}$$

$$V_{REFDL\_H} = V_{REFDLopt} + TAPDL \qquad \text{Equation 2}$$

Similarly, plot 802 may show the optimized receiver reference voltage $V_{REFDHopt}$ and upper tap coefficient TAPDH value, which may offer maximum voltage margins for both 1-level and 2-level transitions for the upper eye. Values for $V_{REFDHopt}$ may be obtained based on the following mathematical relationships:

$$V_{REFDH\_L} = V_{REFDHopt} - TAPDH \qquad \text{Equation 3}$$

$$V_{REFDH\_H} = V_{REFDHopt} + TAPDH \qquad \text{Equation 4}$$

Figure 9:
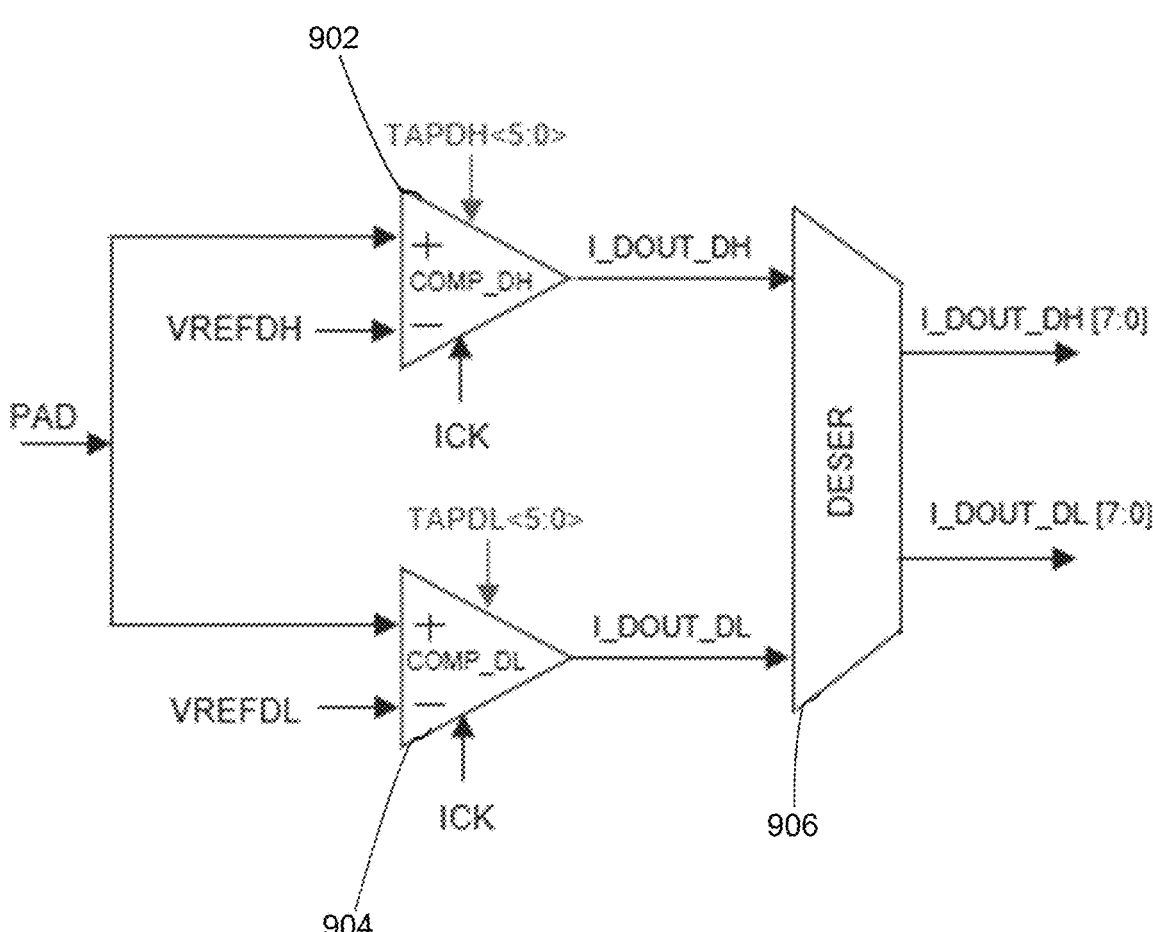
FIG. 9 shows a hardware implementation of partial equalization DFE training process consistent with an embodiment of the present disclosure.

Referring now to FIG. 9, circuit 900 for the partial equalization DFE training consistent with an embodiment of the present disclosure is provided. Circuit 900 may show the hardware elements required to implement the 1-Tap DFE partial equalization algorithm. No additional receiver may be required, because the training process may reuse the existing hardware elements. Circuit 900 may include a data pad (PAD) configured to receive an input signal from a dynamic random access memory (DRAM) device, upper comparator 902 (COMP_DH) and lower comparator 904 (COMP_DL) both operatively connected to the PAD. Upper comparator 902 may be configured to receive a UE reference voltage (VREFDH) and lower comparator 904 may be configured to receive an LE reference voltage (VREFDL). De-serializer 906 may be operatively connected to both upper comparator 902 and lower comparator 904, and configured to receive a first output (I_DOUT_DH) from upper comparator 902, and a second output (I_DOUT_DL) from lower comparator 904. Additionally, de-serializer 906 may be configured to generate a first output (I_DOUT_DH [7:0]) and a second output (I_DOUT_DL [7:0]). Further, upper comparator 902 may be operatively connected to an upper DFE tap (TAPDH) and lower comparator 904 may be operatively connected to a lower DFE tap (TAPDL).

In some embodiments, tap coefficients (TAPDH/L) of both the reference and error receivers may be initialized to d'0 code, which may translate to a 0 mV tap value. Upper comparator 902 may be used as the reference receiver and lower comparator 904 may be used as the error receiver while finding the DFE coefficient for the lower eye. Both reference voltages VREFDH, VREFDL, and the strobe position, may be trained before DFE training starts.

In some embodiments, upper comparator 902 may be configured to be used as a reference receiver and lower comparator 904 may be configured to be used as an error receiver while computing the LE DFE tap-coefficient, and conversely lower comparator 904 may be configured to be used as the reference receiver and upper comparator 902 may be configured to be used as the error receiver while computing the UE DFE tap-coefficient.

Figure 10A:
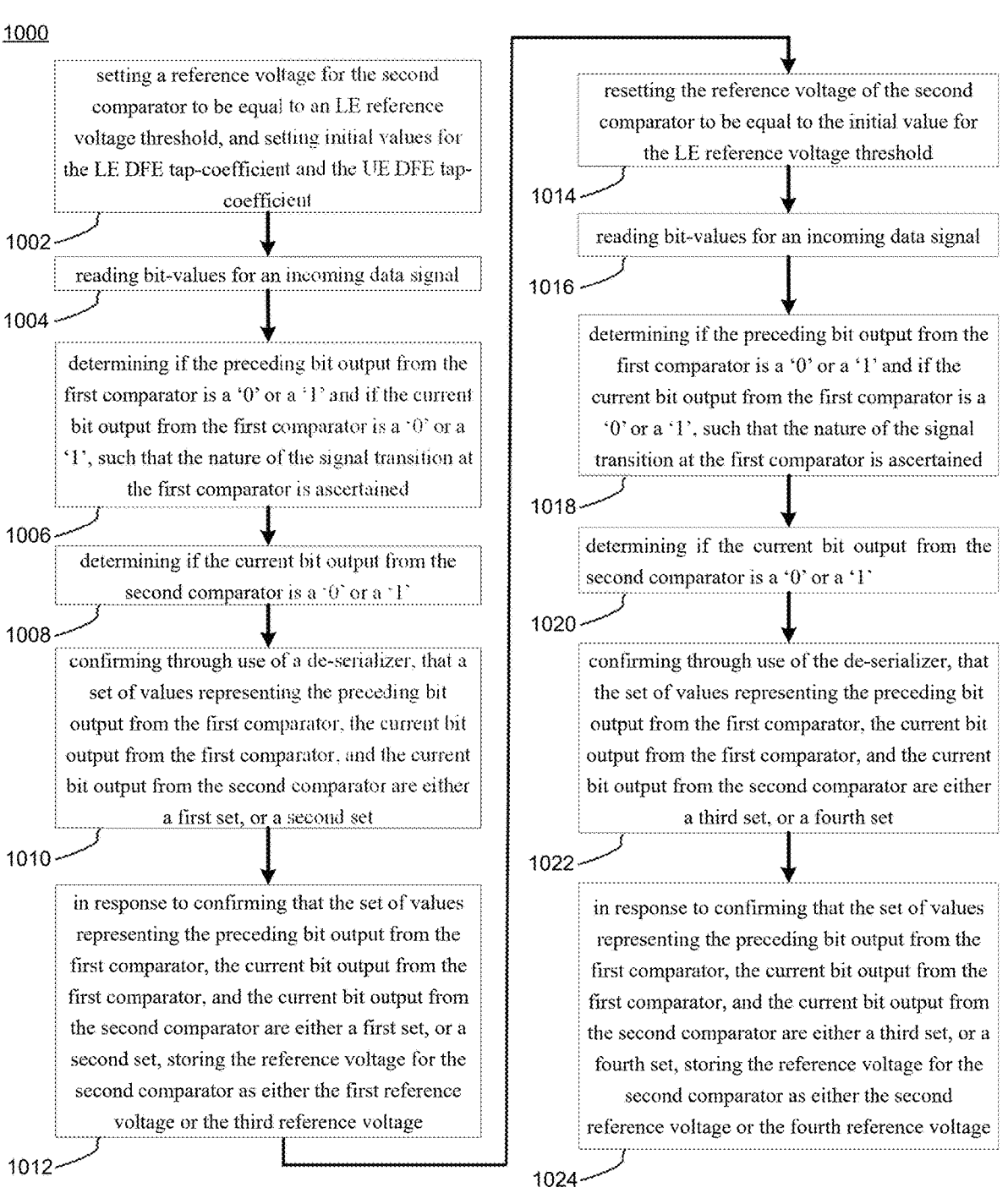
FIGS. 10A-B shows flowcharts depicting operations related to lower-eye partial equalization DFE training process consistent with an embodiment of the present disclosure.
Figure 10B:
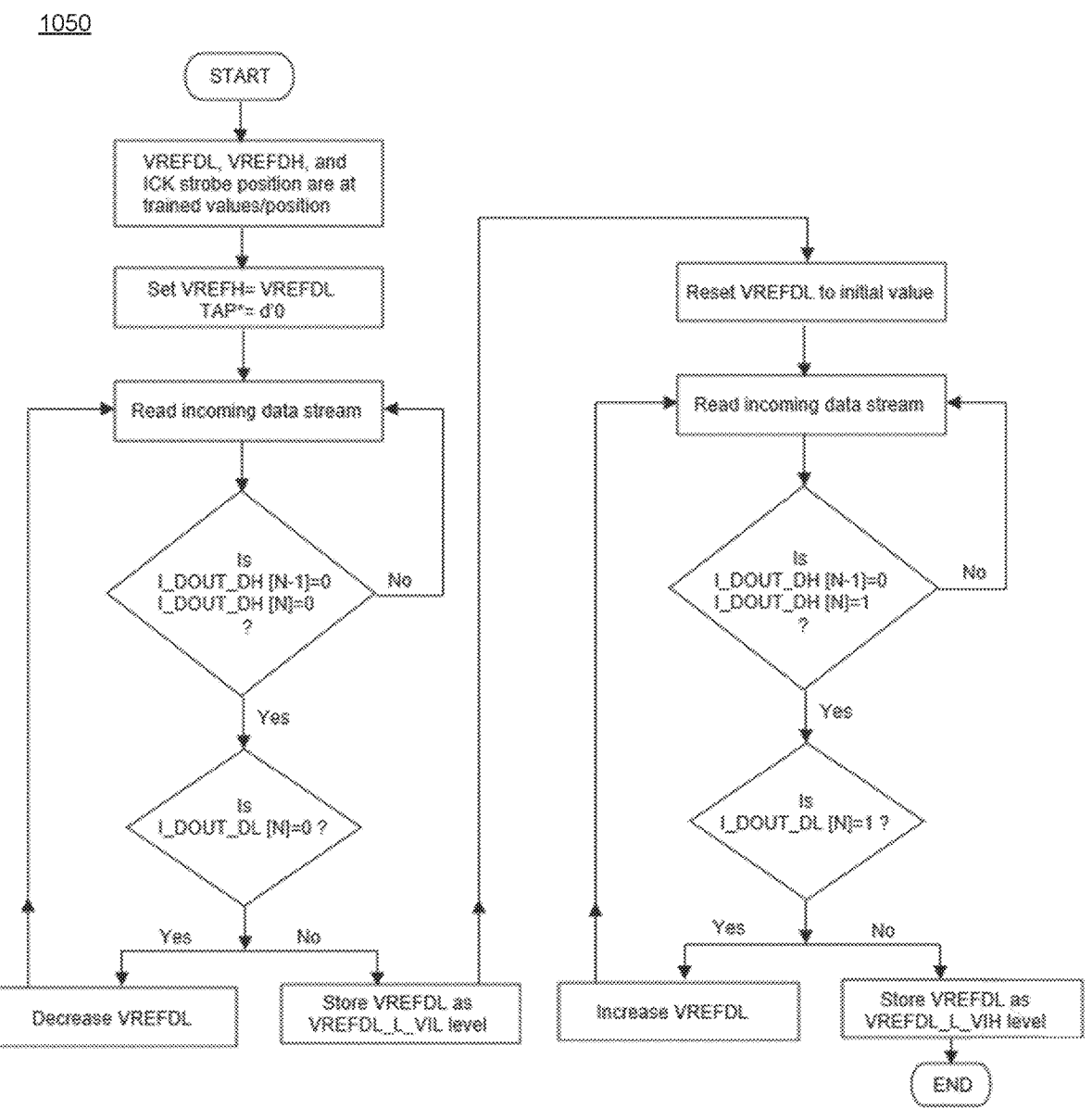

Referring now to FIGS. 10A-B, flowchart 1000 depicting lower-eye DFE training operations, and flowchart 1050 depicting lower-eye DFE training operations consistent with an embodiment of the present disclosure are provided.

In some embodiments, flowchart 1000 depicting lower-eye DFE training operations may be directed toward the process of obtaining, at a trained strobe position of an equalizing LE (lower-eye), an LE minimum voltage and an LE maximum voltage for a current bit based on a preceding bit, through use of an upper comparator and a lower comparator. Flowchart 1000 may include setting (1002) a reference voltage for the lower comparator to be equal to an LE reference voltage threshold, and setting initial values for the LE DFE tap-coefficient and the UE DFE tap-coefficient, reading (1004) bit-values for an incoming data signal, and determining (1006) if the preceding bit output from the upper comparator may be a '0' or a '1' and if the current bit output from the upper comparator may be a '0' or a '1', such that the nature of the signal transition at the upper comparator may be ascertained. Flowchart 1000 may further include, determining (1008) if the current bit output from the lower comparator may be a '0' or a '1', confirming (1010) through use of a de-serializer, that a set of values representing the preceding bit output from the upper comparator, the current bit output from the upper comparator, and the current bit output from the lower comparator may either be a first set ['0', '0', and '1'], or a second set ['1', '0', and '1'], and in response to confirming that the set of values representing the preceding bit output from the upper comparator, the current bit output from the upper comparator, and the current bit output from the lower comparator may either be a first set ['0', '0', and '1'], or a second set ['1', '0', and '1'], storing (1012) the reference voltage for the lower comparator as either the first reference voltage or the third reference voltage. Flowchart 1000 may also include, resetting (1014) the reference voltage of the lower comparator to be equal to the initial value for the LE reference voltage threshold, reading (1016) bit-values for the incoming data signal, and determining (1018) if the preceding bit output from the upper comparator may be a '0' or a '1' and if the current bit output from the upper comparator may be a '0' or a '1', such that the nature of the signal transition at the upper comparator may be ascertained. Flowchart 1000 may further include, determining (1020) if the current bit output from the lower comparator may be a '0' or a '1', confirming (1022) through use of the de-serializer, that the set of values representing the preceding bit output from the upper comparator, the current bit output from the upper comparator, and the current bit output from the lower comparator may either be a third set ['0', '1' and '0'], or a fourth set ['1', '1', and '0'], and in response to confirming that the set of values representing the preceding bit output from the upper comparator, the current bit output from the upper comparator, and the current bit output from the lower comparator may either be a third set ['0', '1' and '0'], or a fourth set ['1', '1', and '0'], storing (1024) the reference voltage for the lower comparator as either the second reference voltage or the fourth reference voltage.

In some embodiments, flowchart 1050 depicting lower-eye DFE training operations may illustrate the case where the previous bit of the lower-eye may be '0', or more specifically the case where the current bit (I_DOUT_DH [N]) and the preceding bit (I_DOUT_DH [N−1]) may be '0' and '0' respectively, while reference voltage VREFDL may be stored as VREFDL_L_VIL as a first tap value, and where the current bit (I_DOUT_DH [N]) and the preceding bit (I_DOUT_DH [N−1]) may be '0' and '1' respectively, while reference voltage VREFDL may be stored as VREFDL_L_VIH as a second tap value. To account for the case where the previous bit of the lower-eye may be '1' the same process may be used however the preceding bit (I_DOUT_DH [N−1]) may be changed to '1' and reference voltage VREFDL may be stored as VREFDL_H_VIL as the first tap value, and stored as VREFDL_H_VIH as the second tap value.

Figure 11A:
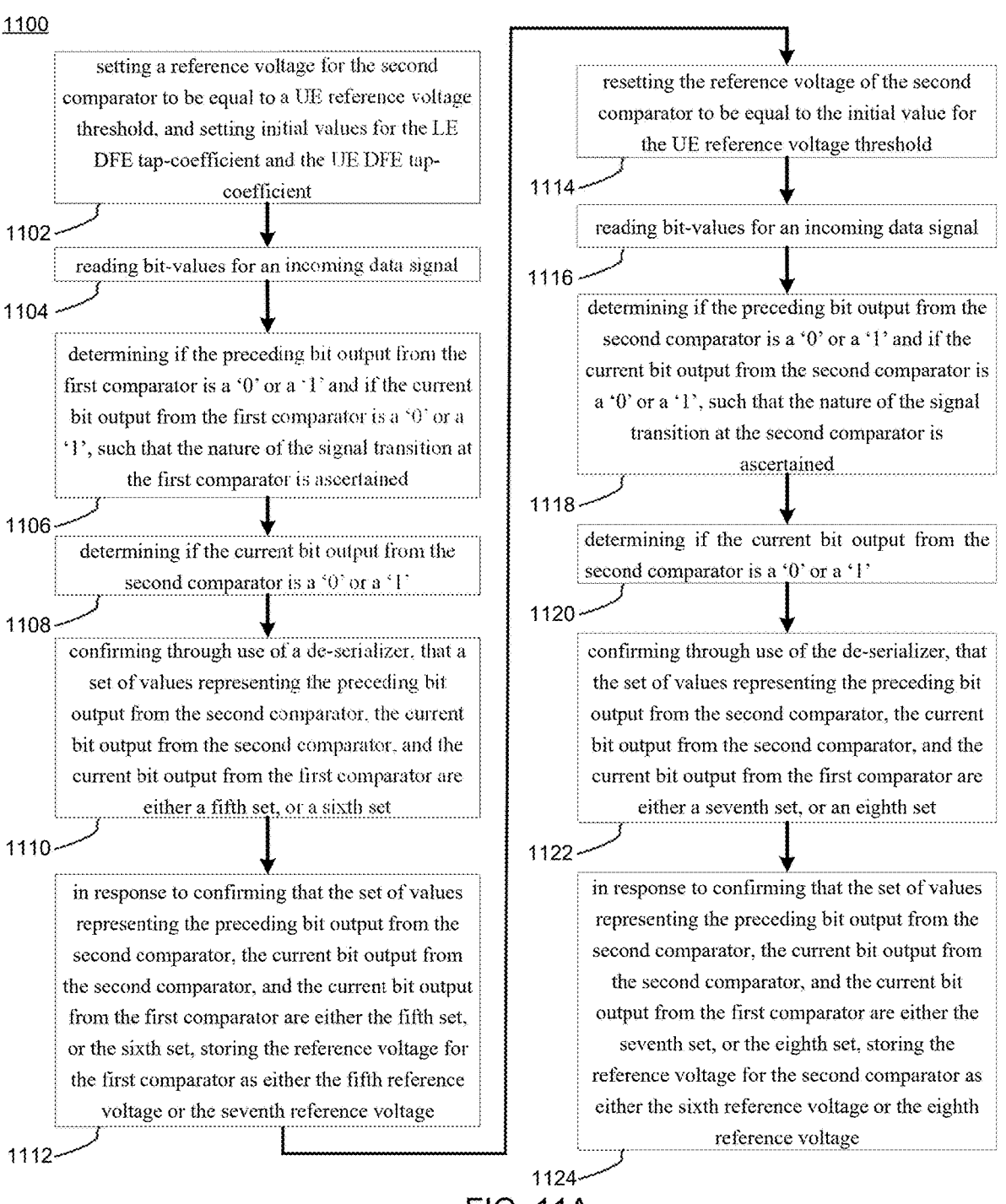
FIGS. 11A-B shows flowcharts depicting operations related to upper-eye partial equalization DFE training process consistent with an embodiment of the present disclosure
Figure 11B:
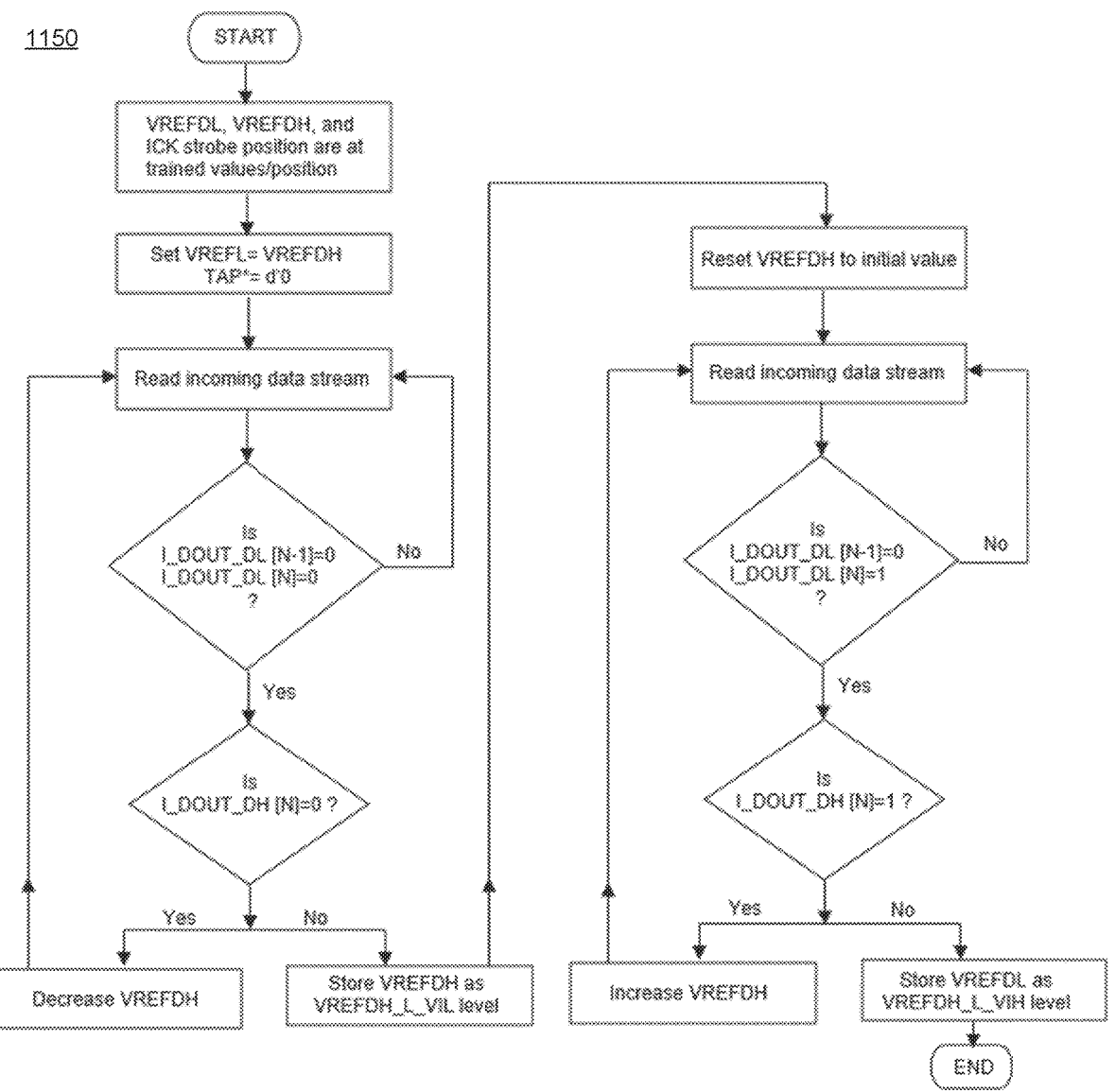

Referring now to FIGS. 11A-B, flowchart 1100 depicting upper-eye DFE training operations, and flowchart 1150 depicting upper-eye DFE training operations consistent with an embodiment of the present disclosure are provided.

In some embodiments, flowchart 1100 depicting upper-eye DFE training operations may be directed toward the process of obtaining, at a trained strobe position of an equalizing UE (upper-eye), a UE minimum voltage and a UE maximum voltage for a current bit based on a preceding bit, through use of an upper comparator and a lower comparator. Flowchart 1100 may include setting (1102) a reference voltage for the lower comparator to be equal to a UE reference voltage threshold, and setting initial values for the UE DFE tap-coefficient and the LE DFE tap-coefficient, reading (1104) bit-values for an incoming data signal, determining (1106) if the preceding bit output from the lower comparator may be a '0' or a '1' and if the current bit output from the lower comparators may be a '0' or a '1', such that the nature of the signal transition at the lower comparator may be ascertained. Flowchart 1100 may further include determining (1108) if the current bit output from the upper comparator may be a '0' or a '1', confirming (1110) through use of a de-serializer, that a set of values representing the preceding bit output from the lower comparator, the current bit output from the lower comparator, and the current bit output from the lower comparator may either be a fifth set ['0', '0', and '1'], or a sixth set ['1', '0', and '1'], and in response to confirming that the set of values representing the preceding bit output from the lower comparator, the current bit output from the lower comparator, and the current bit output from the lower comparator may either be the fifth set ['0', '0', and '1'], or the sixth set ['1', '0', and '1'], storing (1112) the reference voltage for the upper comparator as either the fifth reference voltage or the seventh reference voltage. Flowchart 1100 may also include resetting (1114) the reference voltage for the upper comparator to be equal to the initial value for the UE reference voltage threshold, reading (1116) bit-values for the incoming data signal, and determining (1118) if the preceding bit output from the lower comparator may be a '0' or a '1' and if the current bit output from the lower comparator may be a '0' or a '1', such that the nature of the signal transition at the lower comparator may be ascertained. Flowchart 1100 may further include determining (1120) if the current bit output from the upper comparator may be a '0' or a '1', confirming (1122) through use of the de-serializer, that the set of values representing the preceding bit output from the lower comparator, the current bit output from the lower comparator, and the current bit output from the upper comparator may be either a seventh set ['0', '0', and '0'], or an eighth set ['1', '1', and '0'], and in response to confirming that the set of values representing the preceding bit output from the lower comparator, the current bit output from the lower comparator, and the current bit output from the upper comparator may either be the seventh set ['0', '0', and '0'], or the eighth set ['1', '1', and '0'], storing the reference voltage for the lower comparator as either the sixth reference voltage or the eighth reference voltage.

In some embodiments, flowchart 1150 depicting upper-eye DFE training operations may illustrate the case where the previous bit of the upper-eye may be '0', or more specifically the case where the current bit (I_DOUT_DL [N]) and the preceding bit (I_DOUT_DL [N−1]) may be '0' and '0' respectively, while reference voltage VREFDH may be stored as VREFDH_L_VIL as a first tap value, and where the current bit (I_DOUT_DL [N]) and the preceding bit (I_DOUT_DL [N−1]) may be '0' and '1' respectively, while reference voltage VREFDH may be stored as VREFDH_L_VIH as a second tap value. To account for the case where the previous bit of the upper-eye may be '1' the same process may be used however the preceding bit (I_DOUT_DL [N−1]) may be changed to '1' and reference voltage VREFDH may be stored as VREFDH_L_VIL as the first tap value, and stored as VREFDH_L_VIH as the second tap value.

In some embodiments, if the transfer characteristic of reference voltages (VREFDH/L) DAC (Digital to Analog Converter) may be the same as TAPDL/H DAC, then the tap coefficients may be computed directly, such that the tap codes for TAPDL/H may be added/subtracted directly from reference voltages (VREFDH/L). However, if the transfer characteristics may be different, then additional measures may be executed.

Figure 12A:
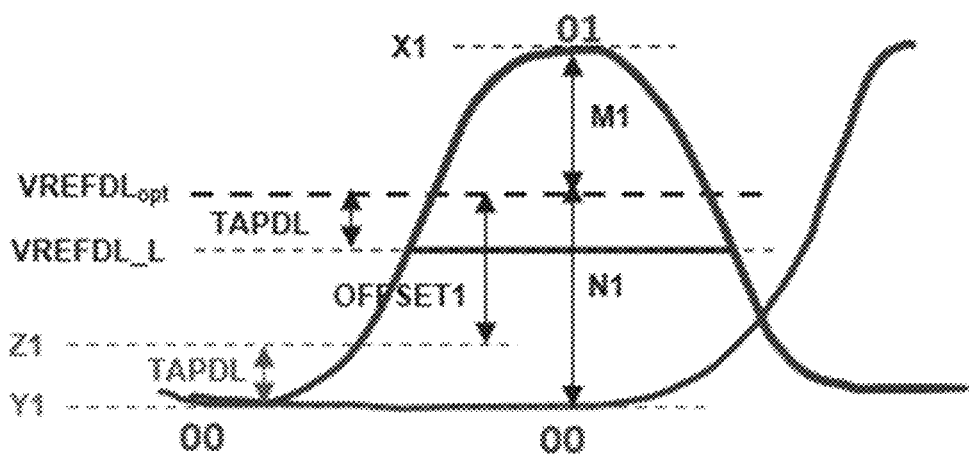
FIG. 12A-B shows plots of reference voltages for expected tap coefficient consistent with embodiments of the present disclosure.
Figure 12B:
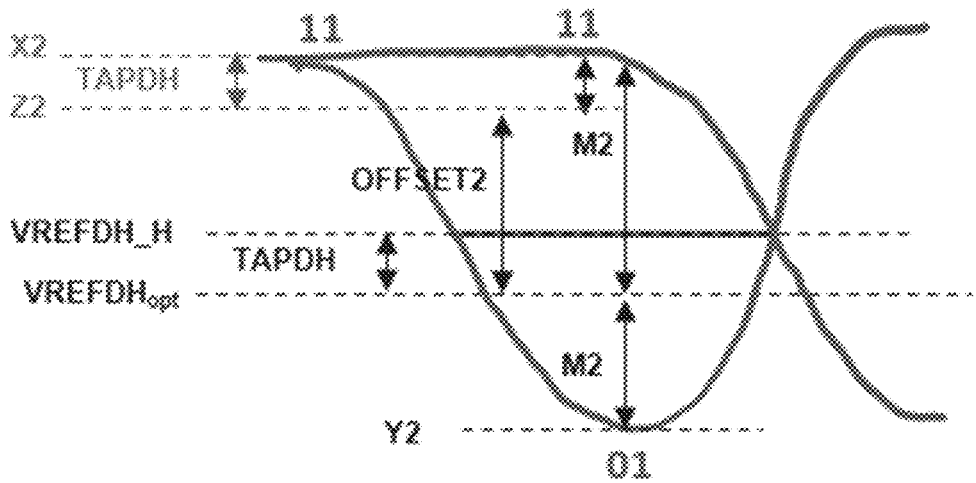

Referring now to FIGS. 12A-B, plots 1200, 1202 of reference voltages for expected tap coefficients consistent with an embodiment of the present disclosure are provided. TAPDL may be found as the difference between levels Z1 and Y1 from plot 1200. Upper comparator (COMP_DH) may be used as the reference receiver and lower comparator (COMP_DL) may be used as the error receiver. Values for TAPDL may be obtained based on the following mathematical relationships:

$$V_{REFDL\_L} = \qquad\qquad \text{Equation 5}$$
$$\frac{X1 + Y1}{2} = \frac{(VREFDLopt + M1) + (VREFDLopt - N1)}{2}$$

$$V_{REFL\_L} = VREFDLopt - \left(\frac{N1 - M1}{2}\right) \qquad \text{Equation 6}$$

$$\text{Let} \qquad\qquad \text{Equation 7}$$

$$OFFSET1 = \left(\frac{N1 + M1}{2}\right) \text{ and } Z1 = VREFDLopt - OFFSET1$$

$$\text{Now,} \qquad\qquad \text{Equation 8}$$

$$Z1 - Y1 = \left\{VREFDLopt - \left(\frac{N1 + M1}{2}\right)\right\} - \{(VREFDL_{opt} - N1)\}$$

$$Z1 - Y1 = \left(\frac{N1 - M1}{2}\right) = TAPDL \qquad \text{Equation 9}$$

$$TAPDL = Z1 - T1 \qquad\qquad \text{Equation 10}$$

$$TAPDL=Z1-Y1 \qquad\qquad \text{Equation 10}$$

TAPDH may be found as the difference between levels X2 and Z2 from plot 1202. Lower comparator (COMP_DL) may be used as the reference receiver and upper comparator (COMP_DH) may be used as the error receiver. Values for TAPDH may be obtained based on the following mathematical relationships:

$$V_{REFDL\_H} = \qquad\qquad \text{Equation 11}$$
$$\frac{X2 + Y2}{2} = \frac{(VREFDHopt + M2) + (VREFDHopt - N2)}{2}$$

$$V_{REFL\_H} = VREFDHopt + \left(\frac{M2 - N2}{2}\right) \qquad \text{Equation 12}$$

$$\text{Let} \qquad\qquad \text{Equation 13}$$

$$OFFSET2 = \left(\frac{N2 + M2}{2}\right) \text{ and } Z2 = VREFDHopt + OFFSET2$$

$$\text{Now,} \qquad\qquad \text{Equation 14}$$

$$X2 - Z2 = \{VREFDF_{opt} + M2\} - \left\{(VREFDH_{opt}) + \left(\frac{N2 + M2}{2}\right)\right\}$$

-continued $$X2 - Z2 = \left(\frac{M2 - N2}{2}\right) = TAPDH \qquad \text{Equation 15}$$

$$TAPDL = Z1 - T1 \qquad\qquad \text{Equation 16}$$

$$TAPDH=X2-Z2 \qquad\qquad \text{Equation 16}$$

Figure 13A:
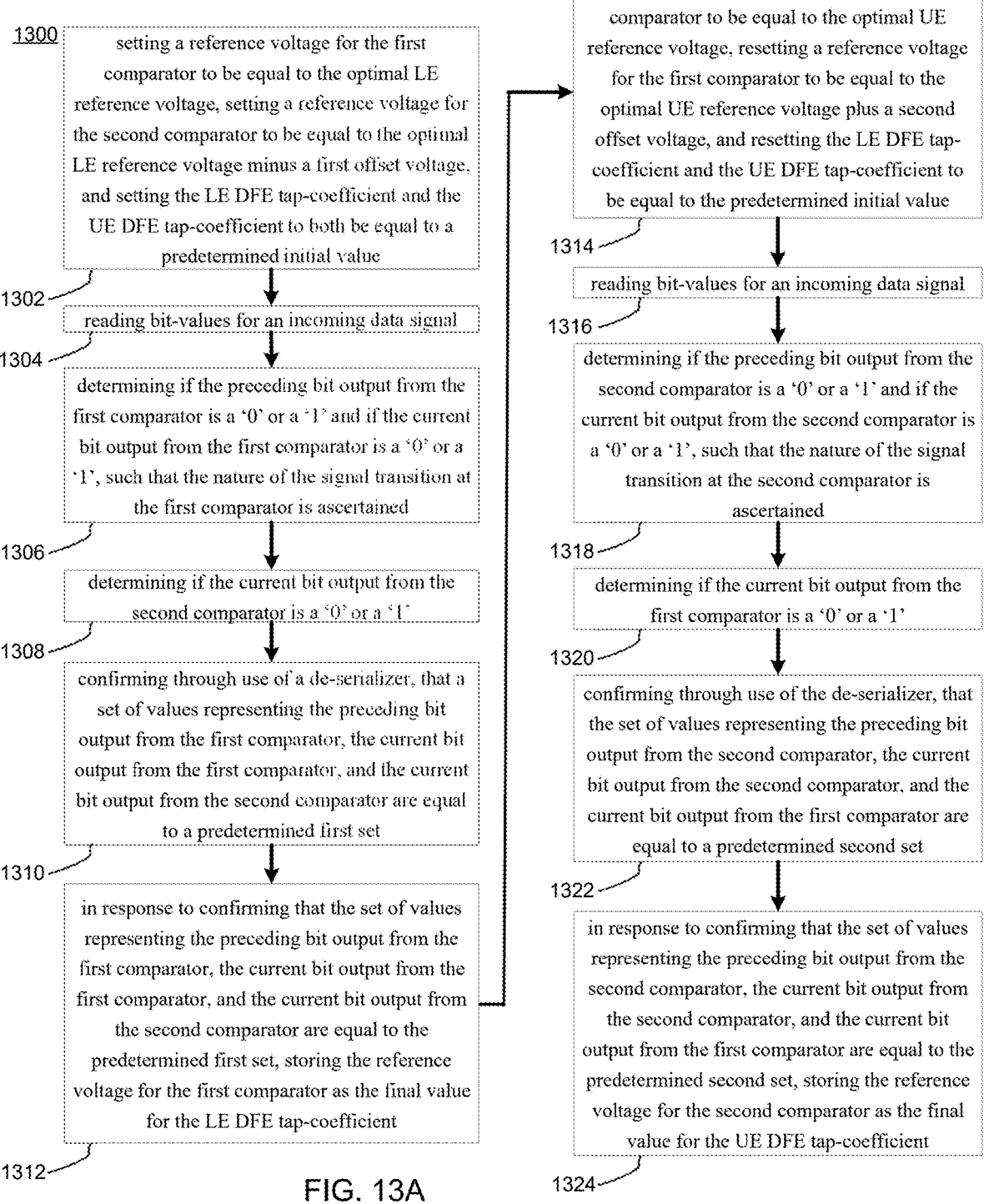
FIG. 13A-B shows flowcharts depicting operations related to partial equalization DFE training process consistent with an embodiment of the present disclosure.
Figure 13B:
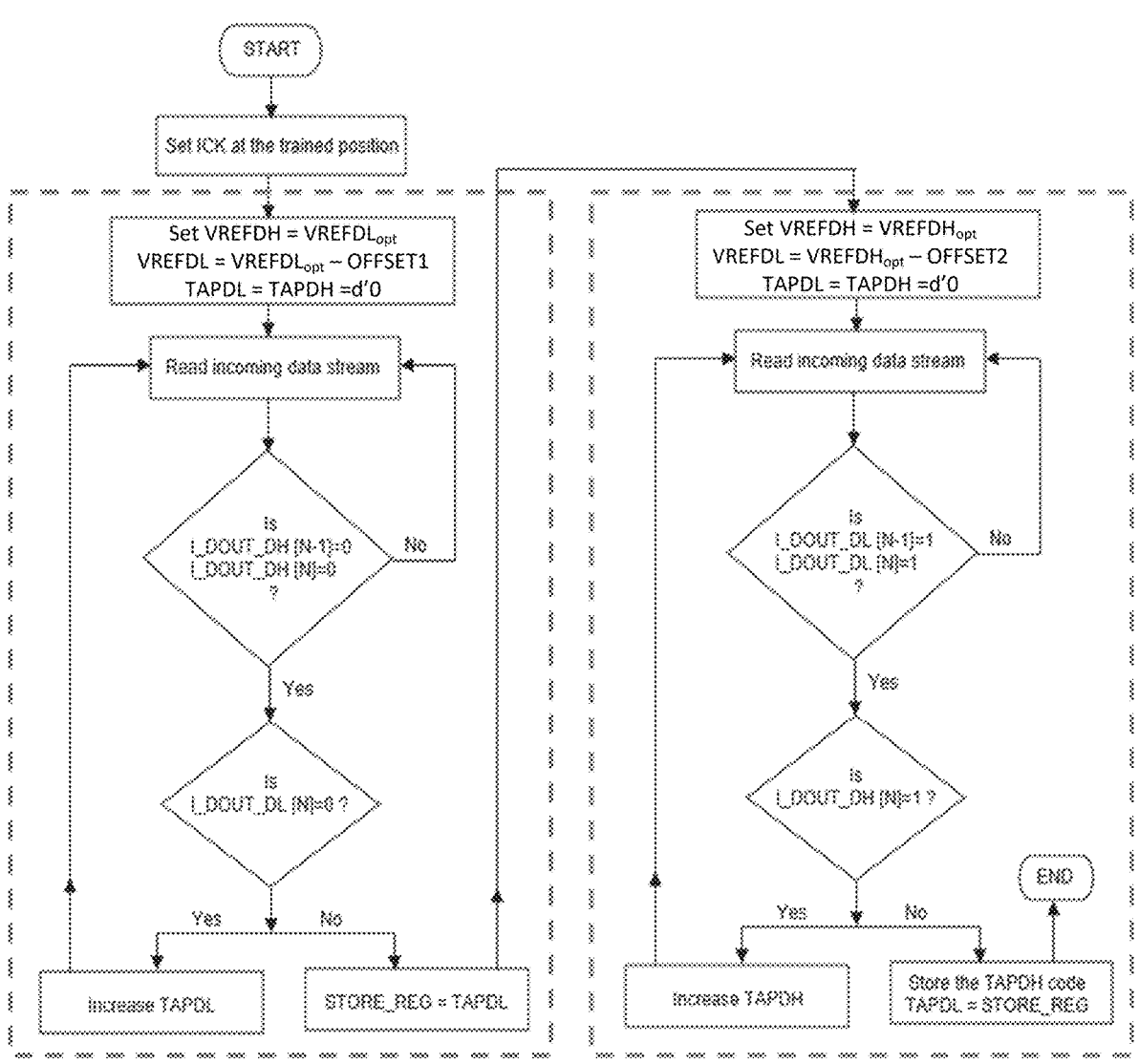

Referring now to FIGS. 13A-B, and 14, flowchart 1300 depicting operations related to partial equalization DFE training process, flowchart 1350 depicting operations related to partial equalization DFE training process, and tables 1400, 1402 related to lower-eye & upper-eye coefficients consistent with an embodiment of the present disclosure are provided.

In some embodiments, flowchart 1300 depicting upper-eye DFE training operations may be directed toward the process of computing final values for the LE DFE tap-coefficient and the UE DFE tap-coefficient. Flowchart 1300 may include setting (1302) a reference voltage for the upper comparator to be equal to the optimal LE reference voltage, setting a reference voltage for the lower comparator to be equal to the optimal LE reference voltage minus a first offset voltage, and setting the LE DFE tap-coefficient and the UE DFE tap-coefficient to both be equal to a predetermined initial value, reading (1304) bit-values for an incoming data signal, determining (1306) if the preceding bit output from the upper comparator may be a '0' or a '1' and if the current bit output from the upper comparator may be a '0' or a '1', such that the nature of the signal transition at the upper comparator may be ascertained. Flowchart 1300 may further include, determining (1308) if the current bit output from the lower comparator may be a '0' or a '1', confirming (1310) through use of a de-serializer, that a set of values representing the preceding bit output from the upper comparator, the current bit output from the upper comparator, and the current bit output from the lower comparator may be equal to a predetermined first set ['0', '0' and '1'], and in response to confirming that the set of values representing the preceding bit output from the upper comparator, the current bit output from the upper comparator, and the current bit output from the lower comparator may be equal to the predetermined first set ['0', '0' and '1'], storing (1312) the reference voltage for the upper comparator as the final value for the LE DFE tap-coefficient. Flowchart 1300 may also include, resetting (1314) the reference voltage for the lower comparator to be equal to the optimal UE reference voltage, resetting a reference voltage for the upper comparator to be equal to the optimal UE reference voltage plus a second offset voltage, and resetting the LE DFE tap-coefficient and the UE DFE tap-coefficient to be equal to the predetermined initial value, reading (1316) bit-values for the incoming data signal, and determining (1318) if the preceding bit output from the lower comparator may be a '0' or a '1' and if the current bit output from the lower comparator may be a '0' or a '1', such that the nature of the signal transition at the lower comparator may be ascertained. Flowchart 1300 may further include, determining (1320) if the current bit output from the upper comparator is a '0' or a '1', confirming (1322) through use of the de-serializer, that the set of values representing the preceding bit output from the lower comparator, the current bit output from the lower comparator, and the current bit output from the upper comparator may be equal to a predetermined second set ['1', '1', and '0'], and in response to confirming that the set of values representing the preceding bit output from the lower comparator, the current bit output from the lower comparator, and the current bit output from the upper comparator may be equal to the predetermined second set ['1', '1', and '0'], storing (1324) the reference voltage for the lower comparator as the final value for the UE DFE tap-coefficient.

The obtained values of lower-eye DFE tap coefficient (TAPDL) and related parameters (X1, Y1, Z1, OFFSET1) may be seen in table 1400. Similarly, obtained values of upper-eye DFE tap coefficient (TAPDH) and related parameters (X2, Y2, Z2, OFFSET2) may be seen in table 1402.

Referring now to FIGS. 15A-C, and 16, lower-eye plots 1500, 1502, 1504 depicting reference voltages ($V_{REFDH}$ and $V_{REFDL}$), and tables 1600, 1602, and 1604 defining parameters related to lower-eye coefficients used in the DFE training process consistent with embodiments of the present disclosure are provided. Both reference voltages VREFDH, VREFDL, and the strobe position, may be trained before DFE training may be started. To begin the DFE training process, at a trained strobe position of an equalizing LE (lower-eye), values for an LE minimum voltage, a mid-level LE voltage, and an LE maximum voltage for a current symbol may be obtained based on a preceding symbol, through use of a first comparator, a second comparator, and a third comparator.

If the previous symbol of the LE is '00' as shown in lower-eye plot 1500, then the minimum level of '01' in a [00 to 01] transition (712 mV) may be obtained, where the obtained LE minimum level may be given by VREFDL_LL_VIH. Similarly, if the previous symbol of the LE is '00' as shown in lower-eye plot 1500, then the maximum level of '00' in a [00 to 00] transition (512 mV) may be obtained, where the obtained LE maximum level may be given by VREFDL_LL_VIL. Based on these obtained values, an optimal reference may be an average of VREFDL_LL_VIL and VREFDL_LL_VIH levels. The obtained optimum level (LE minimum voltage) may be given by VREFDL_LL (612 mV) as may be seen in tables 1600, 1602, and 1604.

If the previous symbol of the lower eye is '01' as shown in lower-eye plot 1502, then the minimum level of '01' in a [01 to 01] transition (744.5 mV) may be obtained, where the obtained LE minimum level may be given by VREFDL_LH_VIH. Similarly, if the previous symbol of the LE is '01' as shown in lower-eye plot 1602, then the maximum level of '00' in a [01 to 00] transition (544.5 mV) may be obtained, where the obtained LE maximum level may be given by VREFDL_LH_VIL. Based on these obtained values, an optimal reference may be an average of VREFDL_LH_VIL and VREFDL_LH_VIH levels. The obtained optimum level (a mid-level LE voltage) may be given by VREFDL_LH (644.5 mV) as may be seen in tables 1600, 1602, and 1604.

If the previous symbol of the lower eye is '11' as shown in lower-eye plot 1504, then the minimum level of '01' in a [11 to 01] transition (777 mV) may be obtained, where the obtained LE minimum level may be given by VREFDL_HH_VIH. Similarly, if the previous symbol of the LE is '11' as shown in lower-eye plot 1604, then the maximum level of '00' in a [11 to 00] transition (577 mV) may be obtained, where the obtained LE maximum level may be given by VREFDL_HH_VIL. Based on these obtained values, an optimal reference may be an average of VREFDL_HH_VIL and VREFDL_HH_VIH levels. The obtained optimum level (LE maximum voltage) may be given by VREFDL_HH (677 mV) as may be seen in tables 1600, 1602, and 1604.

Referring now to FIGS. 17A-C and 18, upper-eye plots 1700, 1702, 1704 depicting reference voltages ($V_{REFDH}$ and $V_{REFDL}$), and tables 1800, 1802, and 1804 defining parameters related to upper-eye coefficients used in the DFE training process consistent with embodiments of the present disclosure are provided. To continue the DFE training process, at a trained strobe position of an equalizing UE (upper-eye), values for a UE minimum voltage, a mid-level UE voltage, and a UE maximum voltage for a current symbol may be obtained based on a preceding symbol, through use of a first comparator, a second comparator, and a third comparator.

If the previous symbol of the UE is '00' as shown in upper-eye plot 1700, then the maximum level of '01' in a [00 to 01] transition (720.5 mV) may be obtained, where the obtained UE maximum level may be given by VREFDH_LL_VIL. Similarly, if the previous symbol of the UE is '00' as shown in upper-eye plot 1700, then the minimum level of '11' in a [00 to 11] transition (920.5 mV) may be obtained, where the obtained UE minimum level may be given by VREFDH_LL_VIH. Based on these obtained values, an optimal reference may be an average of VREFDH_LL_VIL and VREFDH_LL_VIH levels. The obtained optimum level (UE minimum voltage) may be given by VREFDH_LL (820.5 mV) as may be seen in tables 1800, 1802, and 1804.

If the previous symbol of the upper eye is '01' as shown in upper-eye plot 1702, then the maximum level of '01' in a [01 to 01] transition (755.5 mV) may be obtained, where the obtained UE maximum level may be given by VREFDH_LH_VIL. Similarly, if the previous symbol of the LE is '01' as shown in upper-eye plot 1702, then the minimum level of '11' in a [01 to 11] transition (955.5 mV) may be obtained, where the obtained UE minimum level may be given by VREFDH_LH_VIH. Based on these obtained values, an optimal reference may be an average of VREFDH_LH_VIL and VREFDH_LH_VIH levels. The obtained optimum level (a mid-level UE voltage) may be given by VREFDH_LH (855.5 mV) as may be seen in tables 1800, 1802, and 1604.

If the previous symbol of the upper eye is '11' as shown in upper-eye plot 1704, then the maximum level of '01' in a [11 to 01] transition (788 mV) may be obtained, where the obtained UE minimum level may be given by VREFDH_HH_VIL. Similarly, if the previous symbol of the UE is '11' as shown in lower-eye plot 1704, then the minimum level of '11' in a [11 to 11] transition (988 mV) may be obtained, where the obtained UE minimum level may be given by VREFDL_HH_VIH. Based on these obtained values, an optimal reference may be an average of VREFDH_HH_VIL and VREFDH_HH_VIH levels. The obtained optimum level (UE maximum voltage) may be given by VREFDH_HH (888 mV) as may be seen in tables 1800, 1802, and 1804.

Figure 19:
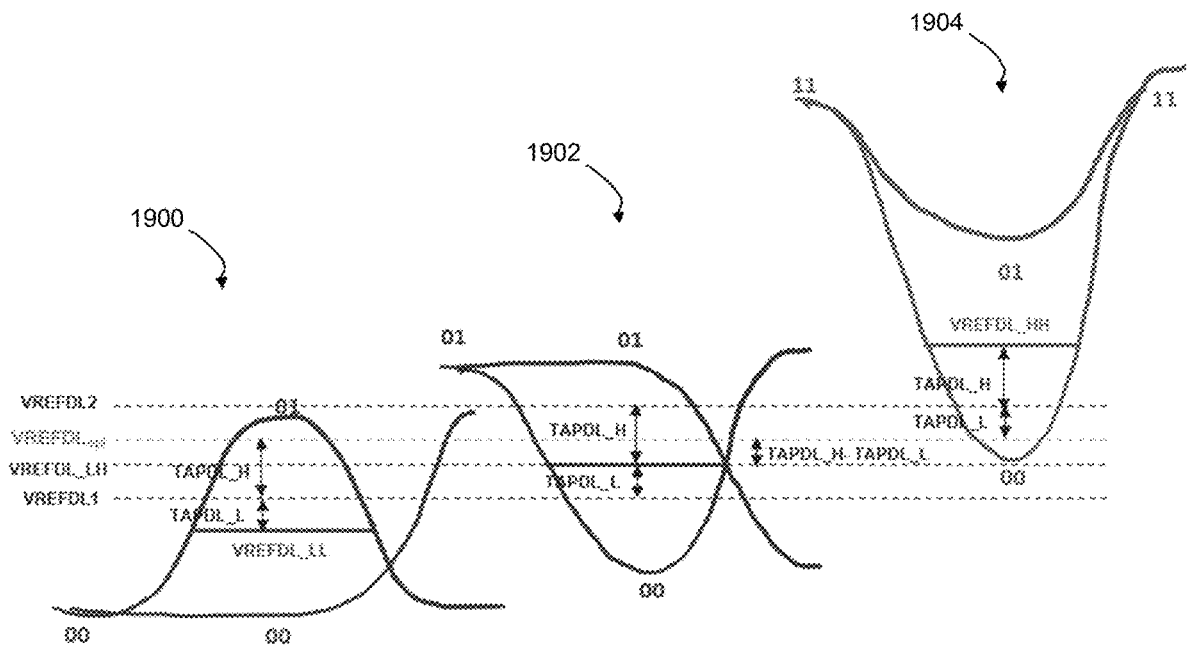
FIG. 19 shows plots of lower-eye optimized reference voltages for expected tap coefficient consistent with embodiments of the present disclosure.

Referring now to FIG. 19, plots 1900, 1902, 1904 of optimized reference voltages for expected tap coefficients consistent with embodiments of the present disclosure are provided. Plots 1900, 1902, 1904 may all show the optimized receiver reference voltage $V_{REFDLopt}$ and lower tap coefficients TAPDL_H and TAPDL_L, which may offer maximum voltage margins for both 1-level and 2-level transitions for the lower eye. However, plot 1900 may focus on the LE minimum voltage (VREFDL_LL), while plot 1902 may focus on the mid-level LE voltage (VREFDL_LH), and plot 1904 may focus on the LE maximum voltage (VREFDL_HH). Values for $V_{REFDLopt}$ may be obtained based on the following mathematical relationships:

23

$$VREFDL\_LL = VREFDLopt - TAPDL\_H - TAPDL\_L \qquad \text{Equation 17}$$

$$VREFDL\_LH = VREFDLopt - TAPDL\_H + TAPDL\_L \qquad \text{Equation 18}$$

$$VREFDL\_HH = VREFDLopt + TAPDL\_H + TAPDL\_L \qquad \text{Equation 19}$$

$$TAPDL\_L = 0.5 * (VREFDL\_LH - VREFDL\_LL) \qquad \text{Equation 20}$$

$$TAPDL\_H = 0.5 * (VREFDL\_HH - VREFDL\_LH) \qquad \text{Equation 21}$$

$$VREFDLopt = 0.5 * (VREFDL\_LL + VREFDL\_HH) \qquad \text{Equation 22}$$

$$\text{Let } VREFDL1 = 0.5 * (VREFDL\_LL + VREFDL\_LH) \qquad \text{Equation 23}$$

$$\text{Let } VREFDL2 = 0.5 * (VREFDL\_LH + VREFDL\_HH) \qquad \text{Equation 24}$$

Combining Equations 18 & 21 results in: $VREFDL1 -$ \qquad Equation 25

$$TAPDL\_L = VREFDL\_LL$$

Combining Equations 19 & 22 results in: $VREFDL2 -$ \qquad Equation 26

$$TAPDL\_H = VREFDL\_HH$$

Figure 20:
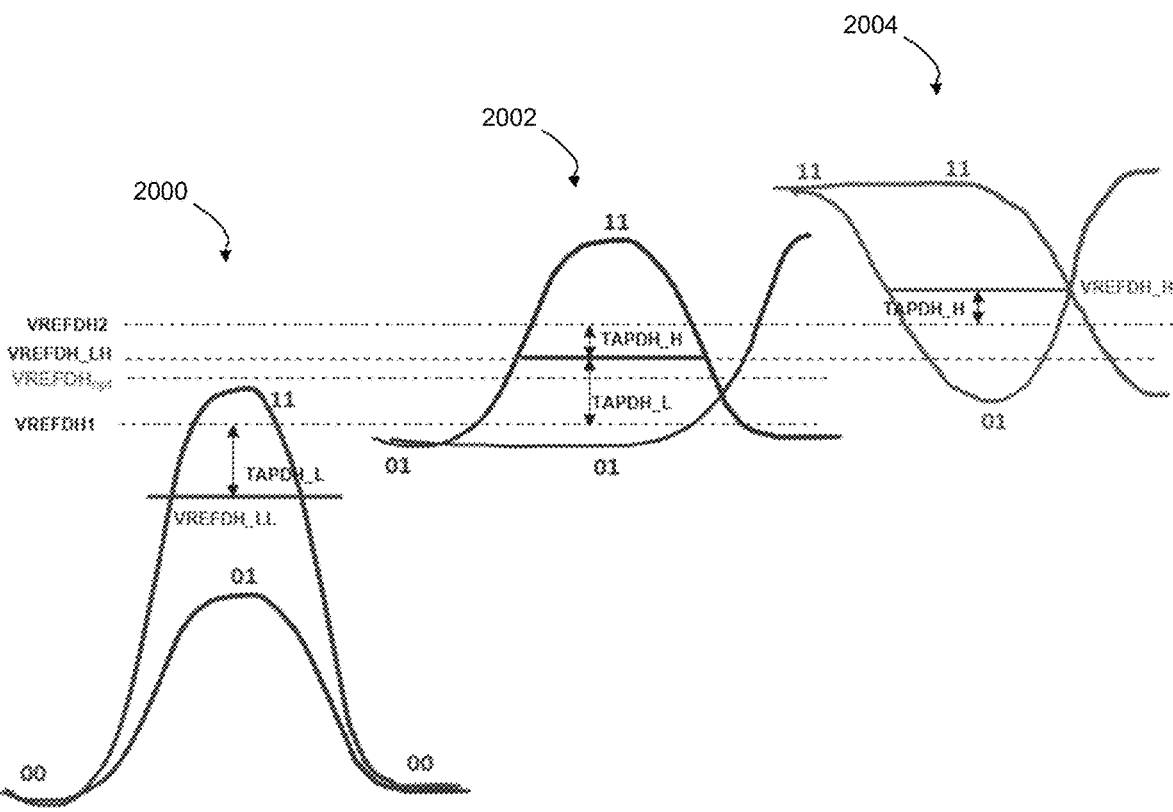
FIG. 20 shows plots of upper-eye optimized reference voltages for expected tap coefficient consistent with embodiments of the present disclosure.

Referring now to FIG. 20, plots 2000, 2002, 2004 of optimized reference voltages for expected tap coefficients consistent with embodiments of the present disclosure are provided. Plots 2000, 2002, 2004 may all show the optimized receiver reference voltage $V_{REFDHopt}$ and lower tap coefficients TAPDH_L and TAPDH_H, which may offer maximum voltage margins for both 1-level and 2-level transitions for the upper eye. However, plot 2000 may focus on the UE minimum voltage (VREFDH_LL), while plot 2002 may focus on the mid-level UE voltage (VREFDH_LH), and plot 2004 may focus on the UE maximum voltage (VREFDH_HH). Values for $V_{REFDHopt}$ may be obtained based on the following mathematical relationships:

$$VREFDH\_LL = VREFDHopt - TAPDH\_H - TAPDH\_L \qquad \text{Equation 27}$$

$$VREFDH\_LH = VREFDHopt - TAPDH\_H + TAPDH\_L \qquad \text{Equation 28}$$

$$VREFDH\_HH = VREFDHopt + TAPDH\_H + TAPDH\_L \qquad \text{Equation 29}$$

$$TAPDH\_L = 0.5 * (VREFDH\_LH - VREFDH\_LL) \qquad \text{Equation 30}$$

$$TAPDH\_H = 0.5 * (VREFDH\_HH - VREFDH\_LH) \qquad \text{Equation 31}$$

$$VREFDH_{opt} = 0.5 * (VREFDH\_LL + VREFDH\_HH) \qquad \text{Equation 32}$$

$$\text{Let } VREFDH1 = 0.5 * (VREFDH\_LL + VREFDH\_LH) \qquad \text{Equation 33}$$

$$\text{Let } VREFDH2 = 0.5 * (VREFDH\_LH + VREFDH\_HH) \qquad \text{Equation 34}$$

Combining Equations 28 & 31 results in: $VREFDH1 -$ \qquad Equation 35

$$TAPDH\_L = VREFDH\_LL$$

Combining Equations 29 & 32 results in: $VREFDH2 +$ \qquad Equation 36

$$TAPDH\_H = VREFDH\_HH$$

Figure 21:
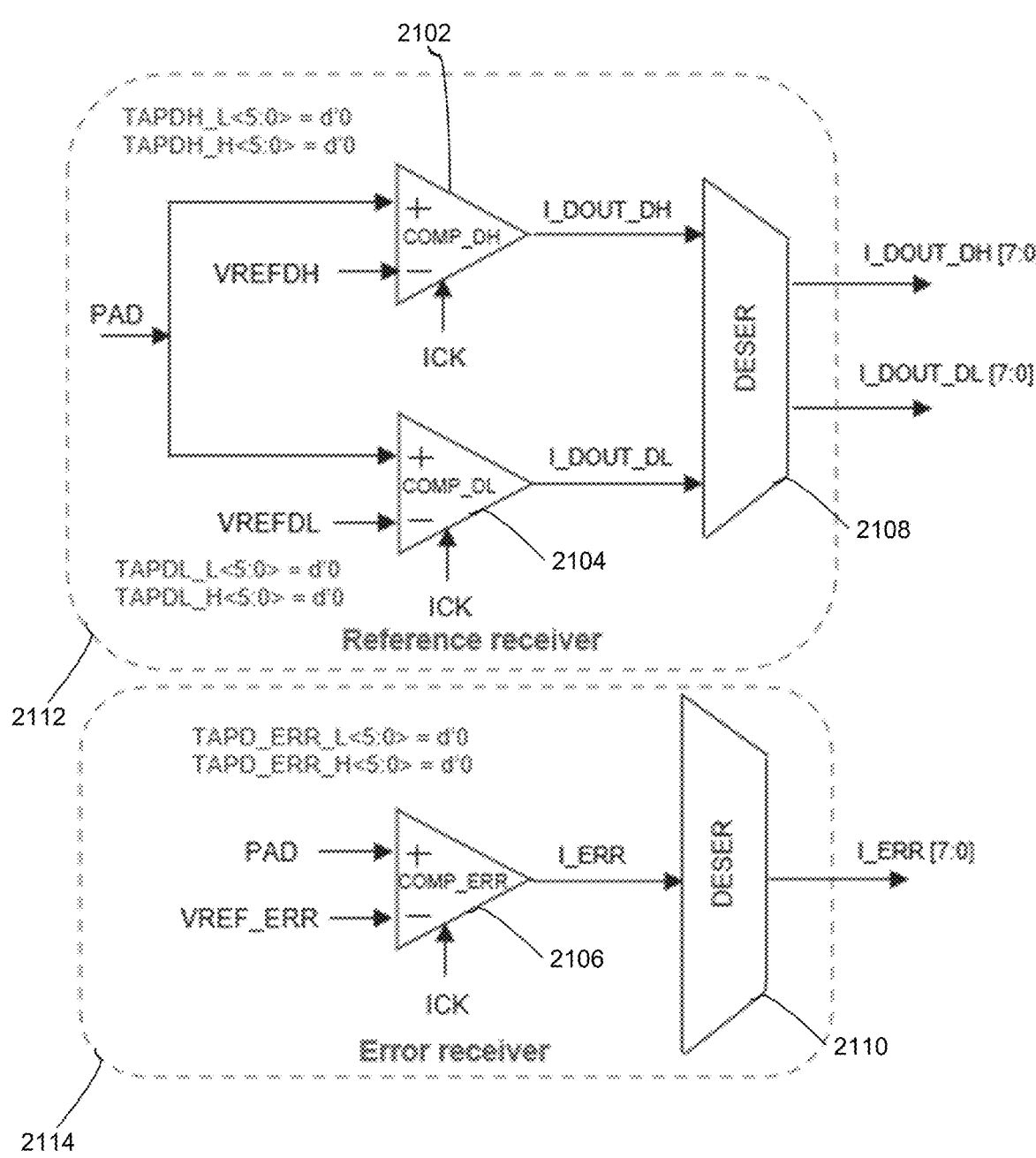
FIG. 21 shows a hardware implementation of full equalization DFE training process consistent with an embodiment of the present disclosure.

Referring now to FIG. 21, circuit 2100 for implementing the full equalization DFE training consistent with an embodiment of the present disclosure is provided. Circuit 2100 may show the hardware elements required to implement the 1-Tap DFE partial equalization algorithm. No additional receiver may be required, because the training process may reuse the existing hardware elements. Circuit 2100 may include a data pad (PAD) configured to receive an input signal from a dynamic random access memory (DRAM) device, upper comparator 2102 (COMP_DH), lower comparator 2104 (COMP_DL), and error comparator 2106 (COMP_ERR) may all be operatively connected to the

24

PAD. Upper comparator 2102 may be configured to receive a UE reference voltage (VREFDH), lower comparator 2104 may be configured to receive an LE reference voltage (VREFDL), and error comparator 2106 may be configured to receive an error reference voltage (VREF_ERR). First de-serializer 2108 may be operatively connected to both upper comparator 2102 and lower comparator 2104, and configured to receive a first output (I_DOUT_DH) from upper comparator 2102, and a second output (I_DOUT_DL) from lower comparator 2104. Additionally, first de-serializer 2108 may be configured to generate a first output (I_D-OUT_DH [7:0]) and a second output (I_DOUT_DL [7:0]). Further, second de-serializer 2110 may be operatively connected to error comparator 2106, and configured to receive a third output (I_ERR from error comparator 2106. Second de-serializer 2110 may be further configured to generate a third output (I_ERR [7:0]).

In some embodiments, upper comparator 2102 and lower comparator 2104 may be configured to be used together as a reference receiver 2112 and error comparator 2106 may be configured to be used as an error receiver 2114 while computing the LE and UE DFE tap-coefficients.

Figure 22B:
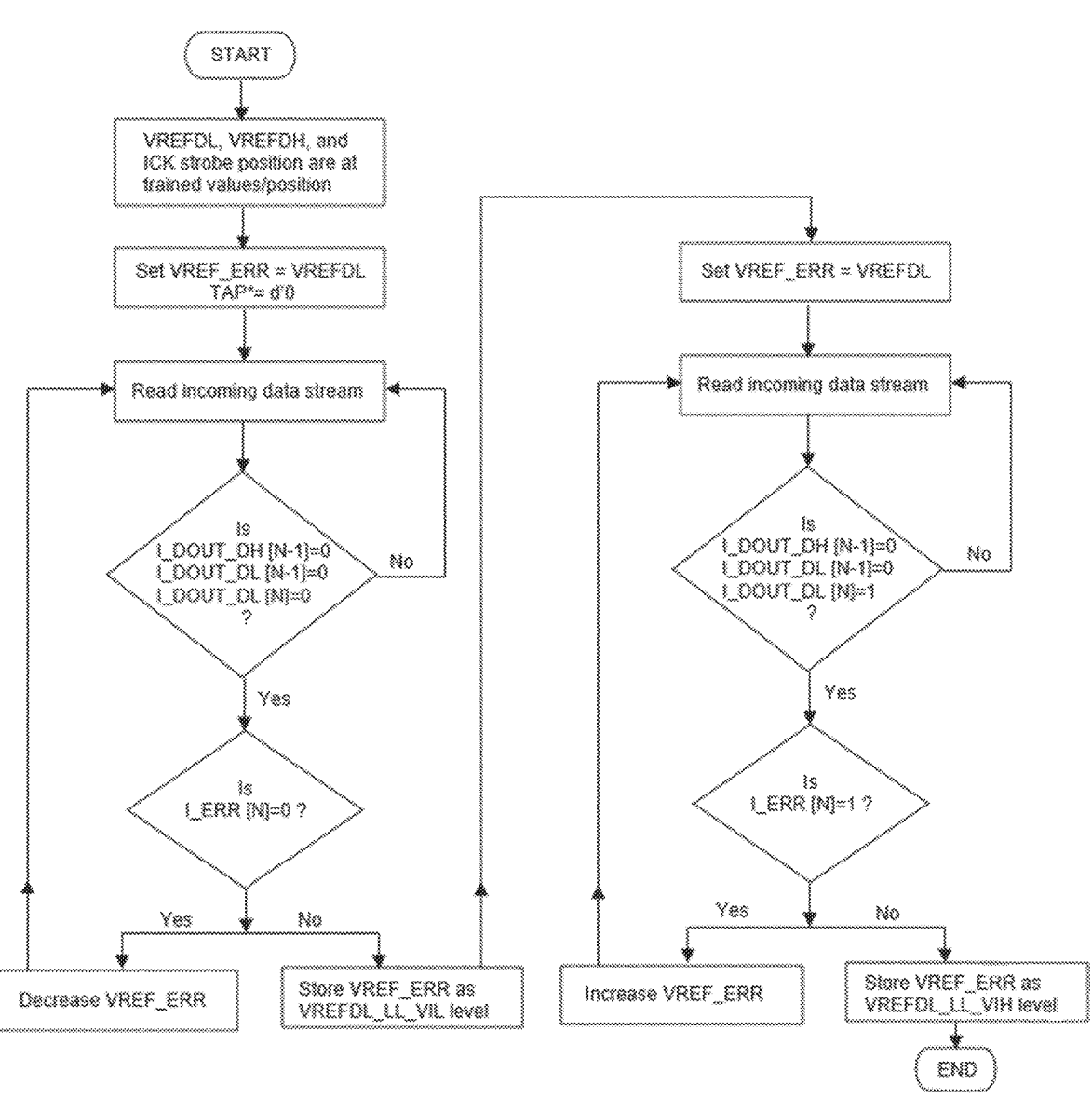

Referring now to FIGS. 22A-B, flowchart 2200 depicting lower-eye DFE training operations, and flowchart 2250 depicting lower-eye DFE training operations consistent with an embodiment of the present disclosure are provided.

In some embodiments, flowchart 2200 depicting lower-eye DFE training operations may be directed toward the process of obtaining, at a trained strobe position of an equalizing LE (lower-eye), an LE minimum voltage, a mid-level LE voltage, and an LE maximum voltage for a current bit based on a preceding bit, through use of an upper comparator, a lower comparator, and an error comparator. Flowchart 2200 may include setting (2202) a reference voltage for the error comparator to be equal to an LE reference voltage threshold, and setting initial values for the high LE DFE tap-coefficient, the low LE DFE tap-coefficient, the high UE DFE tap-coefficient, the low UE DFE tap-coefficient, a low error DFE tap-coefficient, and a high error DFE tap-coefficient, reading (2204) bit-values for an incoming data signal, and determining (2206) if a preceding bit output from the upper comparator may be a '0' or a '1', if a preceding bit output from the lower comparator may be a '0' or a '1', and if a current bit output from the lower comparator may be a '0' or a '1', such that the nature of a signal transition of the incoming data signal may be ascertained. Flowchart 2200 may further include, determining (2208) if the current bit output from the error comparator may be a '0' or a '1', confirming (2210) through use of a de-serializer, that a set of values representing the preceding bit output from the upper comparator, the preceding bit output from the lower comparator, the current bit output from the lower comparator, and the current bit output from the error comparator may be at least one of a first set ['0', '0', '0', and '1'], a second set ['0', '1', '0', and '1'], or a third set ['1', '1', '0', and '1'], and in response to confirming that the set of values representing the preceding bit output from the upper comparator, the preceding bit output from the lower comparator, the current bit output from the lower comparator, and the current bit output from the error comparator may be at least one of the first set ['0', '0', '0', and '1'], the second set ['0', '1', '0', and '1'], or the third set ['1', '1', '0', and '1'], storing (2212) the reference voltage for the error comparator voltage as at least one of the second reference voltage, the fourth reference voltage or the sixth reference voltage. Flowchart 2200 may also include, resetting (2214) the reference voltage of the error comparator to be equal to the initial value for the LE reference voltage threshold, reading (2216) bit-values for the incoming data signal, and determining (2218) if the preceding bit output from the upper comparator may be a '0' or a '1', if the preceding bit output from the lower comparator may be a '0' or a '1', and if the current bit output from the lower comparator may be a '0' or a '1', such that the nature of the signal transition of the incoming data signal may be ascertained. Flowchart 2200 may also include, determining (2220) if the current bit output from the error comparator may be a '0' or a '1', confirming (2222) through use of a de-serializer, that the set of values representing the preceding bit output from the upper comparator, the preceding bit output from the lower comparator, the current bit output from the lower comparator, and the current bit output from the error comparator may be at least one of a fourth set ['0', '0', '1', and '0'], a fifth set ['0', '1', '1', and '0'], or a sixth set ['1', '1', '1', and '0'], and in response to confirming that the set of values representing the preceding bit output from the upper comparator, the preceding bit output from the lower comparator, the current bit output from the lower comparator, and the current bit output from the error comparator may be at least one of a fourth set ['0', '0', '1', and '0'], a fifth set ['0', '1', '1', and '0'], or a sixth set ['1', '1', '1', and '0'], storing (2224) the reference voltage for the error comparator voltage as at least one of the first reference voltage, the third reference voltage or the fifth reference voltage.

In some embodiments, flowchart 2250 depicting lower-eye DFE training operations may illustrate the case where the previous symbol of the lower-eye may be '00', or more specifically the case where the preceding bit for the upper comparator (I_DOUT_DH [N−1]), the preceding bit for the lower comparator (I_DOUT_DL [N−1]), and the current bit for the lower comparator (I_DOUT_DL [N]) may be '0', '0' and '0' respectively, while reference voltage VREF_ERR may be stored as VREFDL_LL_VIL as a first tap value, and where the preceding bit for the upper comparator (I_DOUT_DH [N−1]), the preceding bit for the lower comparator (I_DOUT_DL [N−1]), and the current bit for the lower comparator (I_DOUT_DL [N]) may be '0', '0' and '1' respectively, while reference voltage VREF_ERR may be stored as VREFDL_LL_VIH as a second tap value. To account for the case where the previous symbol of the lower-eye may be '01' the same process may be used however the preceding bit of the lower comparator (I_DOUT_DL [N−1]) may be changed to '1' and reference voltage VREF_ERR may be stored as VREFDL_LH_VIL as the first tap value, and stored as VREFDL_LH_VIH as the second tap value. To account for the case where the previous symbol of the lower-eye may be '11' the same process may be used however the preceding bit of the upper comparator (I_DOUT_DH [N−1]) may be changed to '1', the preceding bit of the lower comparator (I_DOUT_DL [N−1]) may be changed to '1', and reference voltage VREF_ERR may be stored as VREFDL_HH_VIL as the first tap value, and stored as VREFDL_HH_VIH as the second tap value.

Referring now to FIGS. 23A-B, flowchart 2300 depicting upper-eye DFE training operations, and flowchart 2350 depicting upper-eye DFE training operations consistent with an embodiment of the present disclosure are provided.

In some embodiments, flowchart 2300 depicting upper-eye DFE training operations may be directed toward the process of obtaining, at a trained strobe position of an equalizing UE (upper-eye), a UE minimum voltage, a mid-level UE voltage, and a UE maximum voltage for a current bit based on a preceding bit, through use of an upper comparator, a lower comparator, and an error comparator. Flowchart 2300 may include setting (2302) a reference voltage for the error comparator to be equal to an LE reference voltage threshold, and setting initial values for the high LE DFE tap-coefficient, the low LE DFE tap-coefficient, the high UE DFE tap-coefficient, the low UE DFE tap-coefficient, a low error DFE tap-coefficient, and a high error DFE tap-coefficient, reading (2304) bit-values for an incoming data signal, determining (2306) if a preceding bit output from the upper comparator may be a '0' or a '1', if a preceding bit output from the lower comparator may be a '0' or a '1', and if a current bit output from the upper comparator may be a '0' or a '1', such that the nature of a signal transition of the incoming data signal may be ascertained, and determining (2308) if the current bit output from the error comparator may be a '0' or a '1'. Flowchart 2300 may further include, confirming (2310) through use of a de-serializer, that a set of values representing the preceding bit output from the upper comparator, the preceding bit output from the lower comparator, the current bit output from the upper comparator, and the current bit output from the error comparator may be at least one of a seventh set ['0', '0', '0', and '1'], an eighth set ['0', '1', '0', and '1'], or a ninth set ['1', '1', '1', and '0'], in response to confirming that the set of values representing the preceding bit output from the upper comparator, the preceding bit output from the lower comparator, the current bit output from the upper comparator, and the current bit output from the error comparator may be at least one of the seventh set ['0', '0', '0', and '1'], the eighth set ['0', '1', '0', and '1'], or the ninth set ['1', '1', '1', and '0'], storing (2312) the reference voltage for the error comparator voltage as at least one of the seventh reference voltage, the ninth reference voltage or the eleventh reference voltage, and resetting (2314) the reference voltage of the error comparator to be equal to the initial value for the UE reference voltage threshold. Flowchart 2300 may also include, reading (2316) bit-values for the incoming data signal, determining (2318) if the preceding bit output from the upper comparator may be a '0' or a '1', if the preceding bit output from the lower comparator may be a '0' or a '1', and if the current bit output from the upper comparator may be a '0' or a '1', such that the nature of the signal transition of the incoming data signal may be ascertained, and determining (2320) if the current bit output from the error comparator may be a '0' or a '1'. Flowchart 2300 may further include, confirming (2322) through use of a de-serializer, that the set of values representing the preceding bit output from the upper comparator, the preceding bit output from the lower comparator, the current bit output from the upper comparator, and the current bit output from the error comparator may be at least one of a tenth set ['0', '0', '1', and '0'], an eleventh set ['0', '1', '1', and '0'], or a twelfth set ['1', '1', '1', and '0'], in response to confirming that the set of values representing the preceding bit output from the upper comparator, the preceding bit output from the lower comparator, the current bit output from the upper comparator, and the current bit output from the error comparator may be at least one of a tenth set ['0', '0', '1', and '0'], an eleventh set ['0', '1', '1', and '0'], or a twelfth set ['1', '1', '1', and '0'], and storing (2324) the reference voltage for the error comparator voltage as at least one of the eighth reference voltage, the tenth reference voltage or the twelfth reference voltage.

In some embodiments, flowchart 2350 depicting upper-eye DFE training operations may illustrate the case where the previous symbol of the upper-eye may be '00', or more specifically the case where the preceding bit for the upper comparator (I_DOUT_DH [N−1]), the preceding bit for the lower comparator (I_DOUT_DL [N−1]), and the current bit for the lower comparator (I_DOUT_DL [N]) may be '0', '0' and '0' respectively, while reference voltage VREF_ERR may be stored as VREFDH_LL_VIL as a first tap value, and where the preceding bit for the upper comparator (I_DOUT_DH [N−1]), the preceding bit for the lower comparator (I_DOUT_DL [N−1]), and the current bit for the lower comparator (I_DOUT_DL [N]) may be '0', '0' and '1' respectively, while reference voltage VREF_ERR may be stored as VREFDH_LL_VIH as a second tap value. To account for the case where the previous symbol of the upper-eye may be '01' the same process may be used however the preceding bit of the lower comparator (I_DOUT_DL [N−1]) may be changed to '1' and reference voltage VREF_ERR may be stored as VREFDH_LH_VIL as the first tap value, and stored as VREFDH_LH_VIH as the second tap value. To account for the case where the previous symbol of the lower-eye may be '11' the same process may be used however the preceding bit of the upper comparator (I_DOUT_DH [N−1]) may be changed to '1', the preceding bit of the lower comparator (I_DOUT_DL [N−1]) may be changed to '1', and reference voltage VREF_ERR may be stored as VREFDH_HH_VIL as the first tap value, and stored as VREFDH_HH_VIH as the second tap value.

In some embodiments, if the transfer characteristic of the reference voltages (VREF) and the DAC (Digital to Analog Convertor) is the same as the transfer characteristic of the DFE taps (TAPDH/L_H/L) and the DAC, then the tap coefficients may be computed directly. TAPDH/L_H/L codes may be added/subtracted directly from reference voltage codes. However, if the transfer characteristics are different, then additional measures may be executed.

Figure 24A:
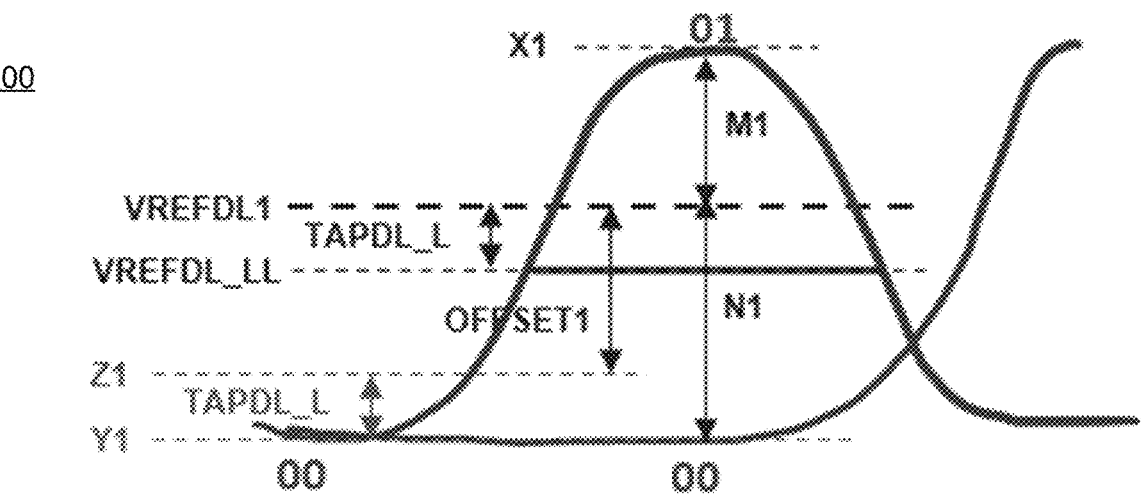
FIG. 24A-B shows plots of reference voltages for expected tap coefficient consistent with embodiments of the present disclosure.
Figure 24B:
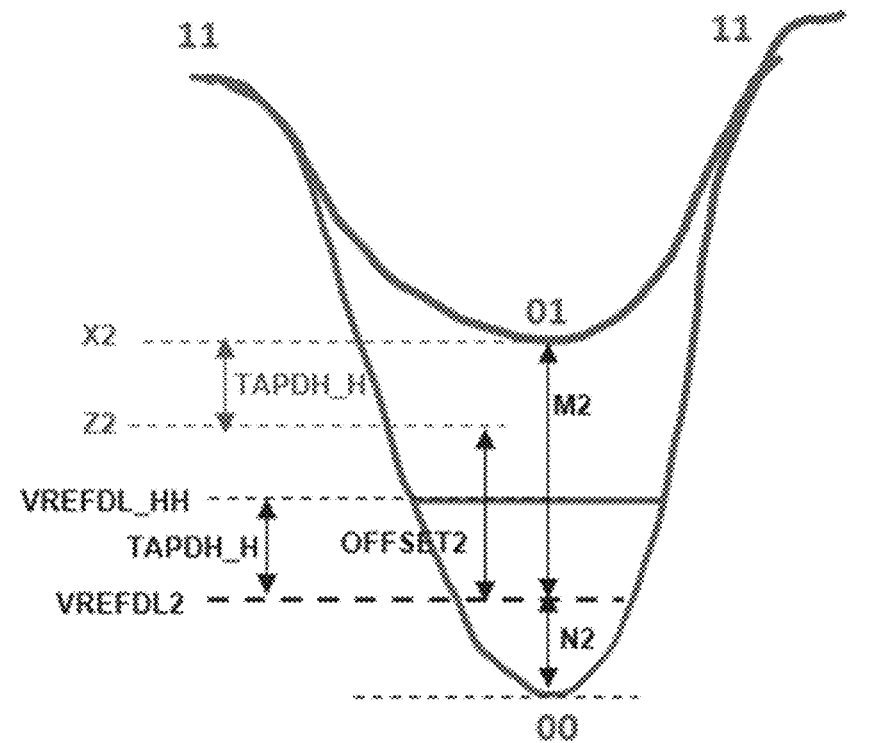

Referring now to FIGS. 24A-B, plots 2400, 2402 of reference voltages for expected tap coefficients consistent with an embodiment of the present disclosure are provided. TAPDL_L may be found as the difference between levels Z1 and Y1 from plot 2400. Values for TAPDL_L may be obtained based on the following mathematical relationships:

$$V_{REFDL\_LL} = \qquad \text{Equation 37}$$
$$\frac{X1 + Y1}{2} = \frac{(VREFDL1 + M1) + (VREFDL1 - N1)}{2}$$

$$V_{REFDL\_LL} = VREFDL1 - \left(\frac{N1 - M1}{2}\right) \qquad \text{Equation 38}$$

$$\text{Let} \qquad \text{Equation 39}$$

$$OFFSET1 = \left(\frac{N1 + M1}{2}\right) \text{ and } Z1 = VREFDL1 - OFFSET1$$

$$\text{Now,} \qquad \text{Equation 40}$$

$$Z1 - Y1 = \left\{VREFDL1 - \left(\frac{N1 + M1}{2}\right)\right\} - \{(VREFDL1 - N1)\}$$

$$Z1 - Y1 = \left(\frac{N1 - M1}{2}\right) = TAPDL\_L \qquad \text{Equation 41}$$

$$TAPDL\_L = Z1 - Y1 \qquad \text{Equation 42}$$

$$TAPDL\_L = Z1 - Y1 \qquad \text{Equation 42}$$

TAPDL_H may be found as the difference between levels X2 and Z2 from plot 2402. Values for TAPDL_H may be obtained based on the following mathematical relationships:

$$V_{REFDL\_HH} = \qquad \text{Equation 43}$$
$$\frac{X2 + Y2}{2} = \frac{(VREFDL2 + M2) + (VREFDL2 - N2)}{2}$$

$$V_{REFDL\_HH} = VREFDL2 + \left(\frac{M2 - N2}{2}\right) \qquad \text{Equation 44}$$

$$\text{Let} \qquad \text{Equation 45}$$

$$OFFSET2 = \left(\frac{N2 + M2}{2}\right) \text{ and } Z2 = VREFDL2 + OFFSET2$$

$$\text{Now,} \qquad \text{Equation 46}$$

$$X2 - Z2 = \{VREFDL2 + M2\} - \left\{(VREFDL2) + \left(\frac{N2 + M2}{2}\right)\right\}$$

$$X2 - Z2 = \left(\frac{M2 - N2}{2}\right) = TAPDL\_H \qquad \text{Equation 47}$$

$$TAPDL\_H = X2 - Z2 \qquad \text{Equation 48}$$

$$TAPDL\_H = X2 - Z2 \qquad \text{Equation 48}$$

Figure 25A:
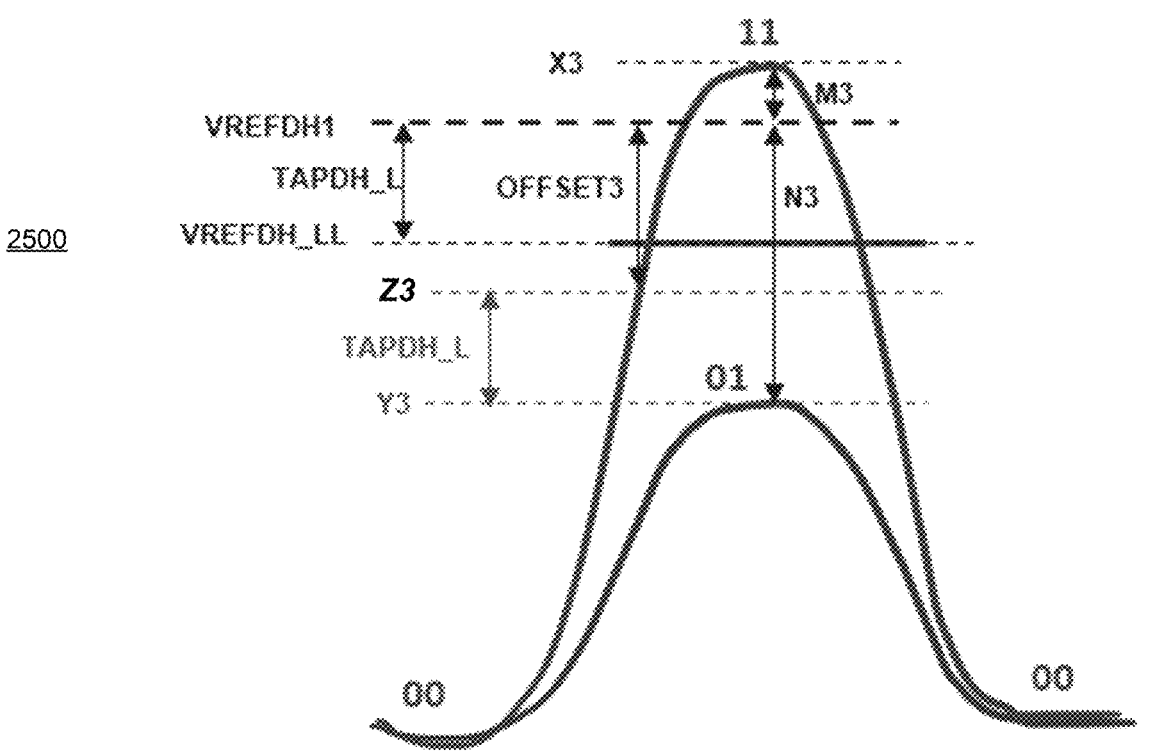
FIG. 25A-B shows plots of reference voltages for expected tap coefficient consistent with embodiments of the present disclosure.
Figure 25B:
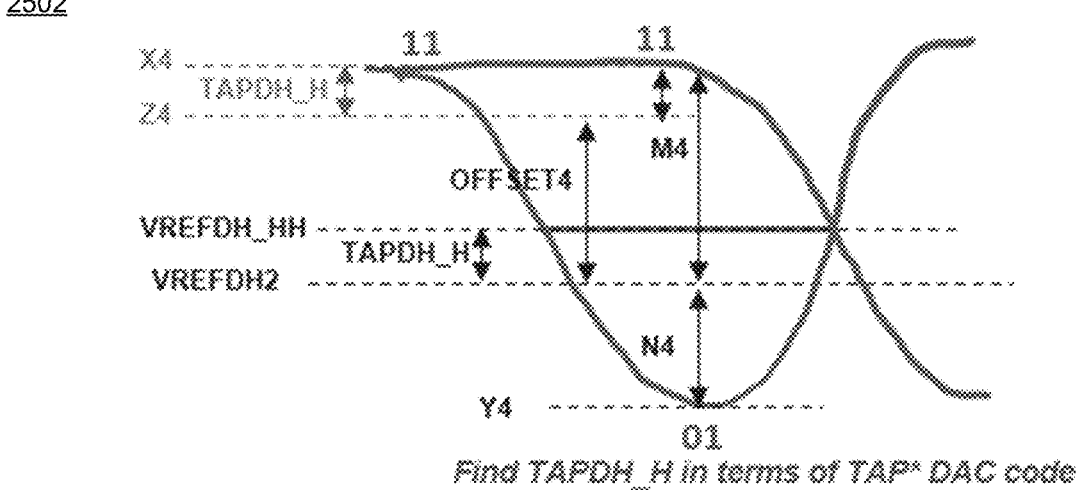
Figure 27:
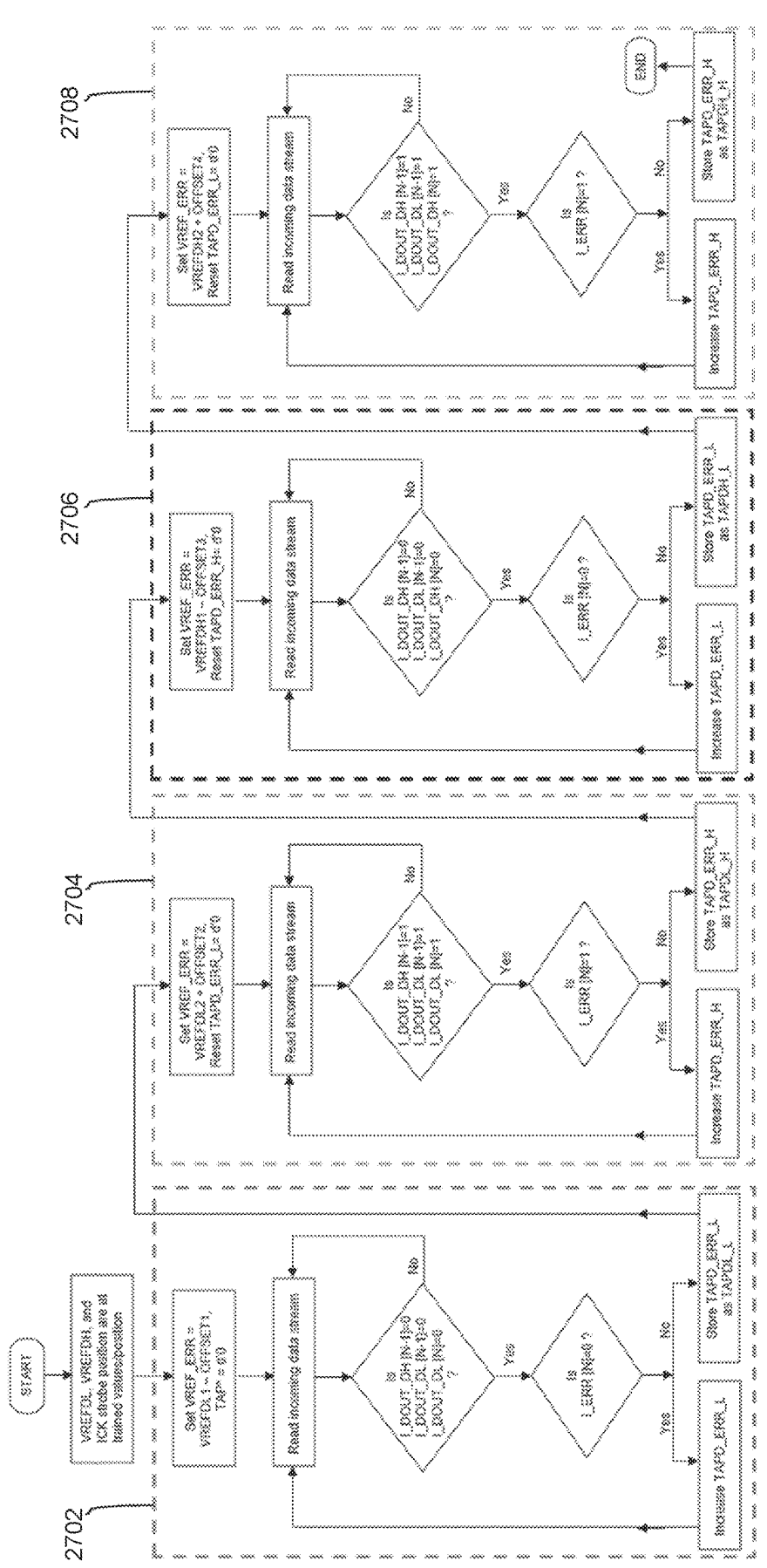
FIG. 27 shows a flowchart depicting operations related to full equalization DFE training process consistent with an embodiment of the present disclosure.

Referring now to FIGS. 25A-B, plots 2500, 2502 of reference voltages for expected tap coefficients consistent with an embodiment of the present disclosure are provided. TAPDH_L may be found as the difference between levels Z3 and Y3 from plot 2500. Values for TAPDH_L may be obtained based on the following mathematical relationships:

$$V_{REFDH\_LL} = \qquad \text{Equation 49}$$
$$\frac{X3 + Y3}{2} = \frac{(VREFDH1 + M3) + (VREFDH1 - N3)}{2}$$

$$V_{REFDH\_LL} = VREFDH1 - \left(\frac{N3 - M3}{2}\right) \qquad \text{Equation 50}$$

$$\text{Let} \qquad \text{Equation 51}$$

$$OFFSET3 = \left(\frac{N3 + M3}{2}\right) \text{ and } Z3 = VREFDH1 - OFFSET3$$

$$\text{Now,} \qquad \text{Equation 52}$$

$$Z3 - Y3 = \left\{VREFDH1 - \left(\frac{N3 + M3}{2}\right)\right\} - \{(VREFDH1 - N3)\}$$

$$Z3 - Y3 = \left(\frac{N3 - M3}{2}\right) = TAPDH\_L \qquad \text{Equation 53}$$

$$TAPDH\_L = Z3 - Y3 \qquad \text{Equation 54}$$

$$TAPDH\_L = Z3 - Y3 \qquad \text{Equation 54}$$

TAPDH_H may be found as the difference between levels X4 and Z4 from plot 2502. Values for TAPDH_H may be obtained based on the following mathematical relationships:

$$V_{REFDH\_HH} = \qquad \text{Equation 55}$$
$$\frac{X4 + Y4}{2} = \frac{(VREFDH2 + M4) + (VREFDH2 - N4)}{2}$$

$$V_{REFDL\_HH} = VREFDH2 + \left(\frac{M4 - N4}{2}\right) \qquad \text{Equation 56}$$

$$\text{Let} \qquad \text{Equation 57}$$

$$OFFSET4 = \left(\frac{N4 + M4}{2}\right) \text{ and } Z4 = VREFDH2 + OFFSET4$$

-continued

Now,                                    Equation 58

$$X4 - Z4 = \{VREFDH2 + M4\} - \left\{(VREFDH2) + \left(\frac{N4 + M4}{2}\right)\right\}$$

$$X4 - Z4 = \left(\frac{M4 - N4}{2}\right) = TAPDH\_H$$     Equation 59

$$TAPDH\_H = X4 - Z4$$                    Equation 60

$$TAPDH\_H = X4 - Z4$$                    Equation 60

Referring now to FIGS. 26-30, flowchart 2600 depicting operations related to full equalization DFE training process, flowchart 2700 depicting operations related to full equalization DFE training process, and tables 2800, 2802 related to lower-eye & upper-eye coefficients consistent with an embodiment of the present disclosure are provided.

In some embodiments, flowchart 2700 depicting the process of computing final values for a high LE DFE tap-coefficient, a low LE DFE tap-coefficient, a high UE DFE tap-coefficient, and a low UE DFE tap-coefficient, may include four sub-sections 2702, 2704, 2706, 2708. First subsection 2702 may illustrate how to obtain the low LE DFE tap-coefficient (TAPDL_L). Second subsection 2704 may illustrate how to obtain the high LE DFE tap-coefficient (TAPDL_H). Third subsection 2706 may illustrate how to obtain the low UE DFE tap-coefficient (TAPDH_L). Fourth subsection 2708 may illustrate how to obtain the high UE DFE tap-coefficient (TAPDH_H).

In some embodiments, flowchart 2600 depicting upper-eye DFE training operations may be directed toward the process of computing final values for a high LE DFE tap-coefficient, a low LE DFE tap-coefficient, a high UE DFE tap-coefficient, and a low UE DFE tap-coefficient.

The first portion of flowchart 2600 may correspond to the first subsection 2702 of flowchart 2700 illustrating how to obtain the low LE DFE tap-coefficient (TAPDL_L). Flowchart 2600 may include setting (2602) a reference voltage for the error comparator to be equal to a first function of the optimal LE reference voltage minus a first offset voltage, and setting a shared predetermined initial value for the high LE DFE tap-coefficient, the low LE DFE tap-coefficient, the high UE DFE tap-coefficient, the low UE DFE tap-coefficient, a high error DFE tap-coefficient, and a low error DFE tap-coefficient, reading (2604) bit-values for an incoming data signal, and determining (2606) if a preceding bit output from the upper comparator may be a '0' or a '1', if a preceding bit output from the lower comparator may be a '0' or a '1', and if a current bit output from the lower comparator may be a '0' or a '1', such that the nature of a signal transition of the incoming data signal may be ascertained. Flowchart 2600 may further include, determining (2608) if the current bit output from the error comparator may be a '0' or a '1', confirming (2610) through use of a de-serializer, that a set of values representing the preceding bit output from the upper comparator, the preceding bit output from the lower comparator, the current bit output from the lower comparator, and the current bit output from the error comparator may be equal to a predetermined first set ['0', '0', '0', and '1'], and in response to confirming that the set of values representing the preceding bit output from the upper comparator, the preceding bit output from the lower comparator, the current bit output from the lower comparator, and the current bit output from the error comparator may be equal to a predetermined first set ['0', '0', '0', and '1'], storing (2612) the low error DFE tap-coefficient as the low LE DFE tap-coefficient.

The second portion of flowchart 2600 may correspond to the first subsection 2704 of flowchart 2700 illustrating how to obtain the high LE DFE tap-coefficient (TAPDL_H). Flowchart 2600 may also include, setting (2614) the reference voltage for the error comparator to be equal to a second function of the optimal LE reference voltage plus a second offset voltage, and resetting the low error DFE tap-coefficient back to the predetermined initial value, reading (2616) bit-values for an incoming data signal, and determining (2618) if a preceding bit output from the upper comparator may be a '0' or a '1', if a preceding bit output from the lower comparator may be a '0' or a '1', and if a current bit output from the lower comparator may be a '0' or a '1', such that the nature of a signal transition of the incoming data signal may be ascertained. Flowchart 2600 may further include, determining (2620) if the current bit output from the error comparator may be a '0' or a '1', confirming (2622) through use of a de-serializer, that a set of values representing the preceding bit output from the upper comparator, the preceding bit output from the lower comparator, the current bit output from the lower comparator, and the current bit output from the error comparator may be equal to a predetermined a second set ['1', '1', '1', and '0'], and in response to confirming that the set of values representing the preceding bit output from the upper comparator, the preceding bit output from the lower comparator, the current bit output from the lower comparator, and the current bit output from the error comparator may be equal to a predetermined a second set ['1', '1', '1', and '0'], storing (2624) the high error DFE tap-coefficient as the high LE DFE tap-coefficient.

The third portion of flowchart 2600 may correspond to the third subsection 2706 of flowchart 2700 illustrating how to obtain the low UE DFE tap-coefficient (TAPDH_L). Flowchart 2600 may also include, setting (2626) the reference voltage for the error comparator to be equal to a first function of the optimal UE reference voltage minus a third offset voltage, and resetting the high error DFE tap-coefficient back to the predetermined initial value, reading (2628) bit-values for an incoming data signal, and determining (2630) if a preceding bit output from the upper comparator may be a '0' or a '1', if a preceding bit output from the lower comparator may be a '0' or a '1', and if a current bit output from the upper comparator may be a '0' or a '1', such that the nature of a signal transition of the incoming data signal may be ascertained. Flowchart 2600 may further include, determining (2632) if the current bit output from the error comparator may be a '0' or a '1', confirming (2634) through use of a de-serializer, that a set of values representing the preceding bit output from the upper comparator, the preceding bit output from the lower comparator, the current bit output from the upper comparator, and the current bit output from the error comparator may be equal to a predetermined a second set ['0', '0', '0', and '1'], in response to confirming that the set of values representing the preceding bit output from the upper comparator, the preceding bit output from the lower comparator, the current bit output from the upper comparator, and the current bit output from the error comparator may be equal to a predetermined a second set ['0', '0', '0', and '1'], storing (2636) the low error DFE tap-coefficient as the low UE DFE tap-coefficient.

The fourth portion of flowchart 2600 may correspond to the fourth subsection 2708 of flowchart 2700 illustrating how to obtain the high UE DFE tap-coefficient (TAPDH_H).

Flowchart 2600 may also include, setting (2638) the reference voltage for the error comparator to be equal to a second function of the optimal UE reference voltage plus a fourth offset voltage, and resetting the low error DFE tap-coefficient back to the predetermined initial value, reading (2640) bit-values for an incoming data signal, and determining (2642) if a preceding bit output from the upper comparator may be a '0' or a '1', if a preceding bit output from the lower comparator may be a '0' or a '1', and if a current bit output from the upper comparator may be a '0' or a '1', such that the nature of a signal transition of the incoming data signal may be ascertained. Flowchart 2600 may further include, determining (2644) if the current bit output from the error comparator may be a '0' or a '1', confirming (2646) through use of a de-serializer, that a set of values representing the preceding bit output from the upper comparator, the preceding bit output from the lower comparator, the current bit output from the upper comparator, and the current bit output from the error comparator may be equal to a predetermined a second set ['1', '1', '1', and '0'], and in response to confirming that the set of values representing the preceding bit output from the upper comparator, the preceding bit output from the lower comparator, the current bit output from the upper comparator, and the current bit output from the error comparator may be equal to a predetermined a second set ['1', '1', '1', and '0'], storing (2648) the high error DFE tap-coefficient as the high UE DFE tap-coefficient.

The obtained values of lower-eye DFE tap coefficients (TAPDL_L and TAPDL_H) and related parameters (X1,Y1, Z1,OFFSET1) and (X2,Y2,Z2,OFFSET2) may be seen in table 2800. Similarly, obtained values of upper-eye DFE tap coefficient (TAPDH_L and TAPDH_H) and related parameters (X3,Y3,Z3,OFFSET3) and (X4,Y4,Z4,OFFSET4) may be seen in table 2802.

Referring now to FIG. 29, flowchart 2900 depicting operations related to partial equalization DFE training process consistent with embodiments of the present disclosure is provided. Flowchart 2900 may include obtaining (2902), at a trained strobe position of an equalizing LE (lower-eye), an LE minimum voltage and an LE maximum voltage for a current bit based on a preceding bit, through use of a first comparator and a second comparator, using (2904) the values obtained for the LE minimum voltage and the LE maximum voltage to compute values for an optimal LE reference voltage and an LE DFE tap-coefficient, and obtaining (2906), at a trained strobe position of an equalizing UE (upper-eye), a UE minimum voltage and a UE maximum voltage for the current bit based on the preceding bit, through use of the first comparator and the second comparator. Flowchart 2900 may further include, using (2910) the values obtained for the LE minimum voltage, the LE maximum voltage, the UE minimum voltage, the UE maximum voltage, the optimal LE reference voltage, and the optimal UE reference voltage to compute final values for the LE DFE tap-coefficient and the UE DFE tap-coefficient.

Figure 30:
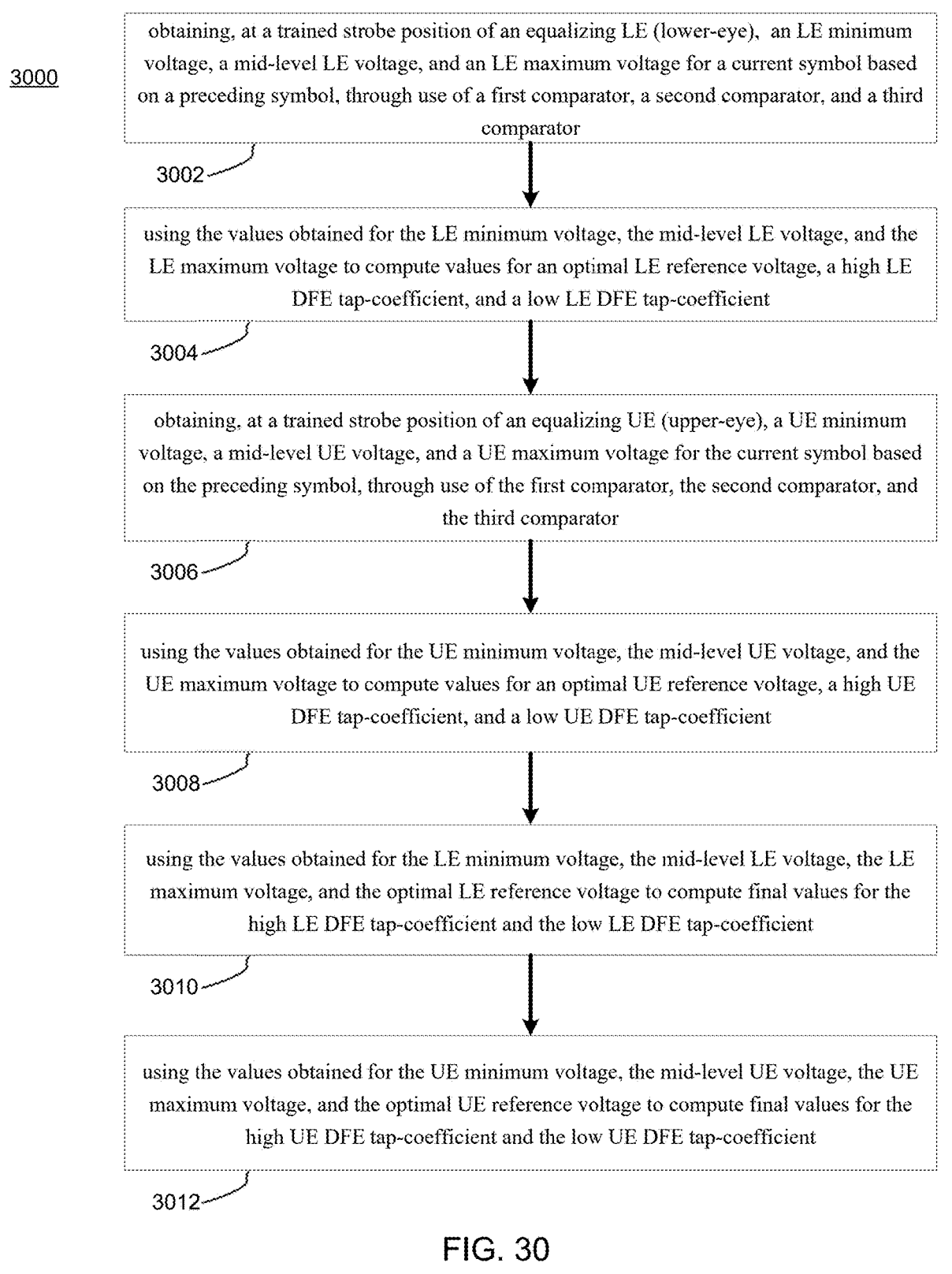

Referring now to FIG. 30, flowchart 3000 depicting operations related to full equalization DFE training process consistent with embodiments of the present disclosure is provided. Flowchart 3000 may include, obtaining (3002), at a trained strobe position of an equalizing LE (lower-eye), an LE minimum voltage, a mid-level LE voltage, and an LE maximum voltage for a current symbol based on a preceding symbol, through use of a first comparator, a second comparator, and a third comparator, using (3004) the values obtained for the LE minimum voltage, the mid-level LE voltage, and the LE maximum voltage to compute values for an optimal LE reference voltage, a high LE DFE tap-coefficient, and a low LE DFE tap-coefficient, and obtaining (3006), at a trained strobe position of an equalizing UE (upper-eye), a UE minimum voltage, a mid-level UE voltage, and a UE maximum voltage for the current symbol based on the preceding symbol, through use of the first comparator, the second comparator, and the third comparator. Flowchart 3000 may further include, using (3008) the values obtained for the UE minimum voltage, the mid-level UE voltage, and the UE maximum voltage to compute values for an optimal UE reference voltage, a high UE DFE tap-coefficient, and a low UE DFE tap-coefficient, using (3010) the values obtained for the LE minimum voltage, the mid-level LE voltage, the LE maximum voltage, and the optimal LE reference voltage to compute final values for the high LE DFE tap-coefficient and the low LE DFE tap-coefficient, and using (3012) the values obtained for the UE minimum voltage, the mid-level UE voltage, the UE maximum voltage, and the optimal UE reference voltage to compute final values for the high UE DFE tap-coefficient and the low UE DFE tap-coefficient.

The terminology used herein is for the purpose of describing particular embodiments and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

Although a few example embodiments have been described in detail above, those skilled in the art will readily appreciate that many modifications are possible in the example embodiments without materially departing from the scope of the present disclosure, described herein. Accordingly, such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail, and a screw may be equivalent structures. It is the express intention of the applicant not to invoke 35 U.S.C. § 112, paragraph (f) for any limitations of any of the claims herein, except for those in which the claim expressly uses the words 'means for' or 'step for' together with an associated function.

Having thus described the disclosure of the present application in detail and by reference to embodiments thereof, it will be apparent that modifications and variations are possible without departing from the scope of the disclosure defined in the appended claims.

What is claimed is:

1. A partial equalization decision feedback equalization (DFE) training method, for use with a single-ended receiver, the method, comprising:

obtaining, at a trained strobe position of an equalizing lower-eye (LE), an LE minimum voltage and an LE maximum voltage for a current bit based on a preceding bit, through use of a first comparator and a second comparator;

using the values obtained for the LE minimum voltage and the LE maximum voltage to compute values for an optimal LE reference voltage and an LE DFE tap-coefficient;

obtaining, at a trained strobe position of an equalizing upper-eye (UE), a UE minimum voltage and a UE maximum voltage for the current bit based on the preceding bit, through use of the first comparator and the second comparator;

using the values obtained for the UE minimum voltage and the UE maximum voltage to compute values for an optimal UE reference voltage and a UE DFE tap-coefficient; and using the values obtained for the LE minimum voltage, the LE maximum voltage, the UE minimum voltage, the UE maximum voltage, the optimal LE reference voltage, and the optimal UE reference voltage to compute final values for the LE DFE tap-coefficient and the UE DFE tap-coefficient.

2. The partial equalization DFE training method of claim 1, wherein if the preceding bit is a '0' while in the process of obtaining the LE minimum voltage and the LE maximum voltage, then a first reference voltage representing a minimum value of a [0 to 1] signal transition and a second reference voltage representing a maximum value of a [0 to 0] signal transition are measured and then averaged together to obtain the LE minimum voltage, and wherein if the preceding bit is a '1' while in the process of obtaining the LE minimum voltage and the LE maximum voltage, then a third reference voltage representing a minimum value of a [1 to 1] signal transition and a fourth reference voltage representing a maximum value of a [1 to 0] signal transition are measured and then averaged to obtain the LE maximum voltage.

3. The partial equalization DFE training method of claim 2, wherein the process of obtaining the LE minimum voltage and the LE maximum voltage further includes:

setting a reference voltage for the second comparator to be equal to an LE reference voltage threshold, and setting initial values for the LE DFE tap-coefficient and the UE DFE tap-coefficient;

reading bit-values for an incoming data signal;

determining if the preceding bit output from the first comparator is a '0' or a '1' and if the current bit output from the first comparator is a '0' or a '1', such that the nature of the signal transition at the first comparator is ascertained;

determining if the current bit output from the second comparator is a '0' or a '1';

confirming through use of a de-serializer, that a set of values representing the preceding bit output from the first comparator, the current bit output from the first comparator, and the current bit output from the second comparator are either a first set, or a second set;

in response to confirming that the set of values representing the preceding bit output from the first comparator, the current bit output from the first comparator, and the current bit output from the second comparator are either a first set, or a second set, storing the reference voltage for the second comparator as either the first reference voltage or the third reference voltage;

resetting the reference voltage of the second comparator to be equal to an initial value for the LE reference voltage threshold;

reading bit-values for the incoming data signal;

determining if the preceding bit output from the first comparator is a '0' or a '1' and if the current bit output from the first comparator is a '0' or a '1', such that the nature of the signal transition at the first comparator is ascertained;

determining if the current bit output from the second comparator is a '0' or a '1';

confirming through use of the de-serializer, that the set of values representing the preceding bit output from the first comparator, the current bit output from the first comparator, and the current bit output from the second comparator are either a third set, or a fourth set; and in response to confirming that the set of values representing the preceding bit output from the first comparator, the current bit output from the first comparator, and the current bit output from the second comparator are either a third set, or a fourth set, storing the reference voltage for the second comparator as either the second reference voltage or the fourth reference voltage.

4. The partial equalization DFE training method of claim 1, wherein if the preceding bit is a '0' while in the process of obtaining the UE minimum voltage and the UE maximum voltage, then a fifth reference voltage representing a maximum value of a [0 to 0] signal transition and a sixth reference voltage representing a minimum value of a [0 to 1] signal transition are measured and then averaged together to obtain the UE minimum voltage, and wherein if the preceding bit is a '1' while in the process of obtaining the UE minimum voltage and the UE maximum voltage, then a seventh reference voltage representing a maximum value of a [1 to 0] signal transition and a eighth reference voltage representing a minimum value of a [1 to 1] signal transition are measured and then averaged to obtain the UE maximum voltage.

5. The partial equalization DFE training method of claim 4, wherein the process of obtaining the UE minimum voltage and the UE maximum voltage further includes:

setting a reference voltage for the first comparator to be equal to a UE reference voltage threshold, and setting initial values for the UE DFE tap-coefficient and the LE DFE tap-coefficient;

reading bit-values for an incoming data signal;

determining if the preceding bit output from the second comparator is a '0' or a '1' and if the current bit output from the second comparator is a '0' or a '1', such that the nature of the signal transition at the second comparator is ascertained;

determining if the current bit output from the first comparator is a '0' or a '1';

confirming through use of a de-serializer, that a set of values representing the preceding bit output from the second comparator, the current bit output from the second comparator, and the current bit output from the first comparator are either a fifth set, or a sixth set;

in response to confirming that the set of values representing the preceding bit output from the second comparator, the current bit output from the second comparator, and the current bit output from the first comparator are either the fifth set, or the sixth set, storing the reference voltage for the first comparator as either the fifth reference voltage or the seventh reference voltage;

resetting the reference voltage for the first comparator to be equal to an initial value for the UE reference voltage threshold;

reading bit-values for the incoming data signal;

determining if the preceding bit output from the second comparator is a '0' or a '1' and if the current bit output from the second comparator is a '0' or a '1', such that the nature of the signal transition at the second comparator is ascertained;

determining if the current bit output from the first comparator is a '0' or a '1';

confirming through use of the de-serializer, that the set of values representing the preceding bit output from the second comparator, the current bit output from the second comparator, and the current bit output from the first comparator are either a seventh set, or an eighth set; and in response to confirming that the set of values representing the preceding bit output from the second comparator, the current bit output from the second comparator, and the current bit output from the first comparator are either the seventh set, or the eighth set, storing a reference voltage for the second comparator as either the sixth reference voltage or the eighth reference voltage.

6. The partial equalization DFE training method of claim 1, wherein the process of computing final values for the LE DFE tap-coefficient and the UE DFE tap-coefficient further includes:

setting a reference voltage for the first comparator to be equal to the optimal LE reference voltage, setting a reference voltage for the second comparator to be equal to the optimal LE reference voltage minus a first offset voltage, and setting the LE DFE tap-coefficient and the UE DFE tap-coefficient to both be equal to a predetermined initial value;

reading bit-values for an incoming data signal;

determining if the preceding bit output from the first comparator is a '0' or a '1' and if the current bit output from the first comparator is a '0' or a '1', such that the nature of the signal transition at the first comparator is ascertained;

determining if the current bit output from the second comparator is a '0' or a '1';

confirming through use of a de-serializer, that a set of values representing the preceding bit output from the first comparator, the current bit output from the first comparator, and the current bit output from the second comparator are equal to a predetermined first set;

in response to confirming that the set of values representing the preceding bit output from the first comparator, the current bit output from the first comparator, and the current bit output from the second comparator are equal to the predetermined first set, storing the reference voltage for the first comparator as the final value for the LE DFE tap-coefficient;

resetting the reference voltage for the second comparator to be equal to the optimal UE reference voltage, resetting a reference voltage for the first comparator to be equal to the optimal UE reference voltage plus a second offset voltage, and resetting the LE DFE tap-coefficient and the UE DFE tap-coefficient to be equal to the predetermined initial value;

reading bit-values for the incoming data signal;

determining if the preceding bit output from the second comparator is a '0' or a '1' and if the current bit output from the second comparator is a '0' or a '1', such that the nature of the signal transition at the second comparator is ascertained;

determining if the current bit output from the first comparator is a '0' or a '1';

confirming through use of the de-serializer, that the set of values representing the preceding bit output from the second comparator, the current bit output from the second comparator, and the current bit output from the first comparator are equal to a predetermined second set; and in response to confirming that the set of values representing the preceding bit output from the second comparator, the current bit output from the second comparator, and the current bit output from the first comparator are equal to the predetermined second set, storing the reference voltage for the second comparator as the final value for the UE DFE tap-coefficient.

7. The partial equalization DFE training method of claim 1, wherein the first comparator is configured to be used as a reference receiver and the second comparator is configured to be used as an error receiver while computing the LE DFE tap-coefficient, and conversely the second comparator is configured to be used as the reference receiver and the first comparator is configured to be used as the error receiver while computing the UE DFE tap-coefficient.

8. A receiver circuit of a physical layer (PHY) of a memory controller, the receiver circuit comprising:

a data pad configured to receive an input signal from a dynamic random access memory (DRAM) device;

a first comparator operatively connected to the data pad and configured to receive an upper-eye (UE) reference voltage;

a second comparator operatively connected to the data pad and configured to receive a lower-eye (LE) reference voltage; and a de-serializer operatively connected to both the first comparator and the second comparator, the de-serializer configured to receive a first output from the first comparator, and a second output from the second comparator, wherein the first comparator is configured to be used as a reference receiver and the second comparator is configured to be used as an error receiver while computing an LE DFE tap-coefficient, and conversely, the second comparator is configured to be used as the reference receiver and the first comparator is configured to be used as the error receiver while computing a UE DFE tap-coefficient.

9. A full equalization decision feedback equalization (DFE) training method, for use with a receiver, the method, comprising:

obtaining, at a trained strobe position of an equalizing LE (lower-eye), an LE minimum voltage, a mid-level LE voltage, and an LE maximum voltage for a current symbol based on a preceding symbol, through use of a first comparator, a second comparator, and a third comparator;

using the values obtained for the LE minimum voltage, the mid-level LE voltage, and the LE maximum voltage to compute values for an optimal LE reference voltage, a high LE DFE tap-coefficient, and a low LE DFE tap-coefficient;

obtaining, at a trained strobe position of an equalizing UE (upper-eye), a UE minimum voltage, a mid-level UE voltage, and a UE maximum voltage for the current symbol based on the preceding symbol, through use of the first comparator, the second comparator, and the third comparator;

using the values obtained for the UE minimum voltage, the mid-level UE voltage, and the UE maximum voltage to compute values for an optimal UE reference voltage, a high UE DFE tap-coefficient, and a low UE DFE tap-coefficient;

using the values obtained for the LE minimum voltage, the mid-level LE voltage, the LE maximum voltage, and the optimal LE reference voltage to compute final values for the high LE DFE tap-coefficient and the low LE DFE tap-coefficient; and using the values obtained for the UE minimum voltage, the mid-level UE voltage, the UE maximum voltage, and the optimal UE reference voltage to compute final values for the high UE DFE tap-coefficient and the low UE DFE tap-coefficient.

10. The full equalization DFE training method of claim 9, wherein if the preceding symbol is a '00' while in the process of obtaining the LE minimum voltage and the LE maximum voltage, then a first reference voltage representing a minimum value of a [00 to 01] signal transition and a second reference voltage representing a maximum value of a [00 to 00] signal transition are measured and then averaged together to obtain the LE minimum voltage, wherein if the preceding symbol is a '01' while in the process of obtaining the LE minimum voltage and the LE maximum voltage, then a third reference voltage representing a minimum value of a [01 to 01] signal transition and a fourth reference voltage representing a maximum value of a [01 to 00] signal transition are measured and then averaged to obtain a mid-level LE voltage, and wherein if the preceding symbol is a '11' while in the process of obtaining the LE minimum voltage and the LE maximum voltage, then a fifth reference voltage representing a minimum value of a [11 to 01] signal transition and a sixth reference voltage representing a maximum value of a [11 to 00] signal transition are measured and then averaged together to obtain the LE maximum voltage.

11. The full equalization DFE training method of claim 10, wherein the process of obtaining the LE minimum voltage, the mid-level LE voltage, and the LE maximum voltage further includes:

setting a reference voltage for the third comparator to be equal to an LE reference voltage threshold, and setting initial values for the high LE DFE tap-coefficient, the low LE DFE tap-coefficient, the high UE DFE tap-coefficient, the low UE DFE tap-coefficient, a low error DFE tap-coefficient, and a high error DFE tap-coefficient;

reading bit-values for an incoming data signal;

determining if a preceding bit output from the first comparator is a '0' or a '1', if a preceding bit output from the second comparator is a '0' or a '1', and if a current bit output from the second comparator is a '0' or a '1', such that the nature of a signal transition of the incoming data signal is ascertained;

determining if the current bit output from the third comparator is a '0' or a '1';

confirming through use of a de-serializer, that a set of values representing the preceding bit output from the first comparator, the preceding bit output from the second comparator, the current bit output from the second comparator, and the current bit output from the third comparator are at least one of a first set, a second set, or a third set;

in response to confirming that the set of values representing the preceding bit output from the first comparator, the preceding bit output from the second comparator, the current bit output from the second comparator, and the current bit output from the third comparator are at least one of the first set, the second set, or the third set, storing the reference voltage for the third comparator voltage as at least one of the second reference voltage, the fourth reference voltage or the sixth reference voltage;

resetting the reference voltage of the third comparator to be equal to an initial value for the LE reference voltage threshold;

reading bit-values for the incoming data signal;

determining if the preceding bit output from the first comparator is a '0' or a '1', if the preceding bit output from the second comparator is a '0' or a '1', and if the current bit output from the second comparator is a '0' or a '1', such that the nature of the signal transition of the incoming data signal is ascertained;

determining if the current bit output from the third comparator is a '0' or a '1';

confirming through use of a de-serializer, that the set of values representing the preceding bit output from the first comparator, the preceding bit output from the second comparator, the current bit output from the second comparator, and the current bit output from the third comparator are at least one of a fourth set, a fifth set or a sixth set; and in response to confirming that the set of values representing the preceding bit output from the first comparator, the preceding bit output from the second comparator, the current bit output from the second comparator, and the current bit output from the third comparator are at least one of a fourth set, a fifth set, or a sixth set, storing the reference voltage for the third comparator voltage as at least one of the first reference voltage, the third reference voltage or the fifth reference voltage.

12. The full equalization DFE training method of claim 9, wherein if the preceding symbol is a '00' while in the process of obtaining the UE minimum voltage and the UE maximum voltage, then a seventh reference voltage representing a minimum value of a [00 to 01] signal transition and an eighth reference voltage representing a minimum value of a [00 to 11] signal transition are measured and then averaged together to obtain the UE minimum voltage, wherein if the preceding symbol is a '01' while in the process of obtaining the UE minimum voltage and the UE maximum voltage, then a ninth reference voltage representing a maximum value of a [01 to 01] signal transition and a tenth reference voltage representing a minimum value of a [01 to 11] signal transition are measured and then averaged to obtain a mid-level UE voltage, and wherein if the preceding symbol is a '11' while in the process of obtaining the UE minimum voltage and the UE maximum voltage, then an eleventh reference voltage representing a maximum value of a [11 to 01] signal transition and a twelfth reference voltage representing a minimum value of a [11 to 11] signal transition are measured and then averaged together to obtain the UE maximum voltage.

13. The full equalization DFE training method of claim 12, wherein the process of obtaining the UE minimum voltage and the UE maximum voltage further includes:

setting a reference voltage for the third comparator to be equal to an LE reference voltage threshold, and setting initial values for the high LE DFE tap-coefficient, the low LE DFE tap-coefficient, the high UE DFE tap-coefficient, the low UE DFE tap-coefficient, a low error DFE tap-coefficient, and a high error DFE tap-coefficient;

reading bit-values for an incoming data signal;

determining if a preceding bit output from the first comparator is a '0' or a '1', if a preceding bit output from the second comparator is a '0' or a '1', and if a current bit output from the first comparator is a '0' or a '1', such that the nature of a signal transition of the incoming data signal is ascertained;

determining if the current bit output from the third comparator is a '0' or a '1';

confirming through use of a de-serializer, that a set of values representing the preceding bit output from the first comparator, the preceding bit output from the second comparator, the current bit output from the first comparator, and the current bit output from the third comparator are at least one of a seventh set, an eighth set, or a ninth set;

in response to confirming that the set of values representing the preceding bit output from the first comparator, the preceding bit output from the second comparator, the current bit output from the first comparator, and the current bit output from the third comparator are at least one of the seventh set, the eighth set, or the ninth set, storing the reference voltage for the third comparator voltage as at least one of the seventh reference voltage, the ninth reference voltage or the eleventh reference voltage;

resetting the reference voltage of the third comparator to be equal to an initial value for the UE reference voltage threshold;

reading bit-values for the incoming data signal;

determining if the preceding bit output from the first comparator is a '0' or a '1', if the preceding bit output from the second comparator is a '0' or a '1', and if the current bit output from the first comparator is a '0' or a '1', such that the nature of the signal transition of the incoming data signal is ascertained;

determining if the current bit output from the third comparator is a '0' or a '1';

confirming through use of a de-serializer, that the set of values representing the preceding bit output from the first comparator, the preceding bit output from the second comparator, the current bit output from the first comparator, and the current bit output from the third comparator are at least one of a tenth set, an eleventh set, or a twelfth set; and in response to confirming that the set of values representing the preceding bit output from the first comparator, the preceding bit output from the second comparator, the current bit output from the first comparator, and the current bit output from the third comparator are at least one of a tenth set, an eleventh set, or a twelfth set, storing the reference voltage for the third comparator voltage as at least one of the eighth reference voltage, the tenth reference voltage or the twelfth reference voltage.

14. The full equalization DFE training method of claim 9, wherein the process of computing final values for the high LE DFE tap-coefficient, the low LE DFE tap-coefficient, the high UE DFE tap-coefficient, and the low UE DFE tap-coefficient further includes:

setting a reference voltage for the third comparator to be equal to a first function of the optimal LE reference voltage minus a first offset voltage, and setting a shared predetermined initial value for the high LE DFE tap-coefficient, the low LE DFE tap-coefficient, the high UE DFE tap-coefficient, the low UE DFE tap-coefficient, a high error DFE tap-coefficient, and a low error DFE tap-coefficient;

reading bit-values for an incoming data signal;

determining if a preceding bit output from the first comparator is a '0' or a '1', if a preceding bit output from the second comparator is a '0' or a '1', and if a current bit output from the second comparator is a '0' or a '1', such that the nature of a signal transition of the incoming data signal is ascertained;

determining if the current bit output from the third comparator is a '0' or a '1';

confirming through use of a de-serializer, that a set of values representing the preceding bit output from the first comparator, the preceding bit output from the second comparator, the current bit output from the second comparator, and the current bit output from the third comparator are equal to a predetermined first set;

in response to confirming that the set of values representing the preceding bit output from the first comparator, the preceding bit output from the second comparator, the current bit output from the second comparator, and the current bit output from the third comparator are equal to a predetermined first set, storing the low error DFE tap-coefficient as the low LE DFE tap-coefficient;

setting the reference voltage for the third comparator to be equal to a second function of the optimal LE reference voltage plus a second offset voltage, and resetting the low error DFE tap-coefficient back to the predetermined initial value;

reading bit-values for the incoming data signal;

determining if a preceding bit output from the first comparator is a '0' or a '1', if a preceding bit output from the second comparator is a '0' or a '1', and if a current bit output from the second comparator is a '0' or a '1', such that the nature of a signal transition of the incoming data signal is ascertained;

determining if the current bit output from the third comparator is a '0' or a '1';

confirming through use of a de-serializer, that a set of values representing the preceding bit output from the first comparator, the preceding bit output from the second comparator, the current bit output from the second comparator, and the current bit output from the third comparator are equal to a predetermined second set;

in response to confirming that the set of values representing the preceding bit output from the first comparator, the preceding bit output from the second comparator, the current bit output from the second comparator, and the current bit output from the third comparator are equal to the predetermined second set, storing the high error DFE tap-coefficient as the high LE DFE tap-coefficient;

setting the reference voltage for the third comparator to be equal to a first function of the optimal UE reference voltage minus a third offset voltage, and resetting the high error DFE tap-coefficient back to the predetermined initial value;

reading bit-values for the incoming data signal;

determining if a preceding bit output from the first comparator is a '0' or a '1', if a preceding bit output from the second comparator is a '0' or a '1', and if a current bit output from the first comparator is a '0' or a '1', such that the nature of a signal transition of the incoming data signal is ascertained;

determining if the current bit output from the third comparator is a '0' or a '1';

confirming through use of a de-serializer, that a set of values representing the preceding bit output from the first comparator, the preceding bit output from the second comparator, the current bit output from the first comparator, and the current bit output from the third comparator are equal to the predetermined second set;

in response to confirming that the set of values representing the preceding bit output from the first comparator, the preceding bit output from the second comparator, the current bit output from the first comparator, and the current bit output from the third comparator are equal to the predetermined second set, storing the low error DFE tap-coefficient as the low UE DFE tap-coefficient;

setting the reference voltage for the third comparator to be equal to a second function of the optimal UE reference voltage plus a fourth offset voltage, and resetting the low error DFE tap-coefficient back to the predetermined initial value;

reading bit-values for the incoming data signal;

determining if a preceding bit output from the first comparator is a '0' or a '1', if a preceding bit output from the second comparator is a '0' or a '1', and if a current bit output from the first comparator is a '0' or a '1', such that the nature of a signal transition of the incoming data signal is ascertained;

determining if the current bit output from the third comparator is a '0' or a '1';

confirming through use of a de-serializer, that a set of values representing the preceding bit output from the first comparator, the preceding bit output from the second comparator, the current bit output from the first comparator, and the current bit output from the third comparator are equal to the predetermined second set; and in response to confirming that the set of values representing the preceding bit output from the first comparator, the preceding bit output from the second comparator, the current bit output from the first comparator, and the current bit output from the third comparator are equal to the predetermined second set, storing the high error DFE tap-coefficient as the high UE DFE tap-coefficient.

15. The full equalization DFE training method of claim 9, wherein the first comparator and the second comparator are configured to be used together as a reference receiver and the third comparator is configured to be used as an error receiver.

* * * * *